US012492219B2

(12) United States Patent
Lebrilla et al.

(10) Patent No.: US 12,492,219 B2
(45) Date of Patent: *Dec. 9, 2025

(54) PRODUCTION OF OLIGOSACCHARIDES FROM POLYSACCHARIDES

(71) Applicant: The Regents of the University of California, Oakland, CA (US)

(72) Inventors: Carlito B. Lebrilla, Davis, CA (US); Bruce German, Davis, CA (US); Matthew J. Amicucci, Woodland, CA (US); Eshani Nandita, Turlock, CA (US); Juan Castillo, Davis, CA (US); David A. Mills, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 888 days.

This patent is subject to a terminal disclaimer.

(21) Appl. No.: 17/616,554

(22) PCT Filed: Jun. 2, 2020

(86) PCT No.: PCT/US2020/035748
§ 371 (c)(1),
(2) Date: Dec. 3, 2021

(87) PCT Pub. No.: WO2020/247389
PCT Pub. Date: Dec. 10, 2020

(65) Prior Publication Data
US 2022/0235084 A1 Jul. 28, 2022

Related U.S. Application Data

(60) Provisional application No. 62/950,483, filed on Dec. 19, 2019, provisional application No. 62/857,685, filed on Jun. 5, 2019.

(51) Int. Cl.
*C07H 3/06* (2006.01)
*A23L 33/21* (2016.01)

(52) U.S. Cl.
CPC ............... *C07H 3/06* (2013.01); *A23L 33/21* (2016.08)

(58) Field of Classification Search
CPC .................................. C07H 3/06; A23L 33/21
See application file for complete search history.

(56) References Cited

U.S. PATENT DOCUMENTS

| | | | |
|---|---|---|---|
| 11,066,684 B2 * | 7/2021 | Amicucci | ............... C08B 37/00 |
| 2003/0162300 A1 | 8/2003 | Kunz et al. | |
| 2013/0156813 A1 | 6/2013 | Gildersleeve et al. | |
| 2014/0378412 A1 | 12/2014 | Lowe et al. | |
| 2016/0213702 A1 | 7/2016 | Von Maltzahn et al. | |
| 2016/0366909 A1 | 12/2016 | Geremia et al. | |
| 2018/0235258 A1 | 8/2018 | Falck | |

FOREIGN PATENT DOCUMENTS

| | | |
|---|---|---|
| CN | 102014641 A | 4/2011 |
| CN | 107466212 A | 12/2017 |
| WO | 2018106845 A1 | 6/2018 |
| WO | 2018/236917 A1 | 12/2018 |
| WO | 2019/101648 A1 | 5/2019 |

OTHER PUBLICATIONS

Parrish, F. W., Perlin, A. S., & Reese, E. T. (1960). Selective enzymolysis of poly-β-D-glucans, and the structure of the polymers. Canadian Journal of Chemistry, 38(11), 2094-2104. (Year: 1960).*
Faijes, M., Fairweather, J. K., Driguez, H., & Planas, A. (2001). Oligosaccharide Synthesis by Coupled endo-Glycosynthases of Different Specificity: A Straightforward Preparation of Two Mixed-Linkage Hexasaccharide Substrates of 1, 3/1, 4-β-Glucanases. Chemistry—A European Journal, 7(21), 4651-4655. (Year: 2001).*
Juvonen M, Kotiranta M, Jokela J, Tuomainen P, Tenkanen M. Identification and structural analysis of cereal arabinoxylan-derived oligosaccharides by negative ionization HILIC-MS/MS. Food chemistry. Mar. 1, 2019;275:176-85. (Year: 2019).*
Edney, M. J., Marchylo, B. A., & MacGregor, A. W. (1991). Structure of Total Barley Beta-Glucan 1. Journal of the Institute of Brewing, 97(1), 39-44. (Year: 1991).*
Gidenne, T. (1995). Effect of fibre level reduction and gluco-oligosaccharide addition on the growth performance and caecal fermentation in the growing rabbit. Animal feed science and technology, 56(3-4), 253-263. (Year: 1995).*
Xiong, Yuanjing, et al. "HPAEC-PAD and Q-TOF-MS/MS analysis reveal a novel mode of action of endo-β-1, 3 (4)-D-glucanase Eng16A from Coprinopsis cinerea on barley β-glucan." Food Chemistry 287 (2019): 160-166. (Year: 2019).*
Lazaridou, Athina, Costas G. Biliaderis, and Marta S. Izydorczyk. "Functional food carbohydrates." (2007): 1-72. (Year: 2007).*
Hrmova, Maria, et al. "Chemoenzymic synthesis of (1→ 3, 1→ 4)-β-D-glucooligosaccharides for subsite mapping of (1→ 3, 1→ 4)-β-D-glucan endohydrolases." Journal of the Chemical Society, Perkin Transactions 1 21 (1998): 3571-3576. (Year: 1998).*
Palma, Angelina S., et al. "Unravelling Glucan Recognition Systems by Glycome Microarrays Using the Designer Approach and Mass Spectrometry*[S]." Molecular & Cellular Proteomics 14.4 (2015): 974-988. (Year: 2015).*
Boulos, Samy, and Laura Nyström. "UPLC-MS/MS investigation of β-glucan oligosaccharide oxidation." Analyst 141.24 (2016): 6533-6548. (Year: 2016).*

(Continued)

*Primary Examiner* — Scarlett Y Goon
*Assistant Examiner* — David H Cho
(74) *Attorney, Agent, or Firm* — Kilpatrick Townsend & Stockton LLP

(57) ABSTRACT

Synthetic oligosaccharides and mixtures thereof which resemble polysaccharides produced by plants, yeast and other fungi, bacteria, and algae are described. The oligosaccharides and compositions provided herein are useful as synbiotics, prebiotics, immune modulators, digestion aids, and food additives.

13 Claims, 21 Drawing Sheets

(56) References Cited

OTHER PUBLICATIONS

Boulos, Samy, and Laura Nyström. "UPLC-MS/MS investigation of β-glucan oligosaccharide oxidation." Analyst 141.24 (2016): 6533-6548. (Year: 2016).*
International Search Report and Written Opinion in PCT/US2020/035748 mailed Sep. 3, 2020; 11 pages.
Extended European Search Report in EP20817695.8 mailed Jun. 1, 2023; 8 pages.
Xu, J.-L. et al.; "Microbial Oligosaccharides with Biomedical Applications"; *Marine Drugs*; vol. 19, No. 6; Jun. 21, 2021; 22 pages.
European Patent Office; Extended European Search Report received in European Patent Application No. 24212995.5; dated Jan. 21, 2025; 11 pages.
Khasnobis S. et al. "Characterization of a 1-3, 5-10 Specific Arabinosyltransferase Activity Involved in Mycobaterial Arabinan Biosynthesis", Chemistry & Biology, Current Biology, London GB, vol. 13, No. 7, Jul. 28, 2006 pp. 787-795, XP027991089, ISSN: 1074-5521 retrieved on Jul. 1, 2006.

\* cited by examiner

PRODUCTION OF OLIGOSACCHARIDES FROM POLYSACCHARIDES

CROSS-REFERENCES TO RELATED APPLICATIONS

This application claims priority to U.S. Provisional Application No. 62/857,685, filed Jun. 5, 2019, and U.S. Provisional Application No. 62/950,483, filed Dec. 19, 2019, the disclosures of which are hereby incorporated by reference in their entirety for all purposes.

BACKGROUND OF THE INVENTION

Oligosaccharides are carbohydrates that generally contain 3-20 covalently linked monosaccharide units. Due to the possibility of many monosaccharide constituents, variable glycosidic bond positions and associated stereochemistry, branching, and functional group modification, oligosaccharides can have highly variable structures that elicit a host of different bioactivities. The bioactivity of many oligosaccharides has not yet been studied or determined. However, some sources of oligosaccharides, particularly those in human milk[1-4], bovine milk,[5] and galactooligosaccharides produced by the trans-galactosylation of lactose[6], are well studied and have shown to act as prebiotics, immunomodulators, anti-diarrheal, pathogen protectants, and mineral absorption stimulators. Oligosaccharides from other sources are therefore expected to elicit similar bioactivities. Polysaccharides are large biomolecules that reach up to and possibly over 1 million monosaccharide residues.[7] Polysaccharides make up the cell walls of plants, bacteria, yeast, fungi, and in a more limited manner, animals.[8-9] Polysaccharides are largely known for their physical and rheological properties, which include providing structural rigidity, water binding, and antioxidant capabilities. Conversely, the bioactivities of polysaccharides are much less understood than oligosaccharides, but, in some cases, can provide similar prebiotic and immunomodulating benefits.[10-12] The difference in bioactivities despite similar structural components can be attributed to their low solubility and their limited intracellular transport.

While oligosaccharides can be found in high abundance in animals, the majority of plant matter is comprised of polysaccharides with little to no oligosaccharide contribution. Polysaccharides are generally synthesized by the addition of UDP-activated monosaccharides to carbohydrate primer material that is often protein or lipid bound.[13-14] This leaves no direct mechanism for oligosaccharide biosynthesis, which results in few endogenous oligosaccharides. The most abundant plant polysaccharides found in nature include amylose, amylopectin, and cellulose. However, plants contain a number of other polysaccharides that can be grouped based upon their structural functions. Pectins refer to negatively charged anionic polymers such as rhamnogalacturonan I, rhamnogalacturonan II, and polygalacturonan, while hemicelluloses refer to neutral polymers that bind together cellulose fibrils such as xyloglucan, glucomannan, and arabinogalactan. Additionally, plant secondary cell walls largely contain arabinans and xylans.[15-17]

Oligosaccharides are generally produced in three ways and are subsequently ordered by the frequency of use: 1) de novo synthesis using chemical and/or enzymatic and/or biosynthetic approaches to construct oligosaccharides[18-20], 2) enzymatic or chemical release from proteins and/or lipids[21], 3) through the depolymerization of polysaccharides using enzymes[22]. Due to the high development cost of the de novo synthesis of oligosaccharides, this strategy is currently only being applied to mammalian oligosaccharides. Additionally, plants do not have high amounts of protein and lipid bound oligosaccharides that can be released. Accordingly, the depolymerization of polysaccharides using enzymes is currently the primary way of producing plant oligosaccharides. However, the substrate specificity of enzymes leads to the production of highly specific oligosaccharides with little variation in the structures. Furthermore, enzymes are not readily available for all polysaccharides.

BRIEF SUMMARY OF THE INVENTION

Provided herein are synthetic oligosaccharides and mixtures thereof which resemble polysaccharides produced by plants, yeast and other fungi, bacteria, and algae are described.

In some embodiments, the synthetic oligosaccharide includes a backbone containing glucose monomers, wherein each glucose monomer is optionally bonded to a pendant xylose monomer. In some embodiments, the synthetic oligosaccharide includes a backbone containing mannose monomers, wherein each mannose monomer is optionally bonded to a pendant galactose monomer. In some embodiments, the synthetic oligosaccharide contains mannose monomers and glucose monomers. In some embodiments, the synthetic oligosaccharide includes a backbone containing arabinose monomers, wherein each arabinose monomer is optionally bonded to a pendant arabinose monomer. In some embodiments, the synthetic oligosaccharide includes β1-4 linked glucose monomers and β1-3 linked glucose monomers. In some embodiments, the synthetic oligosaccharide includes a backbone containing xylose monomers, wherein each xylose monomer is optionally bonded to a pendant arabinose monomer or a pendant glucuronic acid (e.g., a 4-O methylated GlcA). In some embodiments, the total number of monomers in the synthetic oligosaccharide ranges from 3 to 30.

The oligosaccharides and compositions provided herein are useful as synbiotics, prebiotics, immune modulators, digestion aids, food additives, supplements, pharmaceutical excipients, and analytical standards.

DETAILED DESCRIPTION OF THE INVENTION

Figure 1A:
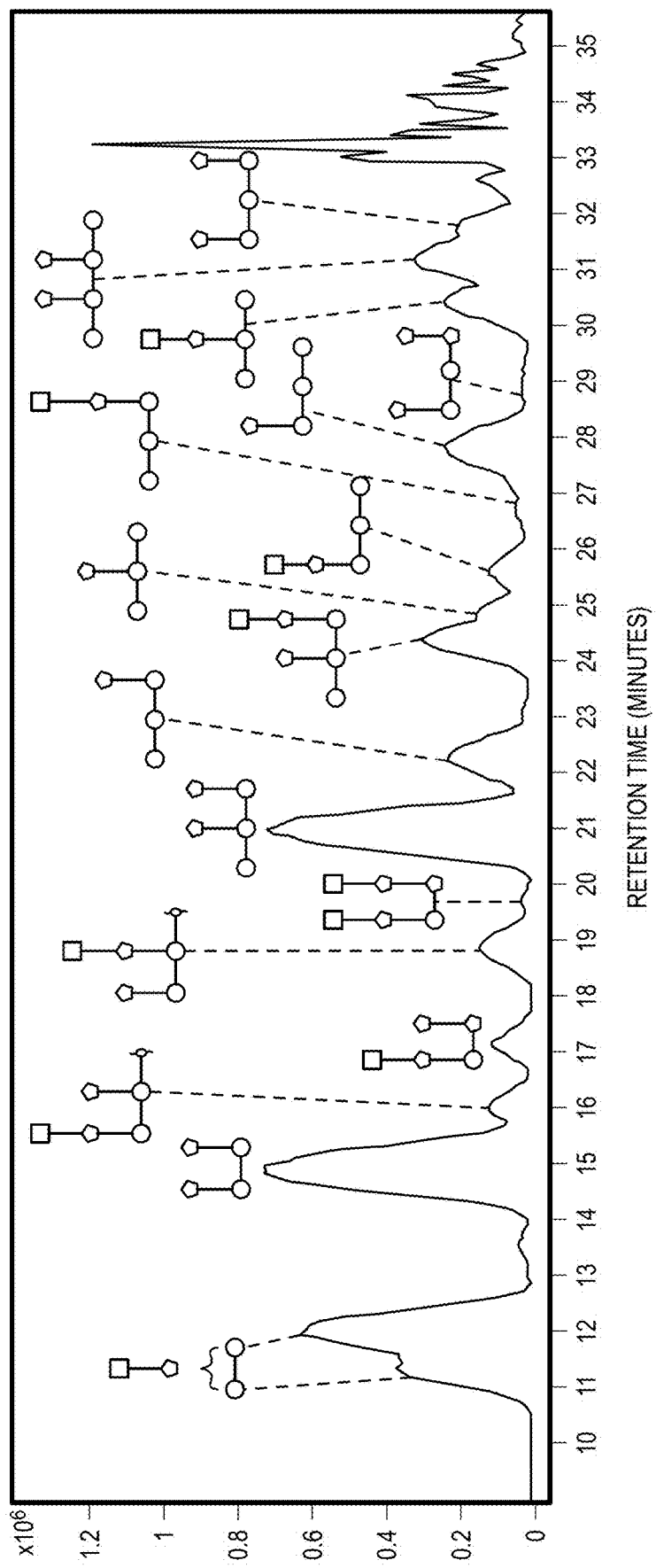
FIGS. 1A-1C show a) Annotated base peak chromatogram of characterized xyloglucan-derived oligosaccharides; b) Extracted ion chromatogram of 771.27 m/z shows four isomers; c) Annotated tandem mass spectra of the four 771.27 m/z isomers and their final elucidated structures.

Provided herein are novel synthetic oligosaccharides which, when co-formulated with each other, resemble polysaccharides produced by plants, yeast and other fungi, bacteria, and algae. The oligosaccharides can be used for numerous applications including prebiotics, immune modulation, gut health, and analytical standards. The oligosaccharides, which range from 3-20 monosaccharides in length, maintain the same recognizable epitopes that constitute their parent polysaccharides and thus can provide wide ranging bioactivities. The reduction in size enables them to be more easily recognized and internalized by cells.

I. EMBODIMENTS OF THE INVENTION

As used herein, the term "synthetic oligosaccharide" refers to an oligosaccharide produced by the depolymerization of a polysaccharide. Synthetic oligosaccharides according to the present invention can be obtained by depolymerizing heteropolymer polysaccharides and homopolymer polysaccharides according to the methods described herein. As used herein, the term "heteropolymer polysaccharide" refers to a polysaccharide containing two or more kinds of monosaccharide subunits linked together by the same type of glycosidic bond or different types of glycosidic bonds; heteropolymer polysaccharides also include polysaccharides containing repeating monosaccharide subunits of the same kind linked together by different types of glycosidic bonds. The glycosidic bonds in a heteropolymer polysaccharide may be β1-2 bonds, β1-3 bonds, β1-4 bonds, β1-6 bonds, α1-3 bonds, α1-4 bonds, α1-6 bonds, or a combination thereof. Examples of heteropolymer polysaccharides include, but are not limited to, xyloglucan, lichenan, β-glucan, glucomannan, galactomannan, arabinan, xylan, and arabinoxylan.

Some embodiments of the present disclosure provide synthetic oligosaccharides comprising a backbone containing glucose monomers, wherein each glucose monomer is optionally bonded to a pendant xylose monomer, and wherein the total number of monomers in the synthetic oligosaccharide ranges from 3 to 30. Such synthetic oligosaccharides can be obtained, for example, by depolymerizing xyloglucan according to the methods described herein. Xyloglucan is known to contain a glucose backbone with single-unit xylose branches, where the xylose branches may be modified with a galactose endcap or an arabinose endcap. Tamarind xyloglucan, for example, contains a β1,4-linked glucose backbone with frequent single-unit branches of α1,6-linked xylose that can occasionally be further attached to a single β1,2-linked galactose endcap. In other sources of xyloglucan, arabinose can be α1,2 linked to the xylose residue. Xyloglucan from other sources may contain a single fucose residue α1,2 linked to the galactose.

In some embodiments, the oligosaccharides comprise 2, 3, 4, 5, or 6 hexose residues. In some embodiments, the oligosaccharides contain 1, 2, 3, or more pentose residues. In some embodiments, the oligosaccharides contain an equal number of hexose and pentose residues. In some embodiments the oligosaccharides contain fewer pentose residues than hexose residues.

In some embodiments, the glucose monomers in the backbone of the synthetic oligosaccharide are β1-4 linked glucose monomers. In some embodiments, each pendant xylose monomer is bonded to a glucose monomer in the backbone by an α1-6 linkage.

In some embodiments, the synthetic oligosaccharide further includes one galactose monomer bonded to one or more pendant xylose monomers. In some embodiments, each galactose monomer is bonded to the pendant xylose monomer via a β1-2 linkage. In some embodiments, the synthetic oligosaccharide further includes one fucose monomer bonded to one or more galactose monomers. In some embodiments, each fucose monomer is bonded to the galactose monomer via an α1-2 linkage.

In some embodiments, the synthetic oligosaccharide further includes one arabinose monomer bonded to one or more pendant xylose monomers. In some embodiments, the arabinose monomer is bonded to the pendant xylose monomer via an α1-2 linkage.

In some embodiments, the synthetic oligosaccharide contains 2 to 4 glucose monomer in the backbone, 1 to 2 pendant xylose monomers bonded to different glucose monomers in the backbone, and 0 to 2 galactose monomers bonded to different xylose monomers.

In some embodiments, the synthetic oligosaccharide is selected from a compound set forth in Table 4 below. In some embodiments, the synthetic oligosaccharide is selected from a group consisting of any 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, or 34 of the following compounds:

((Galβ1-2)Xylα1-6)Glu,
(Xylα1-6)Gluβ1-4Glu,
Gluβ1-4(Xylα1-6)Glu,
(Xylα1-6)Gluβ1-4(Xylα1-6)Glu,
Gluβ1-4((Galβ1-2)Xylα1-6)Glu,
((Galβ1-2)Xylα1-6)Gluβ1-4Glu,
Gluβ1-4Gluβ1-4(Xylα1-6)Glu,
(Xylα1-6)Gluβ1-4Gluβ1-4Glu,
Gluβ1-4(Xylα1-6)Gluβ1-4Glu,
(Xylα1-6)Gluβ1-4((Galβ1-2)Xylα1-6)Glu,
((Galβ1-2)Xylα1-6)Gluβ1-4(Xylα1-6)Glu,
(Xylα1-6)Gluβ1-4Gluβ1-4(Xylα1-6)Glu,
Gluβ1-4(Xylα1-6)Gluβ1-4(Xylα1-6)Glu,
(Xylα1-6)Gluβ1-4(Xylα1-6)Gluβ1-4Glu,
Gluβ1-4Gluβ1-4((Galβ1-2)Xylα1-6)Glu,
Gluβ1-4((Galβ1-2)Xylα1-6)Gluβ1-4Glu, ((Galβ1-2)Xylα1-6)Gluβ1-4Gluβ1-4Glu,
Gluβ1-4Gluβ1-4Gluβ1-4(Xylα1-6)Glu,
Gluβ1-4(Xylα1-6)Gluβ1-4Gluβ1-4Glu,
Gluβ1-4Gluβ1-4(Xylα1-6)Gluβ1-4Glu,
(Xylα1-6)Gluβ1-4Gluβ1-4Gluβ1-4Glu,
(Xylα1-6)Gluβ1-4(Xylα1-6)Gluβ1-4(Xylα1-6)Glu,
((Galβ1-2)Xylα1-6)Gluβ1-4((Galβ1-2)Xylα1-6)Glu,
Gluβ1-4(Xylα1-6)Gluβ1-4((Galβ1-2)Xylα1-6)Glu,
Gluβ1-4((Galβ1-2)Xylα1-6)Gluβ1-4(Xylα1-6)Glu,
(Xylα1-6)Gluβ1-4Gluβ1-4((Galβ1-2)Xylα1-6)Glu,
((Galβ1-2)Xylα1-6)Gluβ1-4Gluβ1-4(Xylα1-6)Glu,
((Galβ1-2)Xylα1-6)Gluβ1-4(Xylα1-6)Gluβ1-4Glu,
(Xylα1-6)Gluβ1-4((Galβ1-2)Xylα1-6)Gluβ1-4Glu,
Gluβ1-4Gluβ1-4(Xylα1-6)Gluβ1-4(Xylα1-6)Glu,
Gluβ1-4(Xylα1-6)Gluβ1-4(Xylα1-6)Gluβ1-4Glu,
(Xylα1-6)Gluβ1-4Gluβ1-4(Xylα1-6)Gluβ1-4Glu,
Gluβ1-4(Xylα1-6)Gluβ1-4Gluβ1-4(Xylα1-6)Glu, and
(Xylα1-6)Gluβ1-4Gluβ1-4Gluβ1-4(Xylα1-6)Glu.

Some embodiments of the present disclosure provide synthetic oligosaccharides having a backbone containing mannose monomers, wherein each mannose monomer is optionally bonded to a pendant galactose monomer, and wherein the total number of monomers in the synthetic oligosaccharide ranges from 3 to 30. Such synthetic oligosaccharides can be obtained, for example, by depolymerizing galactomannan according to the methods described herein. Galactomannan, produced by sources such as *Aspergillus* molds, contains a β1-4 mannose backbone with frequent α1-6 galactose branches containing a single unit (34).

In some embodiments, the synthetic oligosaccharide is selected from a compound set forth in Table 5-9 below. In some embodiments, the synthetic oligosaccharide is selected from a group consisting of any 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 of the following compounds:
Manβ1-4Manβ1-4Man,
(Galα1-6)Manβ1-4Man,
Manβ1-4(Galα1-6)Man,
Manβ1-4Manβ1-4Manβ1-4Man,
Manβ1-4(Galα1-6)Manβ1-4Man,
(Galα1-6)Manβ1-4Manβ1-4Man,
Manβ1-4Manβ1-4(Galα1-6)Man,
(Galα1-6)Manβ1-4(Galα1-6)Man,
Manβ1-4[Manβ1-4]₃Man,
(Galα1-6)Manβ1-4Manβ1-4Manβ1-4Man,
Manβ1-4(Galα1-6)Manβ1-4Manβ1-4Man,
Manβ1-4Manβ1-4(Galα1-6)Manβ1-4Man,
Manβ1-4Manβ1-4Manβ1-4(Galα1-6)Man,
(Galα1-6)Manβ1-4Manβ1-4(Galα1-6)Man,
(Galα1-6)Manβ1-4(Galα1-6)Manβ1-4Man,
Manβ1-4[Manβ1-4]₄Man,
(Galα1-6)Manβ1-4Manβ1-4Manβ1-4Manβ1-4Man,
Manβ1-4(Galα1-6)Manβ1-4Manβ1-4Manβ1-4Man,
Manβ1-4Manβ1-4(Galα1-6)Manβ1-4Manβ1-4Man,
Manβ1-4Manβ1-4Manβ1-4(Galα1-6)Manβ1-4Man,
Manβ1-4Manβ1-4Manβ1-4Manβ1-4(Galα1-6)Man,
(Galα1-6)Manβ1-4Manβ1-4Manβ1-4Manβ1-4Man,
Manβ1-4(Galα1-6)Manβ1-4Manβ1-4Manβ1-4Man,
Manβ1-4Manβ1-4(Galα1-6)Manβ1-4Manβ1-4Man,
Manβ1-4Manβ1-4Manβ1-4(Galα1-6)Manβ1-4Man,
Manβ1-4Manβ1-4Manβ1-4Manβ1-4Manβ1-4(Galα1-6)Man
Manβ1-4[Manβ1-4]₅Man,
Manβ1-4[Manβ1-4]₆Man, and
Manβ1-4[Manβ1-4]₇Man.

Some embodiments of the present disclosure provide synthetic oligosaccharides containing mannose monomers and glucose monomers, wherein the total number of monomers in the synthetic oligosaccharide ranges from 3 to 30. Such synthetic oligosaccharides can be obtained, for example, by depolymerizing glucomannan according to the methods described herein. Glucomannan is a polysaccharide largely known to be found in konjac root. The polymer contains β1-4-linked glucose and mannose residues that are thought to be randomly distributed in a non-reoccurring pattern (38).

In some embodiments, the synthetic oligosaccharide is selected from a compound set forth in Table 5-8 below. In some embodiments, the synthetic oligosaccharide is selected from a group consisting of any 1, 2, 3, 4, 5, 6, 7, 8, 9, 10, 11, 12, 13, 14, 15, 16, 17, 18, 19, 20, 21, 22, 23, 24, 25 of the following compounds:
Manβ1-4Manβ1-4Man,
Glcβ1-4Manβ1-4Man,
Manβ1-4Glcβ1-4Man,
Manβ1-4Manβ1-4Glc,
Glcβ1-4Glcβ1-4Man,
Glcβ1-4Manβ1-4Glc,
Manβ1-4Glcβ1-4Glc,
Manβ1-4Manβ1-4Manβ1-4Man,
Glcβ1-4Manβ1-4Manβ1-4Man,
Glcβ1-4Glcβ1-4Manβ1-4Man,
Glcβ1-4Manβ1-4Glcβ1-4Man,
Glcβ1-4Manβ1-4Manβ1-4Glc,
Glcβ1-4Glcβ1-4Glcβ1-4Man,
Glcβ1-4Glcβ1-4Manβ1-4Glc,
Glcβ1-4Manβ1-4Glcβ1-4Glc,
Manβ1-4Glcβ1-4Manβ1-4Man,
Manβ1-4Manβ1-4Glcβ1-4Man,
Manβ1-4Manβ1-4Manβ1-4Glc,
Manβ1-4Glcβ1-4Glcβ1-4Man,
Manβ1-4Glcβ1-4Manβ1-4Glc,
Manβ1-4Manβ1-4Glcβ1-4Glc,
Manβ1-4Glcβ1-4Glcβ1-4Glc,
Manβ1-4[Manβ1-4]₃Man,
Manβ1-4[Manβ1-4]₄Man, and
Manβ1-4[Manβ1-4]₅Man.

Some embodiments of the present disclosure provide synthetic oligosaccharides having a backbone containing arabinose monomers, wherein each arabinose monomer is optionally bonded to a pendant arabinose monomer, and wherein the total number of monomers in the synthetic oligosaccharide ranges from 3 to 30. Such synthetic oligosaccharides can be obtained, for example, by depolymerizing arabinan according to the methods described herein. Arabinans exist as sidechains on the pectin polysaccharide rhamnogalacturonan I and also in the cell walls of some mycobacteria (37). Arabinan contains an α1-5 arabinose backbone with short α1-3 arabinose branches.

In some embodiments, the synthetic oligosaccharide is selected from a compound set forth in Table 5-12 below. In some embodiments, the synthetic oligosaccharide is selected from a group consisting of any 1, 2, 3, 4, 5, 6, or 7 of the following compounds:
Araα1-5Araα1-5Ara,
(Araα1-3)Araα1-5Ara,
Araα1-5(Araα1-3)Ara, Araα1-5Araα1-5Araα1-5Ara,
(Araα1-3)Araα1-5Ara1-5Ara,
Araα1-5(Araα1-3)Ara1-5Ara, and
Araα1-5Ara1-5(Araα1-3)Ara.

β-Glucans found in cereals (e.g., rice, wheat, oat, bran, barley, and malt), for example, consist of a β1-4 linked glucose backbone with single β1-3 glucose residues dispersed between every 2-3 β1-4 linked glucose residues (31). Lichenan is a polysaccharide found in lichen, having a structure is similar to β-glucan where the linkages consist of β1-4 and β1-3 glucose residues (32). However, unlike β-glucan, lichenan has much more frequent β1-3 linkages.

In some embodiments, the synthetic oligosaccharide is selected from a compound set forth in Table 5-6 or Table 5-7 below. In some embodiments, the synthetic oligosaccharide is selected from a group consisting of any 1, 2, 3, 4, 5, 6, 7, 8, 9, 10, 11, 12, 13, 14, 15, 16, or 17 of the following compounds:
  Glcβ1-4Glcβ1-3Glc,
  Glcβ1-3Glcβ1-4Glc,
  Glcβ1-3Glcβ1-4Glc1-4Glc,
  Glcβ1-4Glcβ1-3Glc1-4Glc,
  Glcβ1-4Glcβ1-4Glc1-3Glc,
  Glcβ1-3Glcβ1-4Glc1-3Glc
  Glcβ1-3Glcβ1-4Glc1-3Glc,
  Glcβ1-3Glcβ1-4Glc1-4Glc1-4Glc,
  Glcβ1-4Glcβ1-3Glc1-4Glc1-4Glc,
  Glcβ1-4Glcβ1-4Glc1-3Glc1-4Glc,
  Glcβ1-4Glcβ1-4Glc1-4Glc1-3Glc,
  Glcβ1-3Glcβ1-4Glc1-4Glc1-4Glc1-4Glc,
  Glcβ1-4Glcβ1-3Glc1-4Glc1-4Glc1-4Glc,
  Glcβ1-4Glcβ1-4Glc1-3Glc1-4Glc1-4Glc,
  Glcβ1-4Glcβ1-4Glc1-4Glc1-3Glc1-4Glc,
  Glcβ1-3Glcβ1-4Glc1-4Glc1-4Glc1-3Glc, and
  Glcβ1-4Glcβ1-4Glc1-4Glc1-4Glc1-3Glc.

Some embodiments of the present disclosure provide synthetic oligosaccharides having a backbone containing xylose monomers, wherein each xylose monomer is optionally bonded to a pendant arabinose monomer or a pendant gluronic acid (e.g., a 4-0 methylated GlcA), and wherein the total number of monomers in the synthetic oligosaccharide ranges from 3 to 30. Such synthetic oligosaccharides can be obtained, for example, by depolymerizing xylan and/or arabinoxylan according to the methods described herein. Xylan is a polysaccharide commonly found in the secondary cell walls of dicots and in the cell walls of most grasses. The structure contains a β1-4 xylose backbone and often times contains α1-2 glucuronic acid branches, which may contain a single methyl group. In this experiment, beechwood xylan was used which is known to contain large amounts of 4-O-methyl-glucuronic acid branches (35). Arabinoxylan is a polysaccharide commonly found in cereals grains that contains a β1-4 xylose backbone with α1-2 and α1-3 arabinose branches (36).

In some embodiments, the synthetic oligosaccharide is selected from a compound set forth in Table 5-10 below. In some embodiments, the synthetic oligosaccharide is selected from a group consisting of any 1, 2, 3, 4, 5, 6, 7, 8, 9, 10, 11, 12, 13, 14, 15, 16, 17, 18, 19, 20, 21, 22, 23, or 24 of the following compounds:
  Xylβ1-4Xylβ1-4Xyl,
  Xylβ1-4Xylβ1-4Xylβ1-4Xyl,
  (OMe-4-GlcAα1-2)Xylβ1-4Xylβ1-4Xyl,
  Xylβ1-4(OMe-4-GlcAα1-2)Xylβ1-4Xyl,
  Xylβ1-4Xylβ1-4(OMe-4-GlcAα1-2)Xyl,
  Xylβ1-4[Xylβ1-4]₃Xyl,
  (OMe-4-GlcAα1-2)Xylβ1-4Xylβ1-4Xylβ1-4Xyl,
  Xylβ1-4(OMe-4-GlcAα1-2)Xylβ1-4Xylβ1-4Xyl,
  Xylβ1-4Xylβ1-4(OMe-4-GlcAα1-2)Xylβ1-4Xyl,
  Xylβ1-4Xylβ1-4Xylβ1-4(OMe-4-GlcAα1-2)Xyl,
  Xylβ1-4[Xylβ1-4]₄Xyl,
  (OMe-4-GlcAα1-2)Xylβ1-4[Xylβ1-4]₃Xyl,
  Xylβ1-4(OMe-4-GlcAα1-2)Xylβ1-4[Xylβ1-4]₂Xyl,
  Xylβ1-4Xylβ1-4(OMe-4-GlcAα1-2)Xylβ1-4Xylβ1-4Xyl,
  [Xylβ1-4]₃(OMe-4-GlcAα1-2)Xylβ1-4Xyl,
  [Xylβ1-4]₄(OMe-4-GlcAα1-2)Xyl,
  Xylβ1-4[Xylβ1-4]5Xyl,
  (OMe-4-GlcAα1-2)Xylβ1-4 [Xylβ1-4]₄Xyl,
  Xylβ1-4(OMe-4-GlcAα1-2)Xylβ1-4[Xylβ1-4]₃Xyl,
  Xylβ1-4Xylβ1-4(OMe-4-GlcAα1-2)Xylβ1-4[Xylβ1-4]₂ Xyl,
  [Xylβ1-4]3(OMe-4-GlcAα1-2)Xylβ1-4Xylβ1-4Xyl,
  [Xylβ1-4]₄(OMe-4-GlcAα1-2)Xylβ1-4Xyl,
  [Xylβ1-4]₅(OMe-4-GlcAα1-2)Xyl, and
  Xylβ1-4[Xylβ1-4]₆Xyl.

In some embodiments, the synthetic oligosaccharide is selected from a compound set forth in Table 5-11 below. In some embodiments, the synthetic oligosaccharide is selected from a group consisting of any 1, 2, 3, 4, 5, 6, 7, 8, 9, 10, 11, 12, 13, 14, or 15 of the following compounds:
  (Araα1-3)Xylβ1-4Xyl,
  Xylβ1-4(Araα1-3)Xyl,
  ((Araα1-2)(Araα1-3))Xyl,
  Xylβ1-4Xylβ1-4Xyl,
  (Araα1-3)Xylβ1-4Xylβ1-4Xyl,
  Xylβ1-4(Araα1-3)Xylβ1-4Xyl,
  Xylβ1-4Xylβ1-4(Araα1-3)Xyl,
  (Araα1-3)Xylβ1-4(Araα1-3)Xyl,
  ((Araα1-2)(Araα1-3))Xylβ1-4Xyl,
  Xylβ1-4((Araα1-2)(Araα1-3))Xyl,
  Xylβ1-4Xylβ1-4Xylβ1-4Xyl,
  Xylβ1-4[Xylβ1-4]3Xyl,
  Xylβ1-4[Xylβ1-4]4Xyl,
  Xylβ1-4[Xylβ1-4]5Xyl, and
  Xylβ1-4[Xylβ1-4]6Xyl.

Synthetic oligosaccharides can be also be obtained by depolymerizing homopolymer polysaccharides according to the methods described herein. As used herein, the term "homopolymer polysaccharide" refers to a polysaccharide containing repeating monosaccharide subunits of the same kind, linked together by the same type of glycosidic bond including, but not limited to, a combination of β1-3 bonds, β1-4 bonds, β1-6 bonds, al-3 bonds, α1-4 bonds, and α1-6 bonds. Examples of homo polymers include, but are not limited to, curdlan, galactan, and mannan. Homopolymers include, but are not limited to, curdlan (a linear polymer of β1-3 linked glucose found as an exopolysaccharide of *Agrobacterium;* 28), galactan (a linear polymer of β1-4 linked galactose that has been isolated in the form of arabinogalactan before subsequent arabinofuranosidase treatment to remove the arabinose units; 29), and mannan (a linear polymer of β1-3 linked glucose found as an exopolysaccharide of *Agrobacterium* and also some nuts; 30).

In some embodiments, the synthetic oligosaccharide is selected from a compound set forth in Table 5-3, Table 5-4, and Table 5-5 below. In some embodiments, the synthetic oligosaccharide is selected from a group consisting of any 1, 2, 3, 4, 5, 6, 7, 8, 9, 10, 11, 12, 13, 14, 15, 16, 17, or 18 of the following compounds:
  Glcβ1-3Glcβ1-3Glc,
  Glcβ1-3Glcβ1-3Glcβ1-3Glc,
  Glcβ1-3[Glcβ1-3]₃Glc,
  Glcβ1-3[Glcβ1-3]₄Glc, Galβ1-4Galβ1-4Gal,
Galβ1-4Galβ1-4Galβ1-4Gal,
Galβ1-4[Galβ1-4]$_3$Gal,
Galβ1-4[Galβ1-4]$_4$Gal,
Galβ1-4[Galβ1-4]$_5$Gal,
Galβ1-4[Galβ1-4]$_6$Gal,
Galβ1-4[Galβ1-4]$_7$Gal,
Manβ1-4Manβ1-4Man,
Manβ1-4Manβ1-4Manβ1-4Man,
Manβ1-4[Manβ1-4]$_3$Man,
Manβ1-4[Manβ1-4]$_4$Man,
Manβ1-4[Manβ1-4]$_5$Man,
Manβ1-4[Manβ1-4]$_6$Man, and
Manβ1-4[Manβ1-4]$_7$Man.

The synthetic oligosaccharides can be prepared by any suitable method including, but not limited to, Fenton's Initiation Toward Defined Oligosaccharide Groups (FITDOG) which is a method for the controlled degradation of polysaccharides into oligosaccharides. Exemplary FITDOG procedures are described, for example, in US Pat. Appl. Pub. No. 2018/0363016 A1, which is incorporated herein by reference in its entirety. In some embodiments, the crude polysaccharides first undergo initial oxidative treatment with the hydrogen peroxide and a transition metal or alkaline earth metal (e.g., iron(III) sulfate) catalyst to render the glycosidic linkages more labile. NaOH or other base is then used for base induced cleavage, which results in a variety of oligosaccharides. Immediate neutralization takes place to reduce the peeling reaction. This method has the ability to generate large amounts of biologically active oligosaccharides from a variety of carbohydrate sources.

If desired, the polysaccharide can be optionally treated with one or more polysaccharide-degrading enzyme to reduce the average size or complexity of the polysaccharide before the resulting polysaccharides are treated with the oxidative treatment and metal catalyst. Non-limiting examples of polysaccharide enzymes include for example, amylase, isoamylase, cellulase, maltase, glucanase, or a combination thereof.

The initial oxidative treatment can include hydrogen peroxide and a transition metal or an alkaline earth metal. Metals with different oxidation states, sizes, periodic groups, and coordination numbers have been tested to understand the application with the FITDOG process. Each of the different metals has shown activity in the FITDOG reaction. While these metals work with any polysaccharide, different metals can be used to produce oligosaccharides with preferential degrees of polymerization. The oxidative treatment is followed by a base treatment. The method is capable of generating oligosaccharides from polysaccharides having varying degrees of branching, and having a variety of monosaccharide compositions, including natural and modified polysaccharides.

Also provided are mixtures containing two or more different synthetic oligosaccharides as described herein. Unpurified or semi-purified depolymerization products may be used for preparation of oligosaccharide mixtures or, alternatively, oligosaccharides can be purified to produce specially formulated pools. The synthetic oligosaccharides in the mixtures may be obtained, for example, by depolymerizing a polysaccharide homopolymer, a polysaccharide heteropolymer or a combination thereof. In some embodiments, at least one of the synthetic oligosaccharides in the mixture is obtained via depolymerization of xyloglucan, curdlan, galactan, mannan, lichenan, β-glucan, glucomannan, galactomannan, arabinan, xylan, arabinoxylan, or a combination thereof. The compositions may include any number of synthetic oligosaccharides as set forth in Tables 4-1, 5-3, 5-4, 5-5, 5-6, 5-7, 5-8, 5-9, 5-10, 5-11, and 5-12. In some embodiments, the amount of at least one of the synthetic oligosaccharides in the mixture is at least 1%, based on the total amount of oligosaccharides in the mixture. The synthetic oligosaccharide may be present, for example, in an amount ranging from about 1% to about 99%, or from about 5% to about 95%, or from about 10% to about 90%, or from about 20% to about 80%, or from about 30% to about 70%. The synthetic oligosaccharide may be present, for example, in an amount ranging from about 1% to about 10%, or from about 10% to about 20%, or from about 20% to about 30%, or from about 30% to about 40%, or from about 40% to about 50%, or from about 50% to about 60%, or from about 60% to about 70%, or from about 70% to about 80%, or from about 80% to about 90%, or from about 90% to about 99%. The percentage may be a mol %, based on the total number of moles of oligosaccharides in the mixture, or a weight %, based on the total weight of oligosaccharides in the mixture. In some embodiments, the amount of at least one of synthetic oligosaccharides is at least 5 mol %.

As used herein, the terms "about" and "around" indicate a close range around a numerical value when used to modify that specific value. If "X" were the value, for example, "about X" or "around X" would indicate a value from 0.9X to 1.1X, e.g., a value from 0.95X to 1.05X, or a value from 0.98X to 1.02X, or a value from 0.99X to 1.01X. Any reference to "about X" or "around X" specifically indicates at least the values X, 0.9X, 0.91X, 0.92X, 0.93X, 0.94X, 0.95X, 0.96X, 0.97X, 0.98X, 0.99X, 1.01X, 1.02X, 1.03X, 1.04X, 1.05X, 1.06X, 1.07X, 1.08X, 1.09X, and 1.1X, and values within this range.

The synthetic oligosaccharides and compositions described herein are useful as synbiotics, prebiotics, immune modulators, digestion aids, food additives, pharmaceutical excipients, or analytical standards. The synthetic oligosaccharides can be combined with other ingredients to produce foodstuffs and supplements including infant formula, geriatric supplements, baking flours, and snack foods. The synthetic oligosaccharides can be combined with beneficial bacteria to form synbiotics. The synthetic oligosaccharides can also be used as pharmaceutical products.

The synthetic oligosaccharides can be used as for growth or maintenance of specific microorganism in humans, other mammals, or in the rhizosphere of plants. The synthetic oligosaccharides may contain specific glycosidic linkages not able to be digested by the particular host (e.g., a person, livestock animal, or companion animal) but able to be metabolized by specific groups of commensal microorganism or probiotics. As such, the synthetic oligosaccharides can function as a carrier to transport exogenous microorganisms (probiotic or bio therapeutic) to a specific niche, or as a nutritional source for microorganisms already present in the host.

Xyloglucan can be used for the selective growth of specific *Bacteroides* species, like *B. ovatus* (39). It has been demonstrated that the xyloglycan utilization loci, with glycoside hydrolase genes, belongs to the families GH5 and GH31 which can be found in *B. ovatus*. The presence of these genes allow the growth of this species when used as a sole carbon source. Other major *Bacteroides* species in the gut like *B. thetaiotaomicron, B. caccae* or *B. fragilis*, lack this loci or part of it in their genomes, and, thusly, are unable to metabolize xyloglucan.

Curdlan can be used for the selective growth of specific *Bacteroides* species, like *B. thetaiotaomicron* or *B. distasonis*, when their genomes encode a specific type of glycoside hydrolase belonging to the family GH16. Orthologs of this gene are absent in the genomes of other *Bacteroides* species like *B. caccae* or *B. ovatus*, and are unable to grow on curdlan (40).

β-glucan or lichenin can be used for the selective growth of specific *Bacteroides* species, like *B. ovatus*. This species encodes in its genome a specific type of GH16, with β1-3,4 glucan activity (41). It has been demonstrated that this polysaccharides enhances the growth of species of Firmicutes like *Enterococcus faecium, Clostridium perfingens, Roseburia inulinivorans*, and *R. faecis* (42, 43).

Galactan can select for the growth of specific *Bacteroides* species, such as *B. thetaiotaomicron, B. dorei* and *B. ovatus*. Different types of endo-galactanases can be responsible for this selective growth, which belong to the families GH53 and GH147 (44; 45). The ability to consume galactan has also been described in some Bifidobacterial species (*Bif. breve, Bif. longum, Bif. long* subsp. *Infantis*) (46)

Mannan can selectively growth specific *Bacteroides* species, like *B. fragilis* or *B. ovatus*, which encode a GH26 endo-β 1-4-mannosidase (48). This gene is absent in the genome of major intestinal species like *B. thetaiotamicron*, which are unable to grow on mannan or glucomannan. *R. intestinalis* and *R. faecis* can deplete mannan linkages (49), as well as members of *Clostridium* cluster XIVa (47, 43), with GH26 encoded in their genomes. Also, GH26 has been characterized in specific species of Bifidobacteria, such as *Bif. adolescentis* (50), confirming the ability of this species to grow on mannan. Galactomannan is consumed only by microorganism that encode endo-β 1-4-mannosidase GH26 and alpha-galactosidase GH27 in their genomes, like *B. ovatus, B. xylanisolvens* (51) or *Roseburia intestinalis* (47, 49).

Xylan, arabinan and arabinoxylan can be used to selectively grow specific species of *Bacteroides*. Xylan can be metabolized by *B. ovatus* and *B. uniformis*, while *B. thetaiotaomicron* or *B. caccae* are unable to grow in this substrate. Arabinan promotes the growth of *B. thetaiotaomicron* and *B. ovatus*, while arabinoxylan shows high selection for *B. ovatus* growth (52, 47). It has been shown that strains of *R. intestinalis*, E. rectale and *R. faecis* can consume xylan or arabinoxylan as the sole carbon source (47, 43). Certain bifidobacteria have the capacity to ferment xylan or arabinofuranosyl-containing oligosaccharides. Selective growth of *B. adolescentis* on xylose and arabinoxylan derived glycans was shown in vitro (53). Also, additional experiment confirmed that *B. longum* subsp. *longum* was also able to metabolize arabinoxylan (54)

II. EXAMPLES

Example 1. Materials and Methods

Experimental Materials. Sodium acetate, hydrogen peroxide ($H_2O_2$), sodium hydroxide (NaOH), sodium borohydride ($NaBH_4$), iron(III) sulfate pentahydrate ($Fe_2(SO_4)_3$), and glacial acetic acid were purchased from Sigma-Aldrich (St. Louis, MO). Amylopectin was obtained from Carbosynth (Compton, UK). Amylose, xyloglucan, arabinoxylan, xylan, glucomannan, galactomannan, mannan, curdlan, galactan, β-glucan, arabinan, and lichenan were purchased from Megazyme (Bray, Ireland). Microcrystalline cellulose was purchased from ACROS Organics. Formic Acid (FA) was purchased from Fisher Scientific (Belgium, UK). Acetonitrile (HPLC grade) was purchased from Honeywell (Muskegon, MI). Nanopure water was used for all experiments.

Generation of Oligosaccharides via Fenton's Initiation Towards Defined Oligosaccharide Groups (FITDOG). A solution was prepared containing 95% (v/v) 40 mM sodium acetate buffer adjusted to pH 5 with glacial acetic acid, 5% (v/v) hydrogen peroxide (30% v/v), and 65 nM iron(III) sulfate. This mixture was vortexed and added to dry polysaccharide standards to make a final solution of 1 mg/ml. The reaction was incubated at 100° C. for one hour. The reaction was quenched by adding half of the reaction volume of cold 2 M NaOH. Glacial acetic acid was added for neutralization.

Oligosaccharides were reduced by incubation with 1 M $NaBH_4$ for one hour at 65° C. Oligosaccharides were isolated using nonporous graphitized carbon cartridges. Cartridges were washed with 80% acetonitrile and 0.1% (v/v) TFA in water. The oligosaccharides were loaded and washed with five column volumes of water. The oligosaccharides were eluted with 40% acetonitrile with 0.05% (v/v) TFA. Samples were completely dried by evaporative centrifugation and stored at −20° C. until analysis.

Sample Preparation for Fecal Fingerprinting. To separate the endogenous oligosaccharides from the polysaccharides, pear and feces samples underwent 80% ethanol precipitation overnight at −80° C. Samples were centrifuged at 3000 rpm for 20 minutes to pellet the polysaccharide fraction and partition it from the endogenous oligosaccharides in the supernatent. The pelleted fraction underwent FITDOG treatment to generate representative oligosaccharides. Oligosaccharides from the FITDOG treatment were reduced and purified using the protocol described in the section above.

MALDI MS Analysis. For analysis by MALDI-MS, 1 μl was plated directly onto a stainless steel MALDI plate. To this, 0.3 μl of 0.01M NaCl and 0.7 μl of 25 mg/ml 2, 5-dihydroxybenzoic acid was added and mixed within the pipet tip. The samples were dried under vacuum and analyzed on a Bruker UltraFlextreme MALDI-tandem time-of-flight (MALDI-TOF/TOF) instrument. The instrument was operated in positive mode and 95% of max laser power.

Nano-HPLC-chip/Q-TOF Analysis. Samples were reconstituted in nano-pure water before analysis by nano-HPLC-chip/Q-TOF MS. The system includes two pumps, a capillary pump for sample loading and a nano pump for analytical separation. In this system, an Agilent 1200 series HPLC is coupled to an Agilent 6520 Q-TOF mass spectrometer through a chip cube interface. The chip contains a 40 nl enrichment column, and a 75 μm×43 mm analytical column; both columns have PGC as the stationary phase. Sample loading was done with 3% (v/v) acetonitrile/water+0.1% formic acid at a flow rate of 4 μl/min. Chromatographic separation was performed with a binary gradient of solvent A: (3% (v/v) acetonitrile/water+0.1% formic acid) and solvent B: (90% acetonitrile/water+0.1% formic acid) with a flow rate of 0.4 μl/min. The gradient was run for 60 minutes, 1-5% B, 0-2 min; 5-30%, 2-33 min; 30-99%, 33-38 min; 99-99%, 38-48 min; 99-1%, 48-50 min; 1-1%, 50-60 min before starting the next run.

Data were collected in the positive mode and calibrated with internal calibrant ions ranging from m/z 118.086 to 2721.895. Drying gas was set to 325° C. and with a flow rate of 5 l/min. The fragment, skimmer, and Octapole 1 RF voltages were set to 175, 60, and 750 V, respectively. Fragmentation was performed at a rate of 0.63 spectra/second. The collision energy was based upon the compound mass and expressed by the linear function (Collision Energy)=1.8*(m/z)-2.4.

HPLC Q-TOF Analysis. Samples were reconstituted in nano-pure water before HPLC Q-TOF MS analysis. The analytical separation was carried out using an Agilent 1260 Infinity II HPLC coupled to an Agilent 6530 Accurate-Mass Q-TOF MS. Chromatographic separation was performed on a 150 mm×1 mm Hypercarb column from Thermo Scientific with a 5 μm particle size. A binary gradient was employed which consisted of solvent A: (3% (v/v) acetonitrile/water+ 0.1% formic acid) and solvent B: (90% acetonitrile/water+ 0.1% formic acid). A 45 min gradient with a flow rate of 0.150 mL/min was used for chromatographic separation: 3-25% B, 0-15 min; 25-25% B, 15-18 min; 25-99% B, 18-30 min; 99-99% B, 30-32 min; 99-3% B, 32-34 min; 3-3% B, 34-45 min. Samples were run in the positive mode. Internal calibrant ions ranged from m/z 121.051 to m/z 2421.914. Drying gas temperature and flow rate were set to 150° C. and 11 l/min, respectively. Operation voltages for the fragment, skimmer, and octupole 1 RF were 175, 60, and 750 V, respectively. The acquisition rate was set to 0.63 spectra/second. When fragmentation was used, the linear function, Collision Energy=1.45*(m/z)−3.5, was employed.

Infant Fecal Samples. The fecal sample was collected from a healthy, term 6-month-old infant who completed the UC Davis Infant Microbiome Nutrition and Development (Infant MiND) Study. The infant was exclusively breastfed at enrollment. The infant was assigned to consume pear (Earth's Best Stage 1) concurrently with breast milk for seven days. After seven days, parents were instructed to scrape the soiled diaper with sterile utensils, to place the fecal samples into sterile tubes, and to seal and store the samples in their kitchen freezers. The fecal samples were transported back to University of California Davis campus on dry ice and stored in −80° C. before being analyzed. The University of California Davis Institutional Review Board approved all aspects of this study and written informed consent was obtained from the participants. This study was registered on clinicaltrials.gov (NCT01817127).

Monosaccharide Analysis. Monosaccharides were analyzed in the manner of Amicucci et al.[24] Briefly, the oligosaccharides were hydrolyzed using trifluoroacetic acid (TFA) and derivatized with 3-methyl-1-phenyl-pyrazoline-5-one (PMP). The derivatized oligosaccharides were extracted twice with chloroform and water and analyzed by UHPLC/QqQ MS as described by Xu et al.[25]

Glycosidic Linkage Analysis. Glycosidic linkages were analyzed in the manner of Galermo et al.[26] Briefly, the oligosaccharides were first permethylated with iodomethane in the presence of sodium hydroxide and dimethylsulfoxide. The permethylated oligosaccharides were extracted with water and DCM to remove the dimethylsulfoxide. Next, the oligosaccharides were hydrolyzed with TFA and derivatized with PMP. The partially permethylated monosaccharides were then analyzed by UHPLC-QqQ MS under the same conditions described by Galermo et al.[26]

Example 2. Production of Oligosaccharides by FITDOG

A polysaccharide with a known structure, xyloglucan, was used to determine the characteristics of the method. Xyloglucan was comprised of a β(1>4) backbone with frequent β(1>6) xylose branches that were often terminated with a single β(1>2) galactose residue.[13,30-32] The reaction of xyloglucan yielded over 20 structurally unique oligosaccharides as determined by nano-HPLC-chip/Q-TOF MS. The most abundant oligosaccharides are shown in FIG. 1A.

The nanoLC-MS profile of xyloglucan oligosaccharides ranged from disaccharides to hexasaccharides. To obtain the chromatogram, the product mixture was first reduced using sodium borohydride to yield an alditol if a reducing sugar were present. The mixture was enriched and purified as described in the Methods Section. The accurate mass analysis and tandem MS of the products indicated that the reaction produced primarily intact oligosaccharide species. The fragmentation mass spectra obtained through CID were interpreted and yielded the inset structures in FIG. 1A. A combination of oligosaccharides with several degrees of polymerization (DP) were present in the chromatograms. The relatively small numbers of oligosaccharides indicated a degree of specificity in the FITDOG reaction.

Figure 1B:
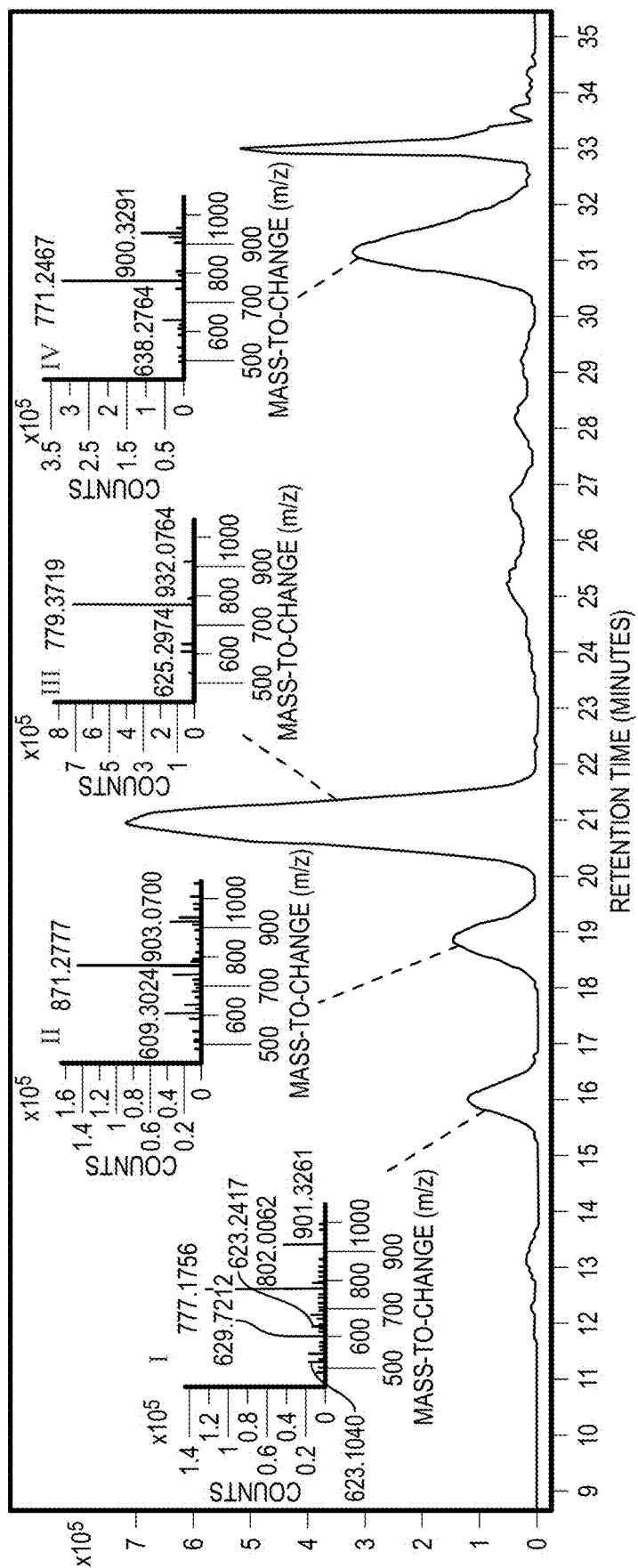
Figure 1C:
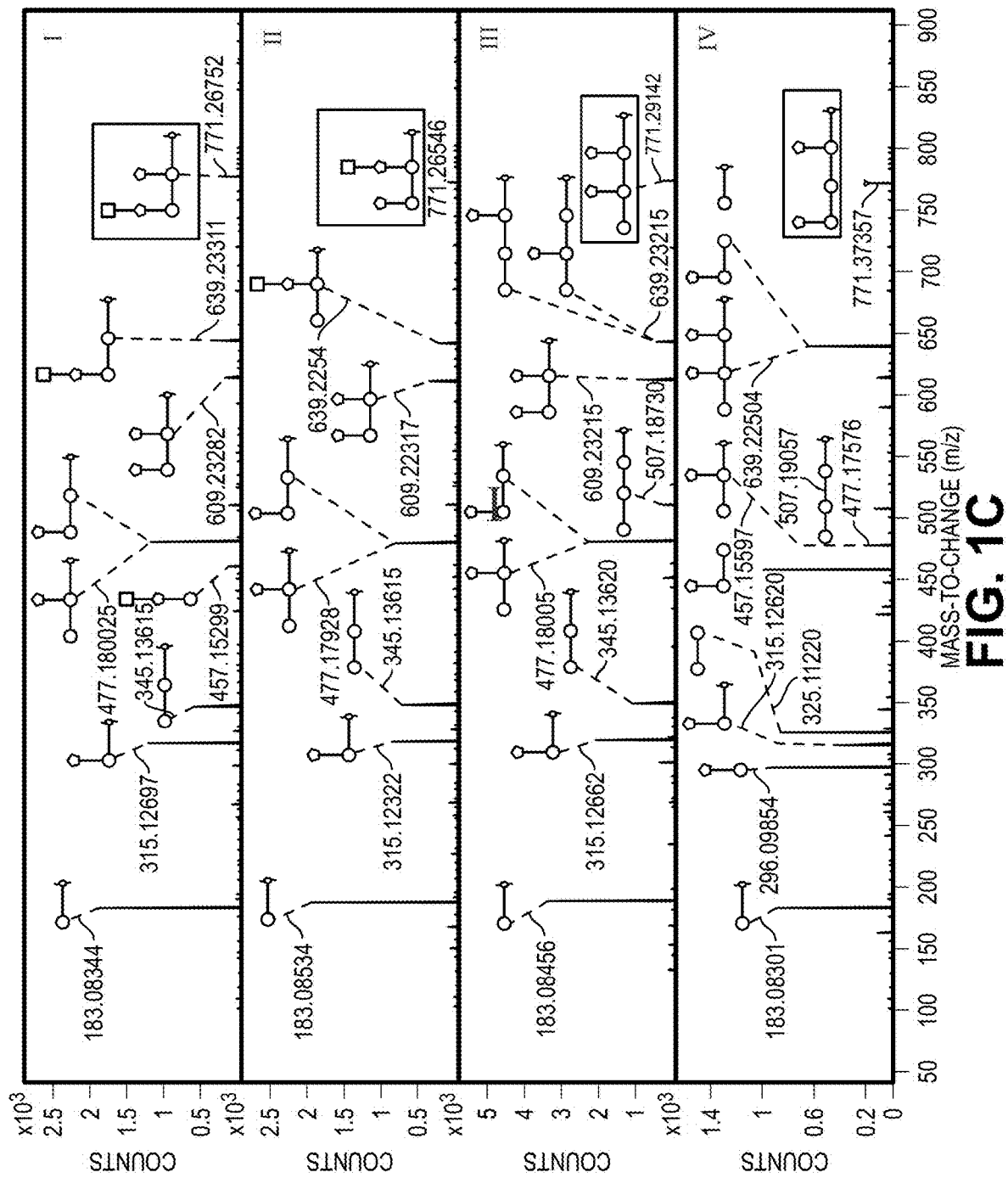

While DP can be obtained from the accurate masses, structural information requires tandem MS. Isomers, which have the same DP but different structures, were also present for several DP and were elucidated as follows. Four isomers with the composition, three hexoses, two pentoses (m/z 771.27) were observed at 16.0, 18.9, 21.0, and 31.2 minutes, respectively (FIG. 1B). These isomers were distinguishable by their MS/MS spectra (FIG. 1C). The compounds eluting at 16.0 (I) and 18.9 (II) minutes were determined to contain a 2Hex backbone, due to the lack of a peak representing three hexoses with a reducing monosaccharide (m/z 507.19), as well as the presence of a peak representing two hexoses without a reducing monosaccharide (m/z 325.11). Both isomers contained the peak representing two hexoses, two pentoses, and a reducing end (m/z 609.22), but no peak were present representing two pentoses without a reducing end (m/z 265.09). This suggested that there is one pentose branching from each hexose. Because the backbone contained only two hexoses, the remaining hexose must have been extended from one of the pentoses. Isomer (I) showed a peak representing two hexoses, one pentose, with no reducing end (m/z 457.15), which localized the remaining hexose to the pentose that is not located on the reducing end hexose. Isomer (II) lacks the fragment with m/z 457.15, which localized the remaining hexose to the pentose connected to the reducing end hexose. The final two isomers at 21.0 (III) and 31.2 (IV) minutes both showed a strong peak corresponding to three hexoses with one reducing end (m/z 507.19), which suggested that all three hexoses make up the oligosaccharide backbone. Both isomers also showed an abundant peak representing one hexose, one pentose, and a reducing end (m/z 315.13), which provided evidence of one pentose branching from the reducing end. Finally, the remaining pentose must be branched from one of the two non-reducing end hexoses. Isomer (III) showed a peak that corresponded to two hexoses, two pentoses, and a reducing end (m/z 609.22), which suggested that the second pentose was localized on the hexose adjacent to the reducing end hexose. Isomer (IV) lacked the fragment m/z 609.22 and thus, the second pentose was assigned to the hexose farthest from the reducing end. This rigorous approach was employed to characterize all of the oligosaccharides shown in this report. In accordance with the known structure of xyloglucan, the derived oligosaccharides were found to be primarily composed of hexose backbones with frequent pentose branches that were occasionally terminated by a hexose.

Figure 2A:
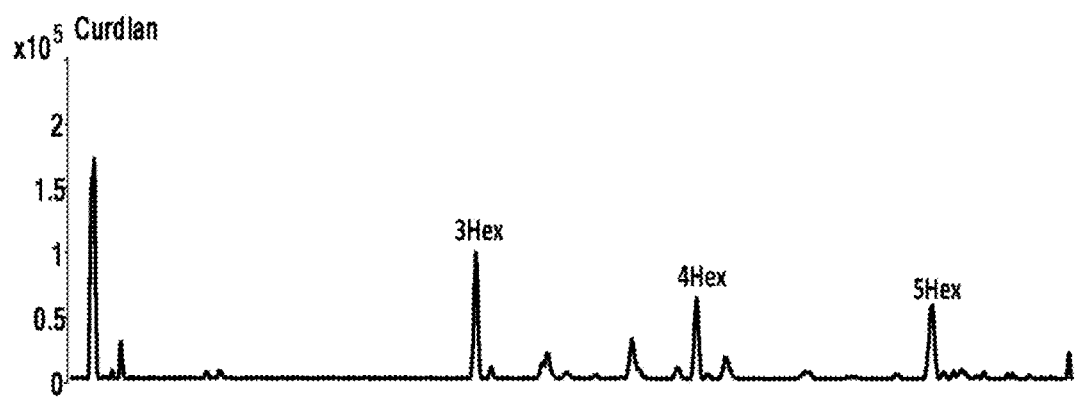
FIGS. 2A-2N show annotated base peak chromatograms of oligosaccharides derived from polysaccharide standards: a) curdlan, b) cellulose, c) β-glucan, d) lichenan, e) galactan, f) mannan, g) glucomannan, h) galactomannan, i) arabinan, j) xylan, k) arabinoxylan, l) amylose, m) amylopectin, and n) xyloglucan.
Figure 2B:
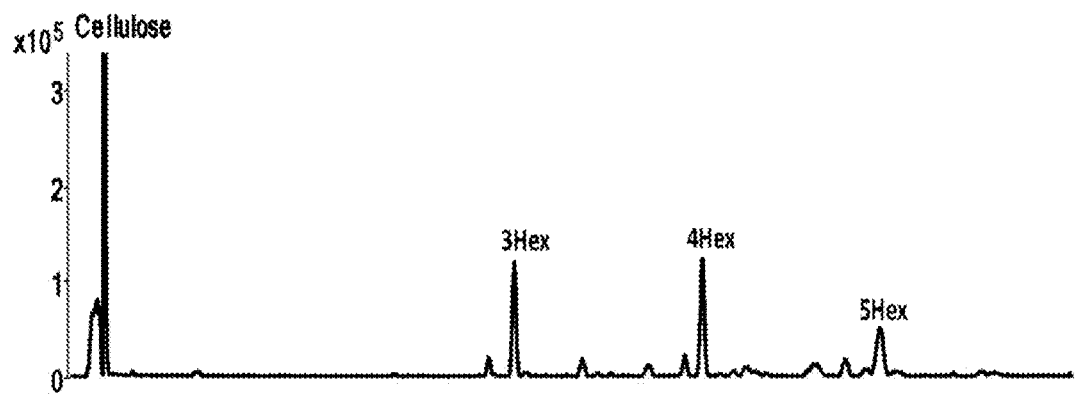
Figure 2C:
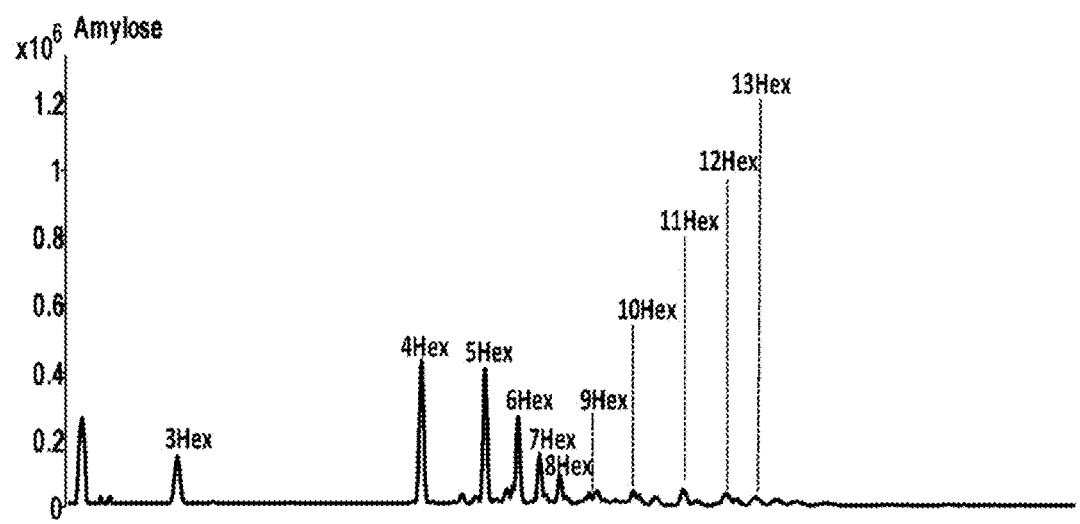
Figure 2D:
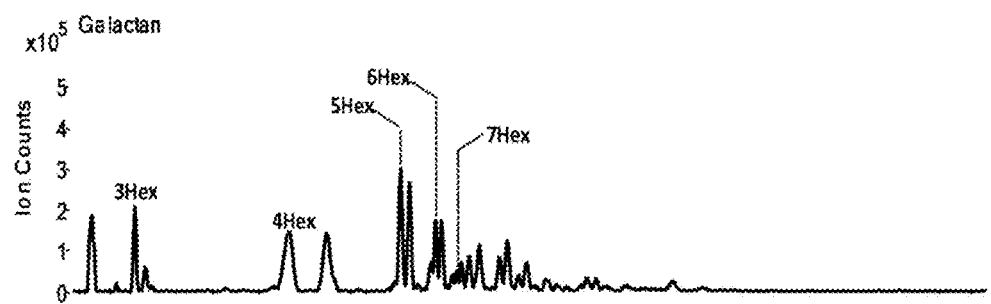
Figure 2E:
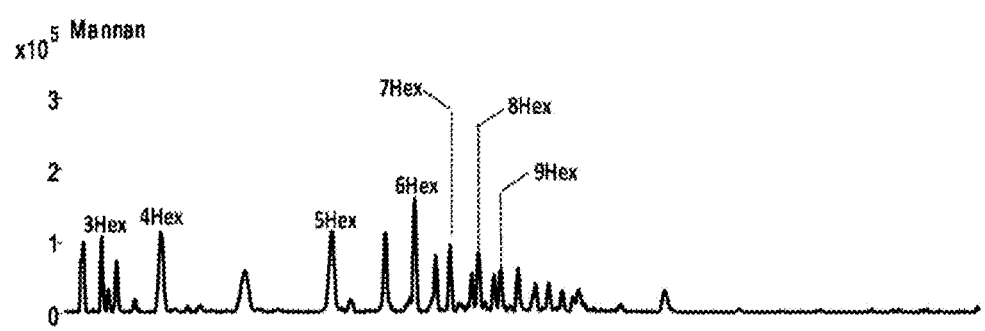
Figure 2F:
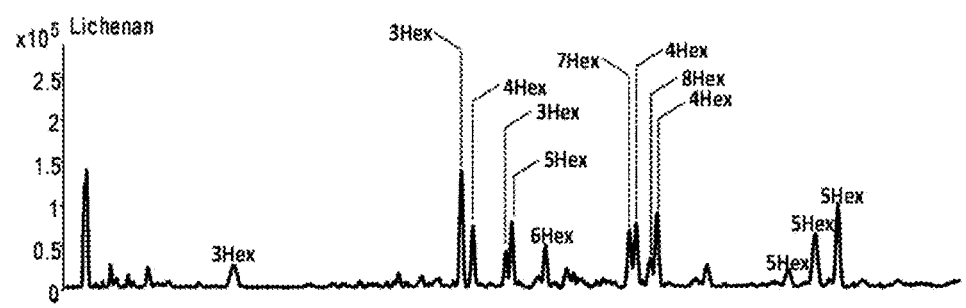
Figure 2G:
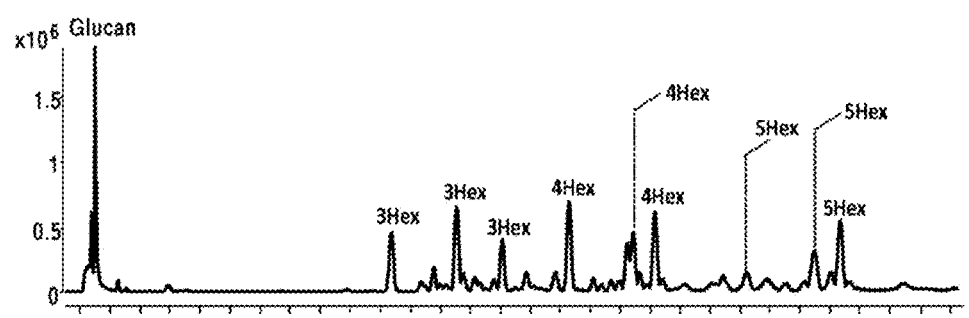
Figure 2H:
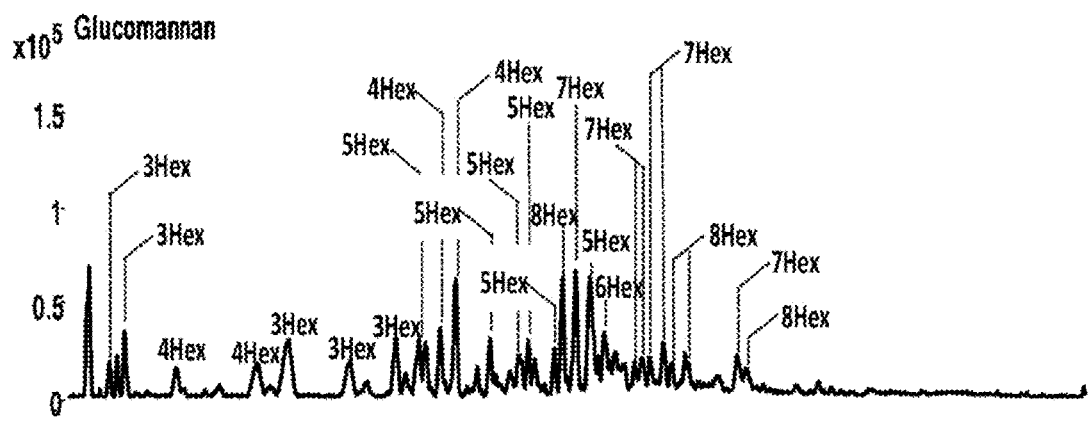
Figure 2I:
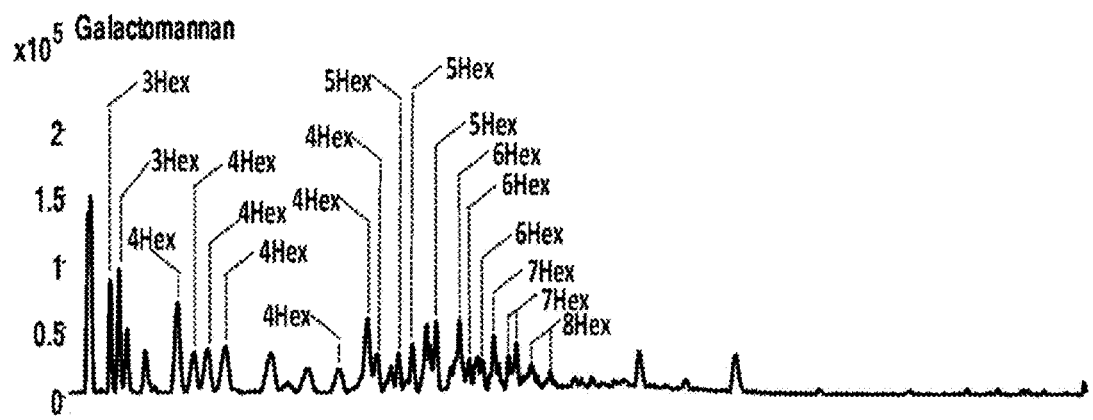
Figure 2J:
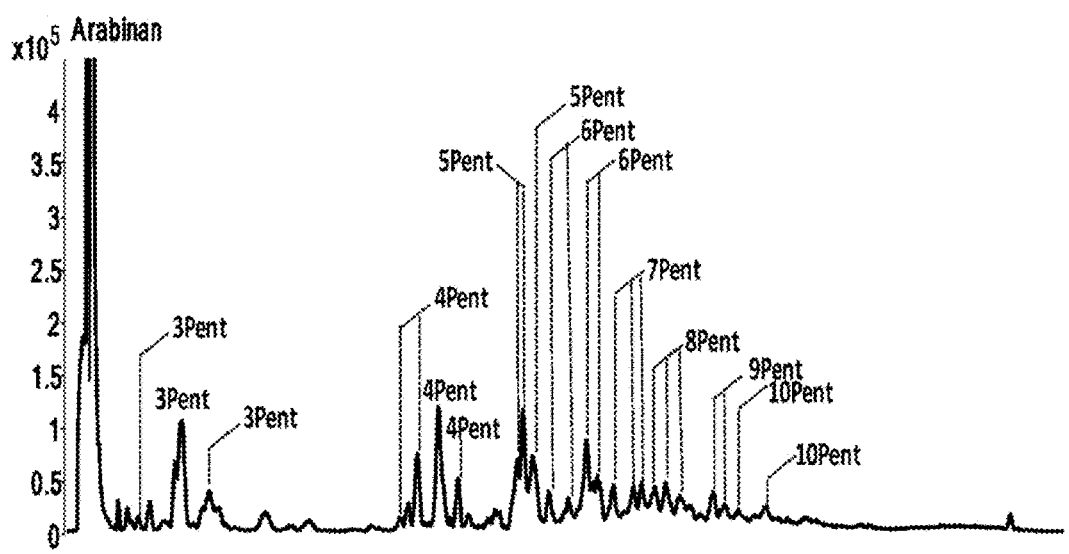
Figure 2K:
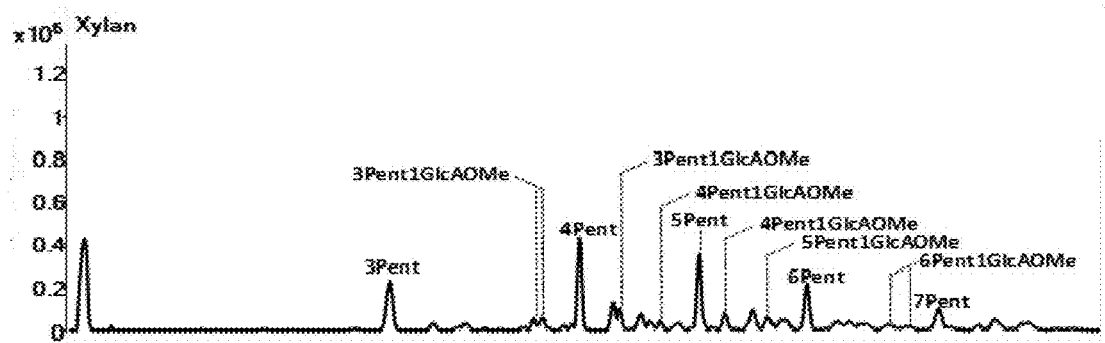
Figure 2L:
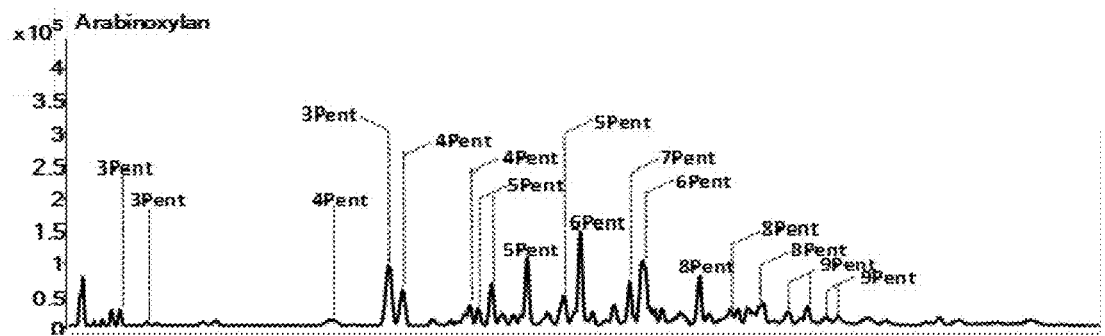
Figure 2M:
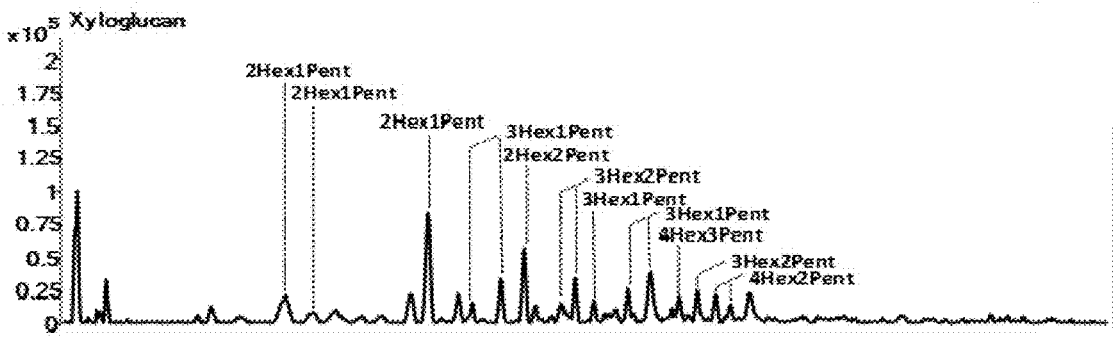
Figure 2N:
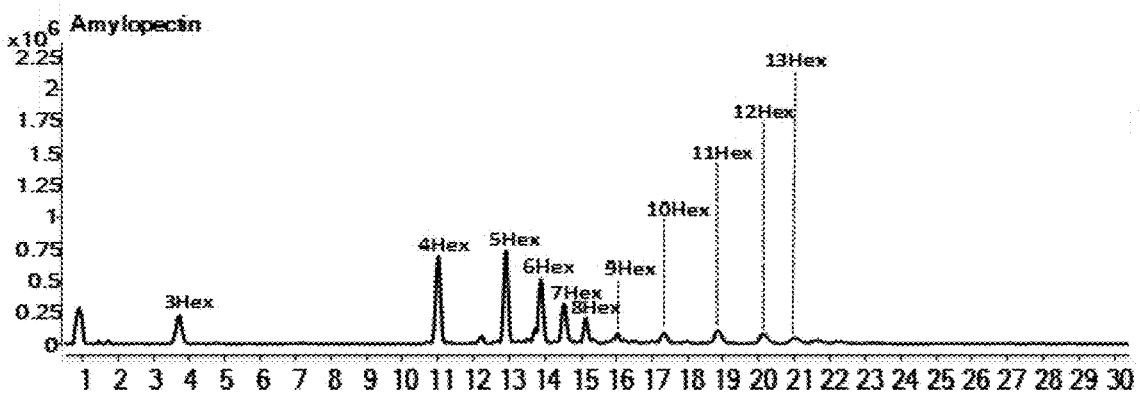

Other polysaccharide standards were also subjected to FITDOG and all yielded representative oligosaccharides (FIGS. 2A-2N). The polysaccharide standards were composed of many monosaccharide combinations, linkage types, and branching patterns. Some contained monosaccharide modifications. The standards included amylose, amylopectin, cellulose, curdlan, lichenan, β-glucan, arabinan, xylan, arabinoxylan, mannan, galactomannan, glucomannan, galactan, and xyloglucan. Annotated chromatograms for each polysaccharide after treatment with FITDOG are shown in FIGS. 2A-2N. Prominent peaks were labeled with the DP and an abbreviation of their monosaccharide components (Hexose/Hex, Pentose/Pent, Hexuronic Acid/HexA).

Among the simplest group of polysaccharides were homopolysaccharides, which are composed of a single monosaccharide and glycosidic linkage. The resulting oligosaccharides from these polysaccharides are expected and were observed to have one structure per DP. For example, curdlan, a linear β(1→3) linked glucose polymer yielded oligosaccharides with compositions corresponding to 3Hex (RT 12.56 min), 4Hex (19.28 min), and 5Hex (26.44 min) (FIG. 2A). Other homopolysaccharides, such as cellulose and amylose also produced one oligomer per DP indicative of their uniform monosaccharide and linkage composition (FIGS. 2B and 2C). Similar trends were reflected in both galactan, a β(1→4) linked galactose polysaccharide, and mannan, a β(1→4) linked mannose polysaccharide. However, some inherent impurities were observed as a result of the processing steps for polysaccharide isolation by the manufacturer (FIGS. 2D and 2E).

Linear heteropolysaccharides contain more than one monosaccharide or glycosidic linkage. The structural heterogeneity contributed to the production of several oligosaccharide isomers for each DP. Among the group, both β-glucan and lichenan were similar in structure and comprise of β(1→3) and β(1→4) linked glucose residues, but in differing ratios. Indeed, LC-MS analysis yielded several isomers associated with each DP. Thus, the composition corresponding to 6Hex was observed to generate eight isomers from lichenan and four isomers from β-glucan (FIGS. 2F and 2G). Additionally, the structural similarities in monosaccharide and linkage composition between lichenan and β-glucan yielded many similar oligosaccharides from both polysaccharides. For instance, the 3Hex (13.73 min), 4Hex (19.46, 19.70, 20.41 min), 5Hex (24.92, 25.79 min), and 6Hex (30.90 min) are potentially similar structures shared between lichenan and β-glucan (FIGS. 2F and 2G). Likewise, glucomannan, another linear heteropolymer containing β(1→4) linked glucose and mannose residues, produced several isomers for each DP (FIG. 2H).

Branched heteropolysaccharides contained an additional layer of complexity that originated from the frequency of branching and/or variations in the glycosidic linkages and monosaccharide constituents. As expected, variations in the positions and frequency of the branches produced many isomers for each DP. For example, galactomannan contained a β(1→4) linked mannose backbone with terminal galactose branches which produced three 3Hex isomers. In sections of the polysaccharide backbone where there was a lack of galactose branching, the monosaccharide arrangement resembled that of mannan. By comparing the oligosaccharides generated from structurally similar polysaccharides, we inferred additional information regarding their oligosaccharide structures. Therefore, the three isomers of 3Hex could be produced from either the mannose backbone or from the mannose backbone with galactose branches. We determined that the 3Hex that eluted at 1.51 min was comprised of three β(1→4) linked mannose residues because it was produced from both sources (FIG. 2I). By deduction, we concluded that the 3Hex oligosaccharides eluting at 1.78 min and 2.55 min originated from two β(1→4) linked mannose constituents with a galactose branch (FIG. 2J). Other branched heteropolysaccharides such as arabinan, xylan, arabinoxylan, and xyloglucan were successfully dissociated and similarly generated several isomers per DP (FIGS. 2J-2M). The depolymerization of such diverse structures further demonstrates the method's reactivity towards pentose containing polysaccharides. Unexpectedly, amylopectin, another branched heteropolysaccharide containing an α(1→4) linked glucose backbone with α(1→4,6) bisecting glucose branches produced only one structure per DP, which may be due to the high oxidative lability that has been reported for (1→6) linkages (FIG. 2N).[33]

Polysaccharides containing modified monosaccharide residues were also examined. Xylan was a β(1→4)-linked xylose polysaccharide with terminal 4-O-methyl glucuronic acid (GlcAOMe) residues. Under FITDOG conditions, several oligosaccharides were generated with unique compositions including 3Pent:1GlcAOMe isomers (13.06, 14.00, 14.27, and 16.47 min), 4Pent:1GlcAOMe isomers (17.68, 18.87, and 19.55 min), 5Pent:1GlcAOMe isomers (20.93, 22.82, 23.13, and 23.46 min), 6Pent:1GlcAOMe isomers (24.51, 26.88, and 27.34 min), and 7Pent:1GlcAOMe isomers (27.61 and 29.69 min). The presence of these oligosaccharides indicated that O-methylation on the terminal glucuronic acid was preserved after FITDOG treatment (FIG. 2J).

Figure 3:
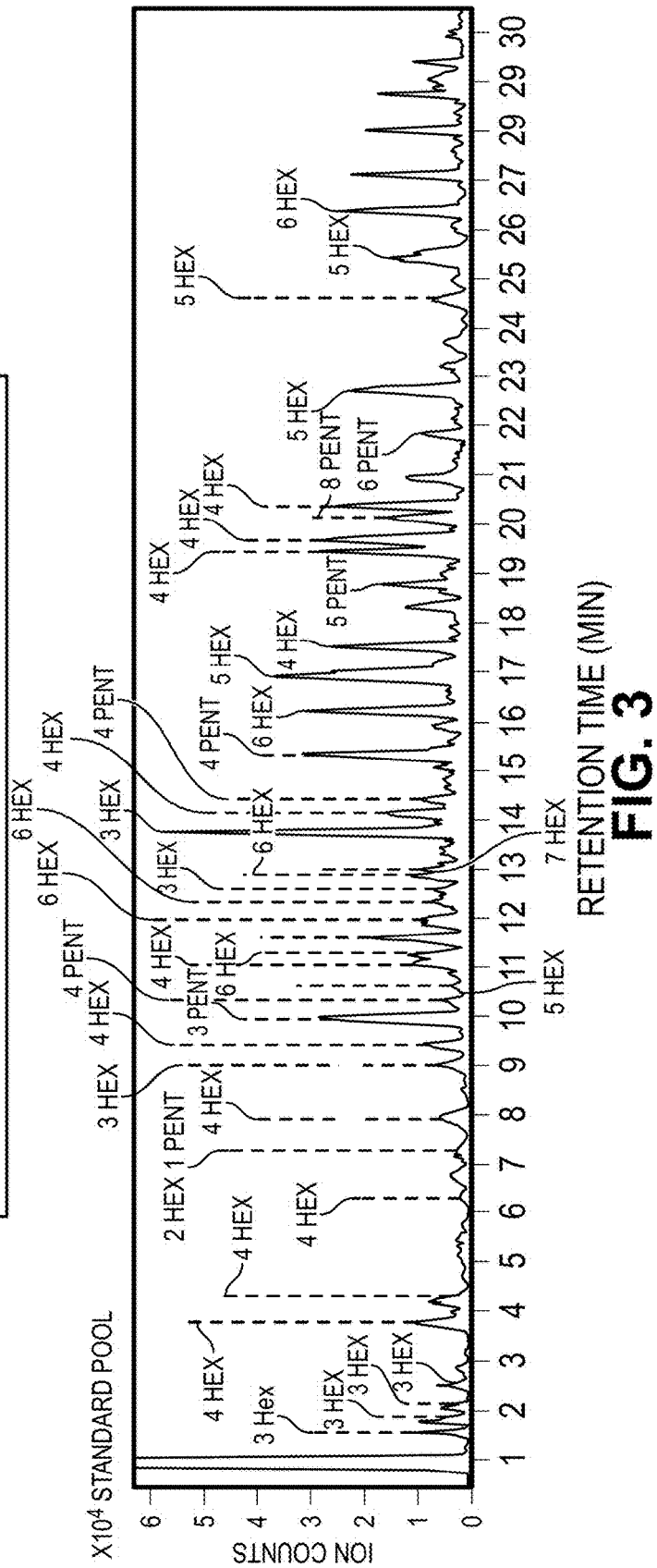
FIG. 3 shows a) annotated base peak chromatogram of pooled oligosaccharides derived from the depolymerization of the polysaccharide standards; and annotated base peak chromatograms of characterized oligosaccharides derived from b) wheat bran and c) oat bran.
Figure 3:
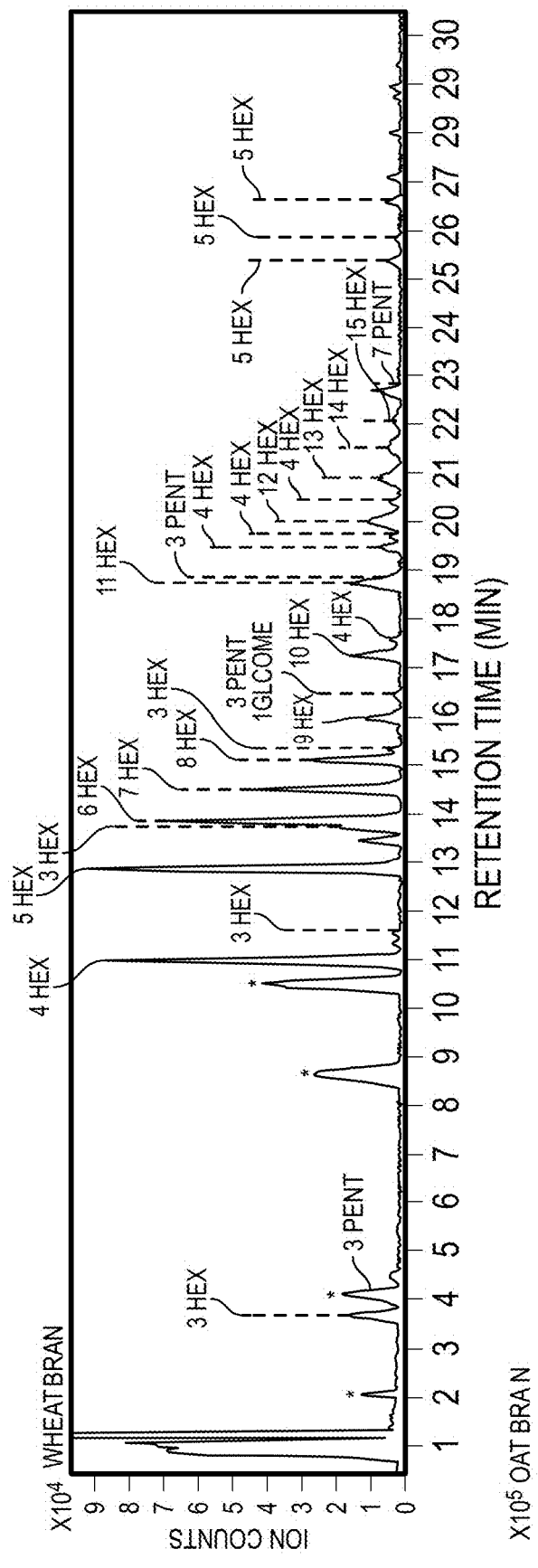
Figure 3:
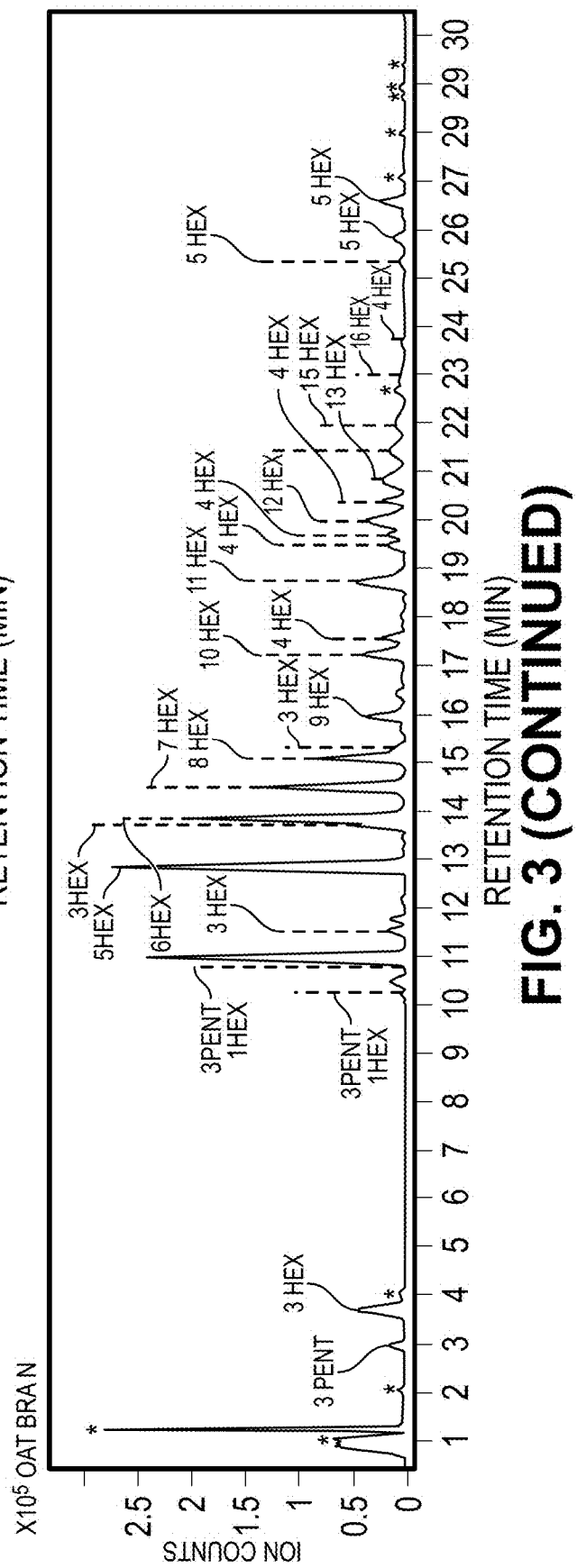

Example 3. Identification of Polysaccharides Through Oligosaccharide Fingerprinting With the unique oligosaccharide compositions for each polysaccharide, we examined whether the oligosaccharides could be used as diagnostic markers for polysaccharide identification in complicated mixtures such as those found in common foods. The oligosaccharide products were used as unique identifiers for the respective parent polysaccharides. An oligosaccharide reference library was created from the polysaccharide standards with nearly 400 unique oligosaccharides. A pool containing all the oligosaccharides was run alongside unknown samples for retention time alignment (FIG. 3A).

Wheat and oat bran were selected to validate the oligosaccharide fingerprinting method as they were known to contain large amounts of non-starch polysaccharides including arabinoxylans[34], mixed linkage β-glucans[35], and cellulose[36]. Oat and wheat bran each produced over 50 distinct oligosaccharides with a large fraction matching entries in the reference library (FIGS. 3B and 3C).

To determine the polysaccharide compositions of the two brans, we used an approach that was analogous to peptide fingerprinting for protein identification. The major caveat is that proteins are composed of a specified length of polypeptides, while polysaccharides are composed of a distribution of saccharide lengths. In this approach, we utilized the number of oligosaccharides produced in the individual standards to determine the fraction of the polysaccharide products that are observed in the mixture. The number of oligosaccharides produced varied across each standard polysaccharide. For cellulose, only four oligosaccharides were observed in our chromatographic window, while for amylopectin over 20 oligosaccharides were observed, and for arabinoxylan over 40 oligosaccharides were observed. We proposed that the number of oligosaccharide peaks found in the mixture can be represented as a fraction of those found in the pure standard and be used as a "percent coverage". The coverage is expected to be higher if the oligosaccharide count in the sample is closer to the number of oligosaccharides produced in the standard.

Based on the analysis, wheat bran was found to contain amylose/amylopectin (20 peaks, 100% coverage), cellulose (3 peaks, 75%), β-glucan (11 peaks, 34%) and lichenan (9 peaks (24%). Oat bran was composed of amylose/amylopectin (20 peaks, 100% coverage), cellulose (3 peaks, 75%), β-glucan (12 peaks, 38%) and lichenan (9 peaks 24%). Oat bran also contained arabinoxylan (5 peaks, 20%) and xylan (7 peaks, 32%). Interestingly, oat bran contained unmatched pentose oligomers (3 peaks) and mixed hexose and pentose containing oligomers (7 peaks) suggesting a polysaccharide that had not yet been identified. Nonetheless, the results matched the general expected polysaccharide composition of the brans.[34-36]

Example 4. Production of Xyloglucan Resembling Oligosaccharides

Figure 4:
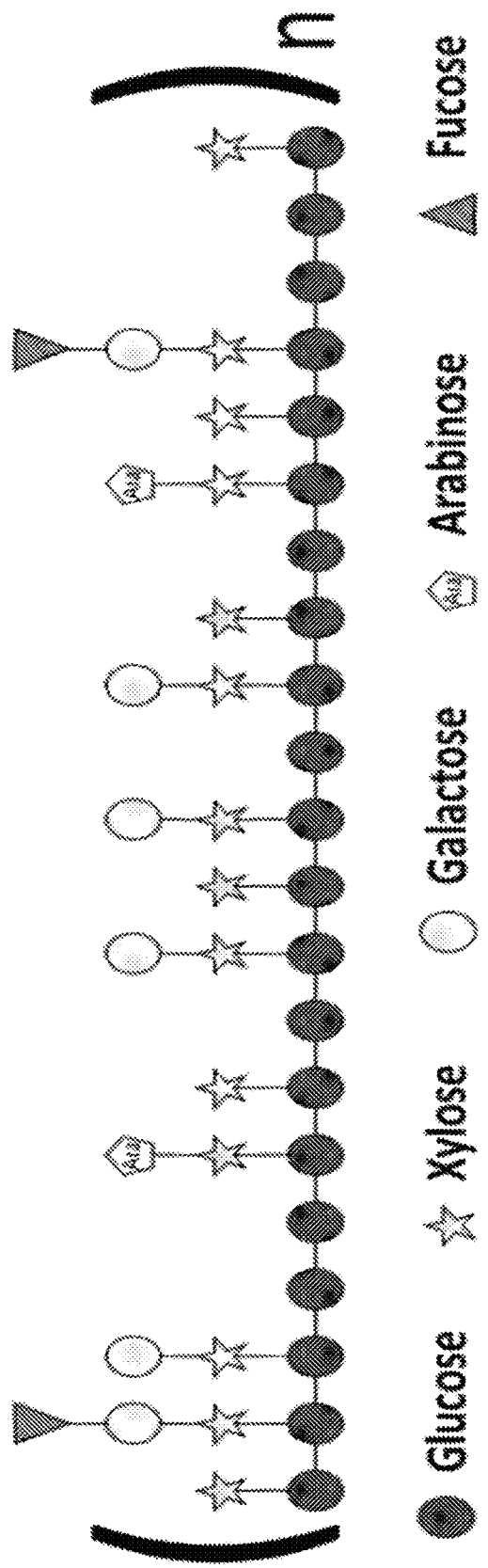
FIG. 4 shows a representation of the xyloglucan polysaccharide. The degree of polymerization can reach up to 100,000 monosaccharides.

Xyloglucan polysaccharide was extracted from tamarind and underwent the FITDOG process to produce oligosaccharides that resemble its structure.[27] Tamarind xyloglucan is known to comprise a β1,4 glucose backbone with frequent single unit branches of α1,6 xylose that can occasionally be further attached to a single β1,2 linked galactose endcap. Xyloglucan from other sources may contain a single fucose residue α1,2 linked to the galactose. In other sources of xyloglucan, arabinose can be α1,2 linked to the xylose residue. Thusly, xyloglucan resembling oligosaccharides are those that can be described by chains of 3-30 monosaccharides with a fundamental structure that contains a β1,4-linked glucose and between 1 and n branching xylose residues, where n is the number of glucoses in the oligosaccharide. The xylose can be linked to any glucose through an α1,6 linkage. The xylose may be, but is not required to be, further linked to a galactose residue primarily through a β1,2 linkage. Additionally, the xylose may be, but is not required to be, further linked to an arabinose residue primarily through an α1,2 linkage. The galactose may be, but is not required to be, further linked to a fucose residue primarily through an α1,2 linkage. An example of xyloglucan structure is shown in FIG. 4.

The FITDOG process created over 45 oligosaccharides that do not exist naturally. The oligosaccharides observed by HPLC/Q-TOF MS are summarized in Table 4. The oligosaccharides observed ranged from a degree of polymerization (DP) of 3-9 and contained combinations of hexoses, which can be derived from glucose or galactose, and pentoses, which are derived from xylose. In Table 4, each subunit labeled "Hex" is independently selected from unsubstituted β1-linked Glu, 6-substituted β1-linked Glu (e.g., (Xylα1-6)Glu), and unsubstituted β1-linked Gal. Each unsubstituted β1-linked Glu or 6-substituted β1-linked Glu is linked to the 4 position of a neighboring Glu or 6-substituted Glu, and each Gal is linked to the 2-position of a neighboring Xyl. In Table 4, each subunit labeled "Pent" is independently selected from unsubstituted α-linked Xyl and 2-substituted α-linked Xyl (e.g., (Galβ1-2)Xyl).

TABLE 4

| # | Mass (m/z) | Neutral Mass | Retention Time (min) | Composition |
|---|---|---|---|---|
| 1 | 477.18 | 474.16 | 6.88 | 2Hex:1Pent |
| 2 | 477.18 | 474.16 | 7.68 | 2Hex:1Pent |
| 3 | 477.18 | 474.16 | 10.94 | 2Hex:1Pent |
| 4 | 579.21 | 576.19 | 12.47 | 3Pent1Hex |
| 5 | 609.22 | 606.20 | 13.71 | 2Hex:2Pent |
| 6 | 639.23 | 636.21 | 12.21 | 3Hex:1Pent |
| 7 | 639.23 | 636.21 | 13.03 | 3Hex:1Pent |

TABLE 4-continued

| # | Mass (m/z) | Neutral Mass | Retention Time (min) | Composition |
|---|---|---|---|---|
| 8 | 639.23 | 636.21 | 15.72 | 3Hex:1Pent |
| 9 | 639.23 | 636.21 | 16.66 | 3Hex:1Pent |
| 10 | 639.23 | 636.21 | 17.32 | 3Hex:1Pent |
| 11 | 771.28 | 768.25 | 14.92 | 3Hex:2Pent |
| 12 | 771.27 | 768.25 | 15.15 | 3Hex:2Pent |
| 13 | 771.27 | 768.25 | 18.13 | 3Hex:2Pent |
| 14 | 771.27 | 768.25 | 18.65 | 3Hex:2Pent |
| 15 | 801.29 | 798.26 | 16.84 | 4Hex:1Pent |
| 16 | 801.29 | 798.26 | 17.94 | 4Hex:1Pent |
| 17 | 801.29 | 798.26 | 21.76 | 4Hex:1Pent |
| 18 | 801.29 | 798.26 | 22.86 | 4Hex:1Pent |
| 19 | 801.29 | 798.26 | 23.17 | 4Hex:1Pent |
| 20 | 903.32 | 900.30 | 20.34 | 3Hex:3Pent |
| 21 | 933.33 | 930.31 | 16.00 | 4Hex:2Pent |
| 22 | 933.33 | 930.31 | 18.78 | 4Hex:2Pent |
| 23 | 933.33 | 930.31 | 19.20 | 4Hex:2Pent |
| 24 | 933.33 | 930.31 | 19.61 | 4Hex:2Pent |
| 25 | 933.33 | 930.31 | 22.84 | 4Hex:2Pent |
| 26 | 933.33 | 930.31 | 24.50 | 4Hex:2Pent |
| 27 | 933.33 | 930.31 | 25.19 | 4Hex:2Pent |
| 28 | 933.33 | 930.31 | 27.07 | 4Hex:2Pent |
| 29 | 1065.36 | 1062.35 | 18.18 | 4Hex:3Pent |
| 30 | 1065.36 | 1062.35 | 20.70 | 4Hex:3Pent |
| 31 | 1065.36 | 1062.35 | 20.95 | 4Hex:3Pent |
| 32 | 1065.36 | 1062.35 | 26.27 | 4Hex:3Pent |
| 33 | 1065.36 | 1062.35 | 27.35 | 4Hex:3Pent |
| 34 | 1095.38 | 1092.36 | 18.98 | 5Hex:2Pent |
| 35 | 1095.38 | 1092.36 | 19.94 | 5Hex:2Pent |
| 36 | 1095.38 | 1092.36 | 23.14 | 5Hex:2Pent |
| 37 | 1095.38 | 1092.36 | 23.74 | 5Hex:2Pent |
| 38 | 1095.38 | 1092.36 | 24.78 | 5Hex:2Pent |
| 39 | 1095.38 | 1092.36 | 25.44 | 5Hex:2Pent |
| 40 | 1227.43 | 1224.40 | 21.27 | 5Hex:3Pent |
| 41 | 1227.43 | 1224.40 | 24.96 | 5Hex:3Pent |
| 42 | 1227.43 | 1224.40 | 25.81 | 5Hex:3Pent |
| 43 | 1257.44 | 1254.41 | 22.74 | 6Hex:2Pent |
| 44 | 1389.47 | 1386.45 | 26.47 | 6Hex:3Pent |
| 45 | 1389.47 | 1386.45 | 26.73 | 6Hex:3Pent |
| 46 | 1389.47 | 1386.45 | 27.33 | 6Hex:3Pent |

The oligosaccharide fragmentation was used in the elucidation of the oligosaccharide secondary structure. The sodium borohydrate reduction was used to reduce the aldehyde to an alditol, which can be observed as an increased m/z 2.014 in the fragmentation spectrum. This additional mass allowed the reducing end residue to be clearly identified and provided additional evidence for determining regiospecific monosaccharide arrangements.

Figure 5:
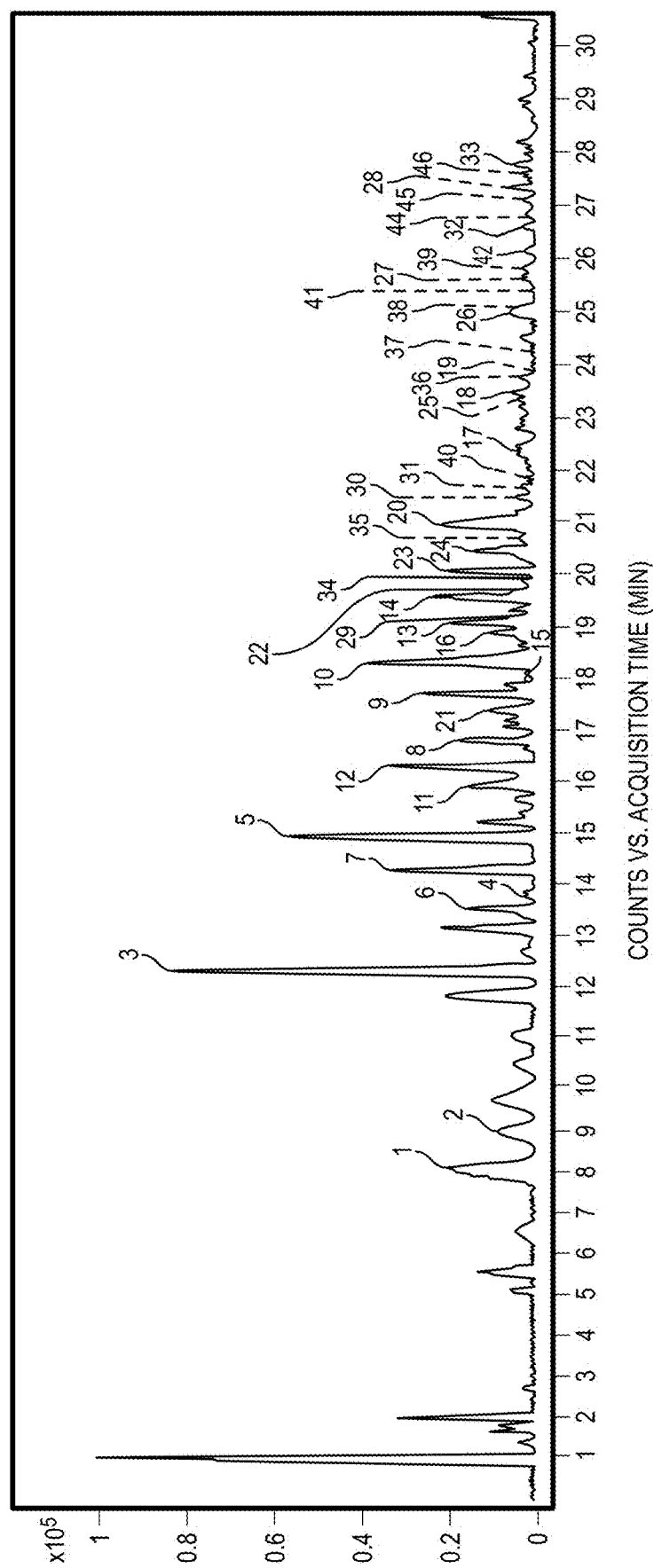
FIG. 5 shows The base peak chromatogram for the xyloglucan resembling oligosaccharides. The chromatogram was extracted for masses between m/z 400-3000 with the calibrant ion m/z 922.00 excluded. The labeled oligosaccharides correspond to the oligosaccharides described in Table 4.

An HPLC-MS chromatogram of the peaks described in Table 4 is shown in FIG. 5. The mixture of oligosaccharides were analyzed for broad attributes including monosaccharide and glycosidic linkage analysis. The monosaccharide analysis confirmed that the FITDOG process did not drastically change the monosaccharide composition of the polysaccharide during processing. The monosaccharide analysis showed that glucose, galactose, and xylose were the three major building blocks of the xyloglucan-resembling oligosaccharides. The glycosidic linkage analysis of the pool further confirmed that the FITDOG process did not greatly change alter the composition. As expected, terminal glucose, 4-linked glucose, 4,6-branched glucose, terminal xylose, 2-linked xylose, and terminal galactose were the major glycosidic linkages. The observed monosaccharide and glycosidic linkage analyses was used alongside the MS/MS annotations to deduce absolute oligosaccharide structure.

Figure 6A:
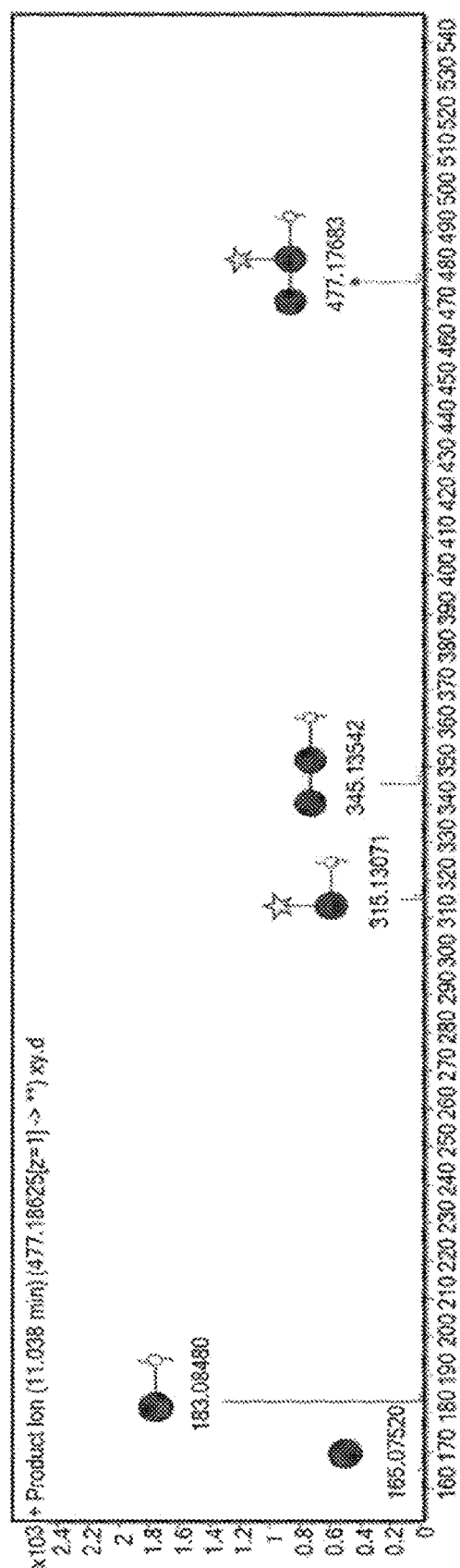
FIGS. 6A-6D show a) The fragmentation spectra of m/z 477.19 at retention time 11.04 minutes. This oligosaccharide represents #3 in Table 4. b) The fragmentation spectra of m/z 771.28 at retention time 15.12 minutes. This oligosaccharide represents #12 in Table 4. c) The fragmentation spectra of m/z 903.32 at retention time 20.41 minutes. This oligosaccharide represents #20 from Table 4. d) The fragmentation spectra of m/z 1227.43 at retention time 26.59 minutes. This oligosaccharide represents #42 from Table 4.

FIG. 6A shows the annotated mass spectrum of a smaller oligosaccharide with a DP of three. This oligosaccharide corresponded with oligosaccharide #3 from Table 4. The fragment m/z 345.14 confirmed that there were two hexoses in the backbone of the oligosaccharides. This was further characterized as a β1,4 glucose backbone because the 4-linked glucose was the only linked hexose to be found from the glycosidic linkage analysis. Furthermore, the fragment m/z 315.13 showed a pentose moiety was linked to the reducing end glucose. Xylose was the primary pentose in the monosaccharide analysis and is known to be linked directly to the glucose backbone through an β1,6 glycosidic bond in xyloglucan.

Figure 6B:
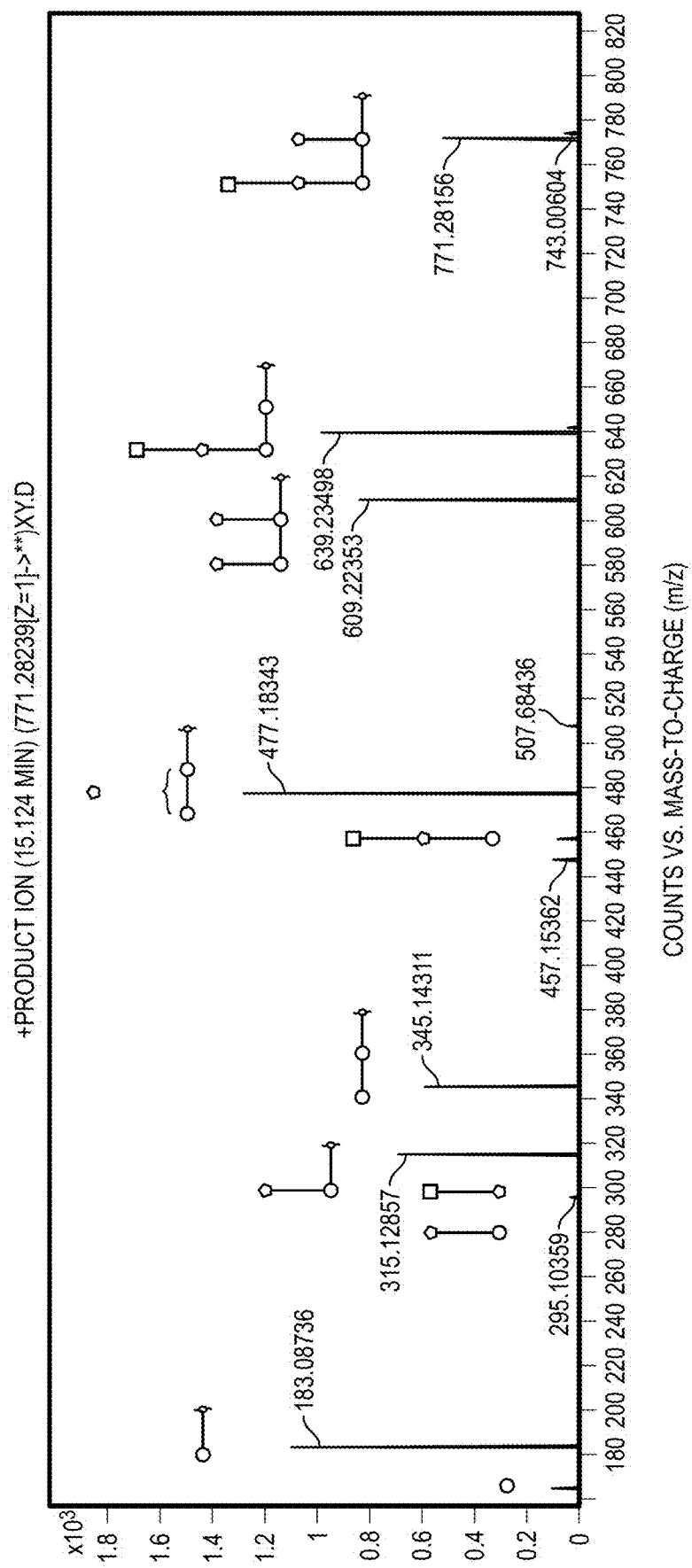

The annotated tandem mass spectrum shown in FIG. 6B corresponds to oligosaccharide #12 in Table 4, which has a DP of five. Again, the fragment m/z 345.14 showed a two-hexose backbone corresponding to two β1,4 linked glucose residues, where the m/z 315.13 corresponded to a xylose on the reducing end glucose. The fragment m/z 609.22 corresponded to xyloses attached to two glucose. A lack of a peak at m/z 265.08 indicates that the two pentoses are not linked together and must be situated with one pentose on each hexose. Furthermore, a peak with an m/z 507.17, which corresponds to three hexoses, was not observed. This shows that the three hexoses are not linked together, and one must be linked to one of the pentose residues. Lastly, the regio-location of this hexose was found to be located on the xylose residue that extends from the non-reducing hexose residue by the fragment m/z 457.15, which corresponds to one pentose, and two hexoses without a reducing end. The xylose capping hexose was determined to be a galactose based upon the terminal galactose observed in the glycosidic linkage analysis. Again, this oligosaccharide structure was further confirmed by comparison with the known structure of xyloglucan, where xylose can be α1,6 linked to terminal galactose residues.

Figure 6C:
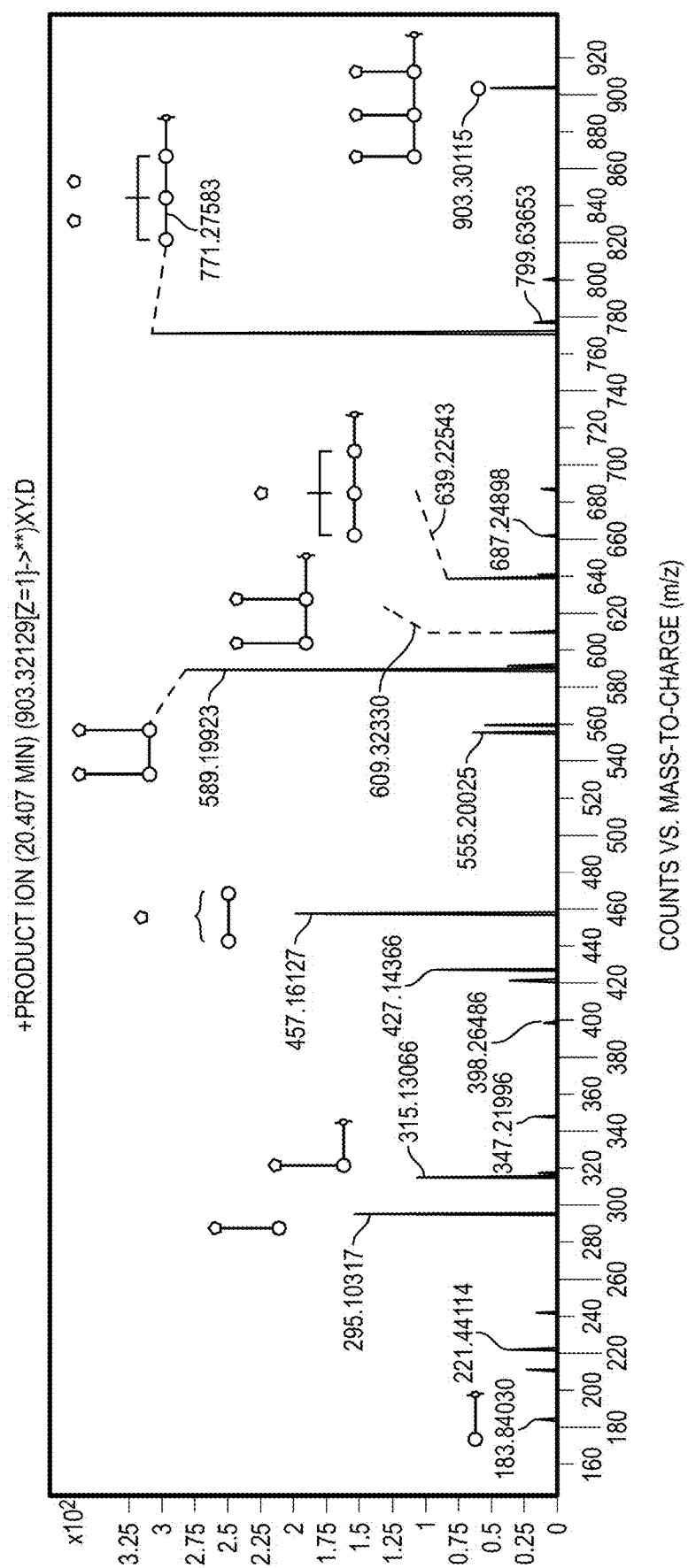

The annotated fragmentation spectrum in FIG. 6C corresponds to oligosaccharide #20 in Table 4, which is a highly branched DP six oligosaccharide. Several key fragments aided in the elucidation of this oligosaccharide. For example, fragments with m/z 295.10 and m/z 315.13 correspond to a non-reducing end hexose linked to a pentose and a reducing end hexose linked to a pentose, respectively. The absence of peaks at m/z 265.08 and m/z 397.12, which correspond to two pentose and three pentoses, respectively, indicates that none of the pentoses are linked together and must all be exclusively linked to hexose residues. Furthermore, the peak m/z 589.20 corresponds to two non-reducing hexoses and two pentoses, while m/z 609.32 corresponds to two hexoses with a reducing end and two pentoses. These two peaks together suggest that there is a three-hexose backbone with each hexose containing a pentose branch. With knowledge of the monosaccharide composition and glycosidic linkages, it can be concluded that this peak corresponds to an oligosaccharide with three β1,4 linked glucose residues, each with their own β1,6 branched xylose residue.

Figure 6D:
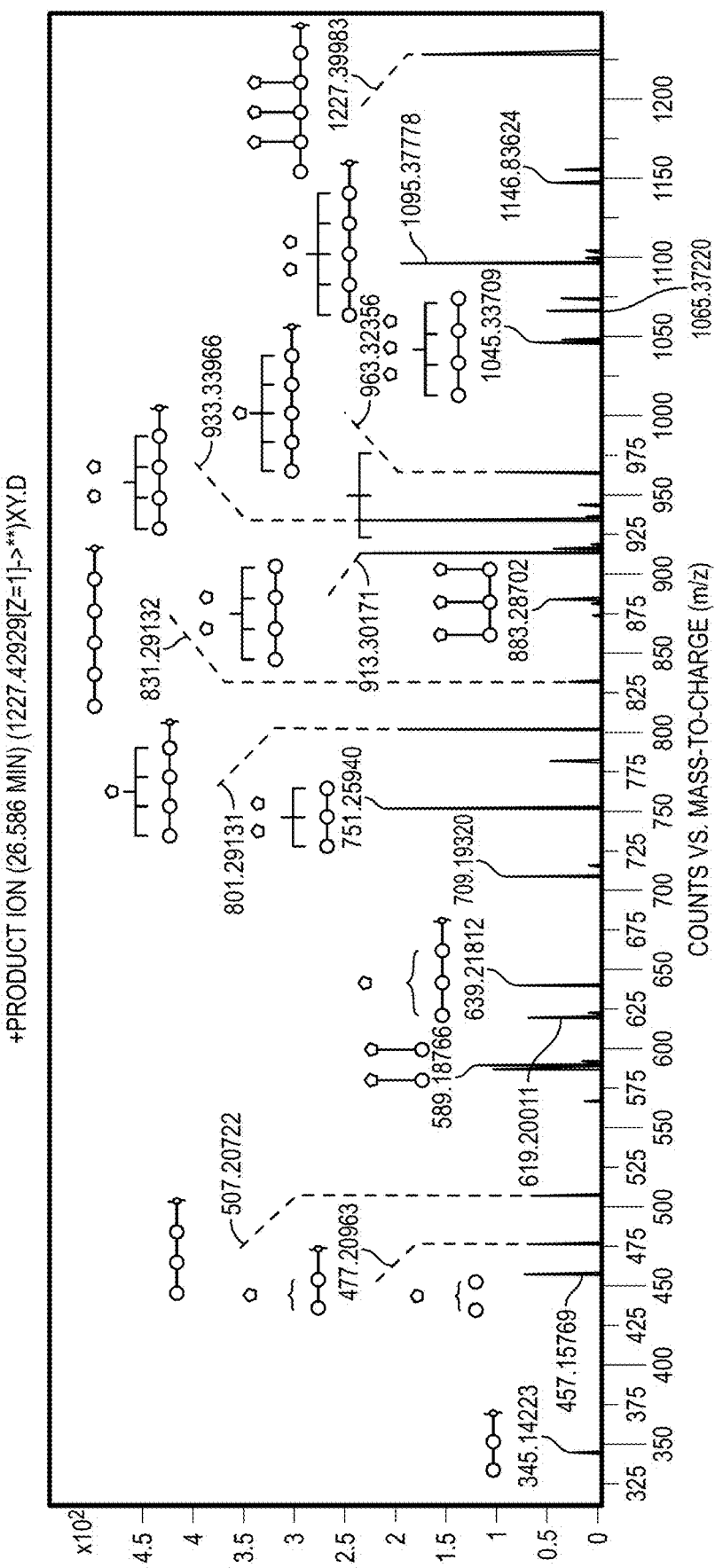

The annotated fragmentation spectrum in FIG. 6D corresponds to oligosaccharide #42 from Table 4, which is highly branched and has an DP of eight. The backbone of this oligosaccharide can be deduced from the peak at m/z 831.29, which represents a backbone with five hexoses and a reducing end. This oligosaccharide lacks a peak at m/z 315.13, which corresponds to one reducing end hexoses with a pentose. This means that the oligosaccharide lacks a pentose branching from the reducing end hexose. The peak m/z 883.29, which represents three hexoses non-reducing end hexoses and three pentoses, and further corroborates the lack of a pentose on the reducing end. Furthermore, peak m/z 883.29 suggests that all three pentoses are linked to adjacent hexose residues. Lastly, the pentose regio-location can be confined to the $2^{nd}$, $3^{rd}$, and $4^{th}$ hexoses from the reducing end by the presence of the peak m/z 477.21, which corresponds to two hexoses with a reducing end and a pentose. The peak m/z 477.21 can be deduced as representing a two-hexose backbone with the pentose linked to the non-reducing hexose due to the above-explained evidence for pentoses not being linked to the reducing end. This oligosaccharide was therefore determined to contain five β1,4 linked glucoses, with the three middle glucoses containing β1,6 branched xylose residues.

The identities of compounds corresponding to peaks in Table 4 are shown below. Peaks are grouped together where an individual oligosaccharide could not be tied to a specific peak, but where groups of oligosaccharides having the same mass could be tied to groups of peaks.

| | |
|---|---|
| 1 | ((Galβ1-2)Xylα1-6)Glu |
| 2 | (Xylα1-6)Glcβ1-4Glu |
| 3 | Gluβ1-4(Xylα1-6)Glu |
| 5 | (Xylα1-6)Gluβ1-4(Xylα1-6)Glu |
| 6 | Gluβ1-4((Galβ1-2)Xylα1-6)Glu |
| 7 | ((Galβ1-2)Xylα1-6)Gluβ1-4Glu |
| 8 | Gluβ1-4Gluβ1-4(Xylα1-6)Glu |
| 9 | (Xylα1-6)Gluβ1-4Gluβ1-4Glu |
| 10 | Gluβ1-4(Xylα1-6)Gluβ1-4Glu |
| 11 | (Xylα1-6)Gluβ1-4((Galβ1-2)Xylα1-6)Glu |
| 12 | ((Galβ1-2)Xylα1-6)Gluβ1-4(Xylα1-6)Glu |
| 13 | (Xylα1-6)Gluβ1-4Gluβ1-4(Xylα1-6)Glu |
| 14 | Gluβ1-4(Xylα1-6)Gluβ1-4(Xylα1-6)Glu |
| 15 | (Xylα1-6)Gluβ1-4(Xylα1-6)Gluβ1-4Glu |
| 16 | Gluβ1-4Gluβ1-4((Galβ1-2)Xylα1-6)Glu |
| 17 | Gluβ1-4((Galβ1-2)Xylα1-6)Gluβ1-4Glu |
| 18 | ((Galβ1-2)Xylα1-6)Gluβ1-4Glcl-4Glu |
| 19 | Gluβ1-4Gluβ1-4Gluβ1-4(Xylα1-6)Glu |
| 20 | Gluβ1-4(Xylα1-6)Gluβ1-4Gluβ1-4Glu |
| 21 | Gluβ1-4Gluβ1-4(Xylα1-6)Gluβ1-4Glu |
| 22 | (Xylα1-6)Gluβ1-4Gluβ1-4Gluβ1-4Glu |
| 23 | (Xylα1-6)Gluβ1-4(Xylα1-6)Gluβ1-4(Xylα1-6)Glu |
| 24 | ((Galβ1-2)Xylα1-6)Gluβ1-4((Galβ1-2)Xylα1-6)Glu |
| 25, 26, 27, 28, 29, and 30 | Gluβ1-4(Xylα1-6)Gluβ1-4((Galβ1-2)Xylα1-6)Glu, Gluβ1-4((Galβ1-2)Xylα1-6)Gluβ1-4(Xylα1-6)Glu, (Xylα1-6)Gluβ1-4Gluβ1-4((Galβ1-2)Xylα1-6)Glu, ((Galβ1-2)Xylα1-6)Gluβ1-4Gluβ1-4(Xylα1-6)Glu, ((Galβ1-2)Xylα1-6)Gluβ1-4(Xylα1-6)Glcβ1-4Glu, or (Xylα1-6)Gluβ1-4((Galβ1-2)Xylα1-6)Gluβ1-4 Glu |
| 31, 32, 33, 34, and 35 | Gluβ1-4Gluβ1-4(Xylα1-6)Gluβ1-4(Xylα1-6)Glu, Gluβ1-4(Xylα1-6)Gluβ1-4(Xylα1-6)Gluβ1-4Glu, (Xylα1-6)Gluβ1-4Gluβ1-4(Xylα1-6)Gluβ1-4Glu, Gluβ1-4(Xylα1-6)Gluβ1-4Gluβ1-4(Xylα1-6)Glu, or (Xylα1-6)Gluβ1-4Gluβ1-4Gluβ1-4(Xylα1-6)Glu |

Example 5. Production and Characterization of Oligosaccharides from Homopolymer and Heteropolymer Polysaccharides The monosaccharide composition of polysaccharides prior to FITDOG depolymerization is shown below in Table 5-1. The notation "--" represents a monosaccharide that exists an amount less than 2% of the total polymer weight.

TABLE 5-1

| | Glucose | Galactose | Mannose | Arabinose | Xylose | Rhamnose | GalA | Fructose | Others |
|---|---|---|---|---|---|---|---|---|---|
| Galactan | — | 88.2 | — | 2.95 | — | 2.20 | 2.83 | — | 3.80 |
| Lichenan | 80.16 | 10.58 | 5.53 | — | — | — | — | — | 3.72 |
| β-Glucan | 95.97 | — | — | — | — | — | — | 2.80 | 1.24 |

TABLE 5-1-continued

|  | Glucose | Galactose | Mannose | Arabinose | Xylose | Rhamnose | GalA | Fructose | Others |
|---|---|---|---|---|---|---|---|---|---|
| Glucomannan | 34.6 | — | 60.9 | — | — | — | — | 2.37 | 2.11 |
| Galactomannan | 23.3 | — | 73.2 | — | — | — | — | — | 3.52 |
| Arabinan | 13.3 | — | — | 81.6 | — | — | — | — | 5.15 |
| Xylan | — | — | — | — | 94.2 | — | — | — | 5.77 |
| Arabinoxylan | — | — | — | 36.3 | 59.7 | — | — | — | 3.97 |

The glycosidic linkage composition of polysaccharides prior to FITDOG depolymerization is shown below in Table 5-2. The notation "--" represents a monosaccharide that exists an amount less than 2% of the total polymer weight.

TABLE 5-2

|  | 4-Gal | T-Gal | 4-Man | T-Man | 3-Glu | 4-Glu | T-Glu | 4,6-Man |
|---|---|---|---|---|---|---|---|---|
| Galactan | 58.84 | 30.53 | — | — | — | — | — | — |
| Lichenan | — | 26.25 | — | — | 24.51 | 26.61 | 2.46 | — |
| Beta-glucan | — | — | 3.19 | — | 31.24 | 56.80 | 3.84 | — |
| Glucomannan | — | — | 80.46 | 3.06 | — | 13.66 | — | — |
| Galactomannan | — | 17.17 | 72.18 | — | — | — | — | 4.53 |
| Arabinan | 7.79 | 12.28 | — | — | — | — | — | — |
| Xylan | — | 2.43 | — | — | — | — | — | — |
| Arabinoxylan | — | — | — | — | — | — | — | — |

|  | 4-P-Xyl | 3,4-P-Xyl | T-P-Xyl | 2-F-Ara | 3-P-Ara | T-F-Ara | Others |
|---|---|---|---|---|---|---|---|
| Galactan | — | — | — | — | — | — | 10.63 |
| Lichenan | — | — | — | — | — | 3.80 | 16.37 |
| Beta-glucan | — | — | — | — | — | — | 4.93 |
| Glucomannan | — | — | — | — | — | — | 2.82 |
| Galactomannan | — | — | — | — | — | — | 6.11 |
| Arabinan | 27.84 | 18.60 | — | — | 2.70 | 25.18 | 5.61 |
| Xylan | 80.06 | — | 6.55 | 3.03 | — | — | 7.92 |
| Arabinoxylan | 34.59 | 11.73 | — | 2.43 | 2.55 | 43.05 | 5.65 |

Curdlan. Due to the structure of curdlan being a homopolysaccharide, meaning both the linkage and monomers are consistent and non-varied, only one isomer for each degree of polymerization (DP) is expected. Indeed, at least four oligosaccharides were produced without any isomers as shown in Table 5-3. Likely, oligosaccharides with higher degrees of polymerization were produced; however, they were not within the chromatographic range.

TABLE 5-3

| # | Mass (m/z) | Neutral Mass | Retention Time (min) | Composition | Compound |
|---|---|---|---|---|---|
| 1 | 507.19 | 504.17 | 12.57 | 3Hex | Glcβ1-3Glcβ1-3Glc |
| 2 | 669.25 | 666.22 | 19.28 | 4Hex | Glcβ1-3Glcβ1-3Glcβ1-3Glc |
| 3 | 831.30 | 828.27 | 26.44 | 5Hex | Glcβ1-3[Glcβ1-3]$_3$Glc |
| 4 | 993.35 | 990.33 | 40.09 | 6Hex | Glcβ1-3[Glcβ1-3]$_4$Glc |

Galactan. Due to galactan being a homopolysaccharide, only one isomer for each degree of polymerization (DP) is expected. Indeed, at least seven oligosaccharides were produced without any isomers (Table 5-4). Likely, oligosaccharides with higher degrees of polymerization were produced; however, they were not within the chromatographic range.

TABLE 5-4

| # | Mass (m/z) | Neutral Mass | Retention Time (min) | Composition | Compound |
|---|---|---|---|---|---|
| 1 | 507.19 | 504.17 | 2.34 | 3Hex | Galβ1-4Galβ1-4Gal |
| 2 | 669.25 | 666.22 | 7.50 | 4Hex | Galβ1-4Galβ1-4Galβ1-4Gal |
| 3 | 831.30 | 828.27 | 11.19 | 5Hex | Galβ1-4[Galβ1-4]$_3$Gal |
| 4 | 993.35 | 990.33 | 12.40 | 6Hex | Galβ1-4[Galβ1-4]$_4$Gal |
| 5 | 1155.40 | 1152.38 | 13.10 | 7Hex | Galβ1-4[Galβ1-4]$_5$Gal |
| 6 | 1317.46 | 1314.43 | 13.68 | 8Hex | Galβ1-4[Galβ1-4]$_6$Gal |
| 7 | 1479.51 | 1476.49 | 14.62 | 9Hex | Galβ1-4[Galβ1-4]$_7$Gal |

Mannan. Due to the structure of mannan being a homopolysaccharide, meaning both the linkage and monomers are consistent and non-varied, only one isomer for each degree of polymerization (DP) is expected. Indeed, at least seven oligosaccharides were produced without any isomers (Table 5-5). Likely, oligosaccharides with higher degrees of polymerization were produced; however, they were not within the chromatographic range.

TABLE 5-5

| # | Mass (m/z) | Neutral Mass | Retention Time (min) | Composition |  |
|---|---|---|---|---|---|
| 1 | 507.19 | 504.17 | 1.51 | 3Hex | Manβ1-4Manβ1-4Man |
| 2 | 669.25 | 666.22 | 3.51 | 4Hex | Manβ1-4Manβ1-4Manβ1-4Man |
| 3 | 831.30 | 828.27 | 9.15 | 5Hex | Manβ1-4[Manβ1-4]$_3$Man |
| 4 | 993.35 | 990.33 | 11.93 | 6Hex | Manβ1-4[Manβ1-4]$_4$Man |

TABLE 5-5-continued

| # | Mass (m/z) | Neutral Mass | Retention Time (min) | Composition | |
|---|---|---|---|---|---|
| 5 | 1155.40 | 1152.38 | 13.10 | 7Hex | Manβ1-4[Manβ1-4]$_5$Man |
| 6 | 1317.46 | 1314.43 | 14.06 | 8Hex | Manβ1-4[Manβ1-4]$_6$Man |
| 7 | 1479.51 | 1476.49 | 14.75 | 9Hex | Manβ1-4[Manβ1-4]$_7$Man |

Cereal Beta-Glucan. The FITDOG process produced oligosaccharides that are consistent with the polysaccharide structure of β-glucans as described above. For example, a trisaccharide can have three possible structural combinations: Glcβ1-4Glcβ1-4Glc, Glcβ1-4Glcβ1-3Glc, Glcβ1-3Glcβ1-4Glc. Indeed, three isomers corresponding to the mass of three-hexoses were observed. Furthermore, the isomer at retention time (RT) 13.73 minutes corresponded with the same RT as a structure also found in cellulose, which can be identified as Glcβ1-4Glcβ1-4Glc. The peaks at RT 11.38 and 15.17 minutes were therefore assigned to the structures that contain single β1-3 bonds between either the first and second glucoses or between the second and third glucoses. Further confidence in the assignments was gained due to the lack of a fourth trisaccharide isomer, which is not expected to be in β-glucan, and would correspond with Glcβ1-3Glcβ1-3Glc, which was seen at RT 12.57 minutes in curdlan. Similar logic was used to confirm the creation of at least 22 oligosaccharides observed from the FITDOG degradation of cereal beta-glucan (Table 5-6). Multiple compounds are listed for peaks which could be not be tied definitively to a single oligosaccharide, but rather to groups of oligosaccharides having the same mass.

In Table 5-6, each subunit labeled "Hex" is independently selected from unsubstituted, β1-linked Glu which is linked to the 3-position or the 4-position of a neighboring unsubstituted Glu.

TABLE 5-6

| # | Mass (m/z) | Neutral Mass | Retention Time (min) | Composition | Compound |
|---|---|---|---|---|---|
| 1 | 507.19 | 504.17 | 11.38 | 3Hex | Glcβ1-4Glcβ1-3Glc or Glcβ1-3Glcβ1-4Glc |
| 2 | 507.19 | 504.17 | 13.73 | 3Hex | |
| 3 | 507.19 | 504.17 | 15.17 | 3Hex | Glcβ1-4Glcβ1-3Glc or Glcβ1-3Glcβ1-4Glc |
| 4 | 669.25 | 666.22 | 17.46 | 4Hex | Glcβ1-3Glcβ1-4Glc1-4Glc, Glcβ1-4Glcβ1-3Glc1-4Glc, or Glcβ1-4Glcβ1-4Glc1-3Glc |
| 5 | 669.25 | 666.22 | 19.46 | 4Hex | |
| 6 | 669.25 | 666.22 | 19.70 | 4Hex | Glcβ1-3Glcβ1-4Glc1-4Glc, Glcβ1-4Glcβ1-3Glc1-4Glc, or Glcβ1-4Glcβ1-4Glc1-3Glc |
| 7 | 669.25 | 666.22 | 20.41 | 4Hex | Glcβ1-3Glcβ1-4Glc1-4Glc, Glcβ1-4Glcβ1-3Glc1-4Glc, or Glcβ1-4Glcβ1-4Glc1-3Glc |
| 8 | 831.30 | 828.27 | 22.69 | 5Hex | Glcβ1-3Glcβ1-4Glc1-4Glc1-4Glc, Glcβ1-4Glcβ1-3Glc1-4Glc1-4Glc, Glcβ1-4Glcβ1-4Glc1-3Glc1-4Glc, or Glcβ1-4Glcβ1-4Glc1-4Glc1-3Glc |
| 9 | 831.30 | 828.27 | 23.52 | 5Hex | Glcβ1-3Glcβ1-4Glc1-4Glc1-4Glc, Glcβ1-4Glcβ1-3Glc1-4Glc1-4Glc, Glcβ1-4Glcβ1-4Glc1-3Glc1-4Glc, or Glcβ1-4Glcβ1-4Glc1-4Glc1-3Glc |
| 10 | 831.30 | 828.27 | 24.92 | 5Hex | |
| 11 | 831.30 | 828.27 | 25.79 | 5Hex | Glcβ1-3Glcβ1-4Glc1-4Glc1-4Glc, Glcβ1-4Glcβ1-3Glc1-4Glc1-4Glc, Glcβ1-4Glcβ1-4Glc1-3Glc1-4Glc, or Glcβ1-4Glcβ1-4Glc1-4Glc1-3Glc |
| 12 | 831.30 | 828.27 | 26.70 | 5Hex | Glcβ1-3Glcβ1-4Glc1-4Glc1-4Glc, Glcβ1-4Glcβ1-3Glc1-4Glc1-4Glc, Glcβ1-4Glcβ1-4Glc1-3Glc1-4Glc, or Glcβ1-4Glcβ1-4Glc1-4Glc1-3Glc |
| 13 | 993.35 | 990.33 | 13.35 | 6Hex | Glcβ1-3Glcβ1-4Glc1-4Glc1-4Glc1-4Glc, Glcβ1-4Glcβ1-3Glc1-4Glc1-4Glc1-4Glc, Glcβ1-4Glcβ1-4Glc1-3Glc1-4Glc1-4Glc, Glcβ1-4Glcβ1-4Glc1-4Glc1-3Glc1-4Glc, Glcβ1-3Glcβ1-4Glc1-4Glc1-4Glc1-3Glc, Glcβ1-4Glcβ1-4Glc1-4Glc1-4Glc1-3Glc |
| 14 | 993.35 | 990.33 | 22.79 | 6Hex | Glcβ1-3Glcβ1-4Glc1-4Glc1-4Glc1-4Glc, Glcβ1-4Glcβ1-3Glc1-4Glc1-4Glc1-4Glc, Glcβ1-4Glcβ1-4Glc1-3Glc1-4Glc1-4Glc, Glcβ1-4Glcβ1-4Glc1-4Glc1-3Glc1-4Glc, Glcβ1-3Glcβ1-4Glc1-4Glc1-4Glc1-3Glc, Glcβ1-4Glcβ1-4Glc1-4Glc1-4Glc1-3Glc |
| 15 | 993.35 | 990.33 | 25.10 | 6Hex | Glcβ1-3Glcβ1-4Glc1-4Glc1-4Glc1-4Glc, Glcβ1-4Glcβ1-3Glc1-4Glc1-4Glc1-4Glc, Glcβ1-4Glcβ1-4Glc1-3Glc1-4Glc1-4Glc, Glcβ1-4Glcβ1-4Glc1-4Glc1-3Glc1-4Glc, Glcβ1-3Glcβ1-4Glc1-4Glc1-4Glc1-3Glc, Glcβ1-4Glcβ1-4Glc1-4Glc1-4Glc1-3Glc |
| 16 | 993.35 | 990.33 | 28.87 | 6Hex | Glcβ1-3Glcβ1-4Glc1-4Glc1-4Glc1-4Glc, Glcβ1-4Glcβ1-3Glc1-4Glc1-4Glc1-4Glc, Glcβ1-4Glcβ1-4Glc1-3Glc1-4Glc1-4Glc, Glcβ1-4Glcβ1-4Glc1-4Glc1-3Glc1-4Glc, |

TABLE 5-6-continued

| # | Mass (m/z) | Neutral Mass | Retention Time (min) | Composition | Compound |
|---|---|---|---|---|---|
| 17 | 993.35 | 990.33 | 30.90 | 6Hex | Glcβ1-3Glcβ1-4Glc1-4Glc1-4Glc1-3Glc, Glcβ1-4Glcβ1-4Glc1-4Glc1-4Glc1-3Glc, Glcβ1-3Glcβ1-4Glc1-4Glc1-4Glc1-4Glc, Glcβ1-3Glcβ1-4Glc1-4Glc1-4Glc1-4Glc, Glcβ1-4Glcβ1-4Glc1-3Glc1-4Glc1-4Glc, Glcβ1-4Glcβ1-4Glc1-4Glc1-3Glc1-4Glc, Glcβ1-3Glcβ1-4Glc1-4Glc1-4Glc1-3Glc, Glcβ1-4Glcβ1-4Glc1-4Glc1-4Glc1-3Glc |
| 18 | 993.35 | 990.33 | 39.26 | 6Hex | |
| 19 | 993.35 | 990.33 | 41.49 | 6Hex | Glcβ1-3Glcβ1-4Glc1-4Glc1-4Glc1-4Glc, Glcβ1-4Glcβ1-3Glc1-4Glc1-4Glc1-4Glc, Glcβ1-4Glcβ1-4Glc1-3Glc1-4Glc1-4Glc, Glcβ1-4Glcβ1-4Glc1-4Glc1-3Glc1-4Glc, Glcβ1-3Glcβ1-4Glc1-4Glc1-4Glc1-3Glc, Glcβ1-4Glcβ1-4Glc1-4Glc1-4Glc1-3Glc |
| 20 | 1155.40 | 1152.38 | 26.05 | 7Hex | |
| 21 | 1155.40 | 1152.38 | 27.23 | 7Hex | |
| 22 | 1155.40 | 1152.38 | 27.47 | 7Hex | |
| 23 | 1155.40 | 1152.38 | 28.61 | 7Hex | |

Lichenan. This structural differences between lichenan homopolymer and β-glucan homopolymer, as described above, were reflected in the number of isomers observed in oligosaccharide products obtained from lichenan. For example, depolymerization of β-glucan cannot produce the tetrasaccharide Glcβ1-3Glcβ1-4Glc1-3Glc because there must be at least two β1-4 glucose residues between each β1-3 glucose residue. However, lichenan was found to have all of the same isomers as β-glucan plus one additional isomer, which must therefore be associated with the Glcβ1-3Glcβ1-4Glc1-3Glc oligosaccharide. Similar logic was used to confirm the creation of at least 42 other oligosaccharides (Table 5-7).

In Table 5-7, each subunit labeled "Hex" is independently selected from unsubstituted, β1-linked Glu which is linked to the 3-position or the 4-position of a neighboring unsubstituted Glu.

TABLE 5-7

| # | Mass (m/z) | Neutral Mass | Retention Time (min) | Composition |
|---|---|---|---|---|
| 1 | 507.19 | 504.17 | 5.98 | 3Hex |
| 2 | 507.19 | 504.17 | 11.58 | 3Hex |
| 3 | 507.19 | 504.17 | 13.73 | 3Hex |
| 4 | 507.19 | 504.17 | 15.24 | 3Hex |
| 5 | 669.25 | 666.22 | 14.13 | 4Hex |
| 6 | 669.25 | 666.22 | 17.58 | 4Hex |
| 7 | 669.25 | 666.22 | 19.46 | 4Hex |
| 8 | 669.25 | 666.22 | 19.70 | 4Hex |
| 9 | 669.25 | 666.22 | 20.41 | 4Hex |
| 10 | 831.30 | 828.27 | 12.65 | 5Hex |
| 11 | 831.30 | 828.27 | 13.47 | 5Hex |
| 12 | 831.30 | 828.27 | 15.45 | 5Hex |
| 13 | 831.30 | 828.27 | 23.64 | 5Hex |
| 14 | 831.30 | 828.27 | 24.92 | 5Hex |
| 15 | 831.30 | 828.27 | 25.79 | 5Hex |
| 16 | 831.30 | 828.27 | 26.59 | 5Hex |
| 17 | 993.35 | 990.33 | 9.72 | 6Hex |
| 18 | 993.35 | 990.33 | 10.28 | 6Hex |
| 19 | 993.35 | 990.33 | 11.86 | 6Hex |
| 20 | 993.35 | 990.33 | 14.38 | 6Hex |
| 21 | 993.35 | 990.33 | 16.23 | 6Hex |
| 22 | 993.35 | 990.33 | 16.61 | 6Hex |
| 23 | 993.35 | 990.33 | 29.00 | 6Hex |
| 24 | 993.35 | 990.33 | 30.90 | 6Hex |
| 25 | 993.35 | 990.33 | 39.26 | 6Hex |
| 26 | 993.35 | 990.33 | 40.70 | 6Hex |
| 27 | 1155.40 | 1152.38 | 9.59 | 7Hex |
| 28 | 1155.40 | 1152.38 | 9.99 | 7Hex |
| 29 | 1155.40 | 1152.38 | 10.50 | 7Hex |
| 30 | 1155.40 | 1152.38 | 11.19 | 7Hex |
| 31 | 1155.40 | 1152.38 | 11.97 | 7Hex |
| 32 | 1155.40 | 1152.38 | 12.24 | 7Hex |
| 33 | 1155.40 | 1152.38 | 15.65 | 7Hex |
| 34 | 1155.40 | 1152.38 | 17.24 | 7Hex |
| 35 | 1155.40 | 1152.38 | 17.58 | 7Hex |
| 36 | 1155.40 | 1152.38 | 19.55 | 7Hex |
| 37 | 1317.46 | 1314.43 | 11.16 | 8Hex |
| 38 | 1317.46 | 1314.43 | 16.70 | 8Hex |
| 39 | 1317.46 | 1314.43 | 18.17 | 8Hex |
| 40 | 1317.46 | 1314.43 | 20.18 | 8Hex |
| 41 | 1479.51 | 1476.49 | 20.81 | 9Hex |
| 42 | 1641.56 | 1638.54 | 23.51 | 10Hex |
| 43 | 1644.58 | 1641.56 | 23.57 | 10Hex |
| 44 | 1317.46 | 1314.43 | 18.17 | 8Hex |
| 45 | 1317.46 | 1314.43 | 20.18 | 8Hex |
| 46 | 1479.51 | 1476.49 | 20.81 | 9Hex |
| 47 | 1644.58 | 1641.56 | 23.57 | 10Hex |

Compound 6 in Table 5-7 was identified as Glcβ1-3Glcβ1-4Glc1-3Glc. Compounds 8 and 9 in Table 5-7 were determined to be Glcβ1-3Glcβ1-4Glc1-4Glc, Glcβ1-4Glcβ1-3Glc1-4Glc or Glcβ1-4Glcβ1-4Glc1-3Glc, although the correlation of the specific peak to the specific oligosaccharide was not yet determined. Compound 15 in Table 5-7 was determined to be Glcβ1-3Glcβ1-4Glc1-4Glc1-4Glc, Glcβ1-4Glcβ1-3Glc1-4Glc1-4Glc, Glcβ1-4Glcβ1-4Glc1-3Glc1-4Glc, or Glcβ1-4Glcβ1-4Glc1-4Glc1-3Glc.

Glucomannan. The amount of oligosaccharide isomers in products obtained from glucomannan can be described as (# of isomers=$n^2$) where "n" equals the number of monomers. For example, a trisaccharide would have eight isomers, and a tetrasaccharide would have 16 isomers, etc. This was confirmed in the number of isomers created for each DP. At DP's larger than 5, less than the expected number of isomers were observed, which could be explained by low probabilities of long chains of a single repeating monomer, low sensitivity, or co-elution. Data for the mixture of observed compounds is shown in Table 5-8.

In Table 5-8, each subunit labeled "Hex" is independently selected from unsubstituted, β1-linked Glu or unsubstituted, β1-linked Man, each of which is linked to the 4-position of a neighboring unsubstituted Glu or unsubstituted Man.

TABLE 5-8

| # | Mass (m/z) | Neutral Mass | Retention Time (min) | Composition |
|---|---|---|---|---|
| 1 | 507.19 | 504.17 | 1.51 | 3Hex |
| 2 | 507.19 | 504.17 | 1.97 | 3Hex |
| 3 | 507.19 | 504.17 | 6.87 | 3Hex |
| 4 | 507.19 | 504.17 | 8.71 | 3Hex |
| 5 | 507.19 | 504.17 | 10.05 | 3Hex |
| 6 | 507.19 | 504.17 | 10.98 | 3Hex |
| 7 | 507.19 | 504.17 | 12.88 | 3Hex |
| 8 | 507.19 | 504.17 | 13.51 | 3Hex |
| 9 | 669.25 | 666.22 | 3.51 | 4Hex |
| 10 | 669.25 | 666.22 | 5.91 | 4Hex |
| 11 | 669.25 | 666.22 | 10.76 | 4Hex |
| 12 | 669.25 | 666.22 | 10.97 | 4Hex |
| 13 | 669.25 | 666.22 | 11.42 | 4Hex |
| 14 | 669.25 | 666.22 | 11.85 | 4Hex |
| 15 | 669.25 | 666.22 | 14.04 | 4Hex |
| 16 | 669.25 | 666.22 | 15.07 | 4Hex |
| 17 | 669.25 | 666.22 | 15.45 | 4Hex |
| 18 | 669.25 | 666.22 | 15.90 | 4Hex |
| 19 | 669.25 | 666.22 | 16.28 | 4Hex |
| 20 | 669.25 | 666.22 | 16.40 | 4Hex |
| 21 | 669.25 | 666.22 | 16.70 | 4Hex |
| 22 | 669.25 | 666.22 | 17.26 | 4Hex |
| 23 | 669.25 | 666.22 | 18.84 | 4Hex |
| 24 | 669.25 | 666.22 | 19.48 | 4Hex |
| 25 | 831.30 | 828.27 | 9.15 | 5Hex |
| 26 | 831.30 | 828.27 | 9.46 | 5Hex |
| 27 | 831.30 | 828.27 | 10.68 | 5Hex |
| 28 | 831.30 | 828.27 | 12.85 | 5Hex |
| 29 | 831.30 | 828.27 | 13.73 | 5Hex |
| 30 | 831.30 | 828.27 | 13.81 | 5Hex |
| 31 | 831.30 | 828.27 | 14.03 | 5Hex |
| 32 | 831.30 | 828.27 | 14.81 | 5Hex |
| 33 | 831.30 | 828.27 | 15.34 | 5Hex |
| 34 | 831.30 | 828.27 | 15.85 | 5Hex |
| 35 | 831.30 | 828.27 | 15.99 | 5Hex |
| 36 | 831.30 | 828.27 | 16.32 | 5Hex |
| 37 | 831.30 | 828.27 | 16.46 | 5Hex |
| 38 | 831.30 | 828.27 | 16.62 | 5Hex |
| 39 | 831.30 | 828.27 | 16.91 | 5Hex |
| 40 | 831.30 | 828.27 | 17.65 | 5Hex |
| 41 | 831.30 | 828.27 | 20.30 | 5Hex |
| 42 | 831.30 | 828.27 | 20.55 | 5Hex |
| 43 | 831.30 | 828.27 | 21.05 | 5Hex |
| 44 | 831.30 | 828.27 | 21.41 | 5Hex |
| 45 | 831.30 | 828.27 | 22.68 | 5Hex |
| 46 | 831.30 | 828.27 | 23.09 | 5Hex |
| 47 | 993.35 | 990.33 | 11.93 | 6Hex |
| 48 | 993.35 | 990.33 | 12.46 | 6Hex |
| 49 | 993.35 | 990.33 | 13.85 | 6Hex |
| 50 | 993.35 | 990.33 | 14.38 | 6Hex |
| 51 | 993.35 | 990.33 | 14.49 | 6Hex |
| 52 | 993.35 | 990.33 | 15.19 | 6Hex |
| 53 | 993.35 | 990.33 | 16.00 | 6Hex |
| 54 | 993.35 | 990.33 | 16.19 | 6Hex |
| 55 | 993.35 | 990.33 | 16.23 | 6Hex |
| 56 | 993.35 | 990.33 | 16.47 | 6Hex |
| 57 | 993.35 | 990.33 | 17.17 | 6Hex |
| 58 | 993.35 | 990.33 | 17.32 | 6Hex |
| 59 | 993.35 | 990.33 | 17.74 | 6Hex |
| 60 | 993.35 | 990.33 | 18.04 | 6Hex |
| 61 | 993.35 | 990.33 | 18.32 | 6Hex |
| 62 | 993.35 | 990.33 | 18.70 | 6Hex |
| 63 | 993.35 | 990.33 | 18.95 | 6Hex |
| 64 | 993.35 | 990.33 | 19.73 | 6Hex |
| 65 | 993.35 | 990.33 | 19.93 | 6Hex |
| 66 | 993.35 | 990.33 | 20.39 | 6Hex |
| 67 | 993.35 | 990.33 | 20.46 | 6Hex |
| 68 | 993.35 | 990.33 | 21.04 | 6Hex |
| 69 | 993.35 | 990.33 | 21.22 | 6Hex |
| 70 | 993.35 | 990.33 | 22.71 | 6Hex |
| 71 | 993.35 | 990.33 | 23.39 | 6Hex |
| 72 | 993.35 | 990.33 | 24.38 | 6Hex |
| 73 | 993.35 | 990.33 | 24.47 | 6Hex |
| 74 | 993.35 | 990.33 | 24.82 | 6Hex |
| 75 | 993.35 | 990.33 | 25.27 | 6Hex |
| 76 | 993.35 | 990.33 | 25.78 | 6Hex |
| 77 | 993.35 | 990.33 | 26.39 | 6Hex |
| 78 | 993.35 | 990.33 | 27.44 | 6Hex |
| 79 | 1155.40 | 1152.38 | 13.11 | 7Hex |
| 80 | 1155.40 | 1152.38 | 13.65 | 7Hex |
| 81 | 1155.40 | 1152.38 | 14.53 | 7Hex |
| 82 | 1155.40 | 1152.38 | 15.49 | 7Hex |
| 83 | 1155.40 | 1152.38 | 15.72 | 7Hex |
| 84 | 1155.40 | 1152.38 | 17.15 | 7Hex |
| 85 | 1155.40 | 1152.38 | 17.58 | 7Hex |
| 86 | 1155.40 | 1152.38 | 17.64 | 7Hex |
| 87 | 1155.40 | 1152.38 | 17.84 | 7Hex |
| 88 | 1155.40 | 1152.38 | 18.14 | 7Hex |
| 89 | 1155.40 | 1152.38 | 18.38 | 7Hex |
| 90 | 1155.40 | 1152.38 | 18.52 | 7Hex |
| 91 | 1155.40 | 1152.38 | 18.70 | 7Hex |
| 92 | 1155.40 | 1152.38 | 18.87 | 7Hex |
| 93 | 1155.40 | 1152.38 | 19.10 | 7Hex |
| 94 | 1155.40 | 1152.38 | 19.67 | 7Hex |
| 95 | 1155.40 | 1152.38 | 19.71 | 7Hex |
| 96 | 1155.40 | 1152.38 | 19.95 | 7Hex |
| 97 | 1155.40 | 1152.38 | 20.08 | 7Hex |
| 98 | 1155.40 | 1152.38 | 20.24 | 7Hex |
| 99 | 1155.40 | 1152.38 | 20.42 | 7Hex |
| 100 | 1155.40 | 1152.38 | 20.68 | 7Hex |
| 101 | 1155.40 | 1152.38 | 20.96 | 7Hex |
| 102 | 1155.40 | 1152.38 | 21.16 | 7Hex |
| 103 | 1155.40 | 1152.38 | 21.48 | 7Hex |
| 104 | 1155.40 | 1152.38 | 21.59 | 7Hex |
| 105 | 1155.40 | 1152.38 | 22.01 | 7Hex |
| 106 | 1155.40 | 1152.38 | 22.21 | 7Hex |
| 107 | 1155.40 | 1152.38 | 23.24 | 7Hex |
| 108 | 1155.40 | 1152.38 | 23.70 | 7Hex |
| 109 | 1155.40 | 1152.38 | 24.27 | 7Hex |
| 110 | 1155.40 | 1152.38 | 24.62 | 7Hex |
| 111 | 1155.40 | 1152.38 | 25.02 | 7Hex |
| 112 | 1155.40 | 1152.38 | 25.56 | 7Hex |
| 113 | 1155.40 | 1152.38 | 26.62 | 7Hex |
| 114 | 1155.40 | 1152.38 | 27.83 | 7Hex |
| 115 | 1155.40 | 1152.38 | 28.38 | 7Hex |
| 116 | 1317.46 | 1314.43 | 15.14 | 8Hex |
| 117 | 1317.46 | 1314.43 | 16.72 | 8Hex |
| 118 | 1317.46 | 1314.43 | 17.49 | 8Hex |
| 119 | 1317.46 | 1314.43 | 17.86 | 8Hex |
| 120 | 1317.46 | 1314.43 | 18.14 | 8Hex |
| 121 | 1317.46 | 1314.43 | 18.30 | 8Hex |
| 122 | 1317.46 | 1314.43 | 18.54 | 8Hex |
| 123 | 1317.46 | 1314.43 | 18.79 | 8Hex |
| 124 | 1317.46 | 1314.43 | 18.97 | 8Hex |
| 125 | 1317.46 | 1314.43 | 19.20 | 8Hex |
| 126 | 1317.46 | 1314.43 | 19.45 | 8Hex |
| 127 | 1317.46 | 1314.43 | 19.59 | 8Hex |
| 128 | 1317.46 | 1314.43 | 19.96 | 8Hex |
| 129 | 1317.46 | 1314.43 | 20.13 | 8Hex |
| 130 | 1317.46 | 1314.43 | 20.38 | 8Hex |
| 131 | 1317.46 | 1314.43 | 20.64 | 8Hex |
| 132 | 1317.46 | 1314.43 | 20.78 | 8Hex |
| 133 | 1317.46 | 1314.43 | 20.96 | 8Hex |
| 134 | 1317.46 | 1314.43 | 21.30 | 8Hex |
| 135 | 1317.46 | 1314.43 | 21.54 | 8Hex |
| 136 | 1317.46 | 1314.43 | 21.95 | 8Hex |
| 137 | 1317.46 | 1314.43 | 22.55 | 8Hex |
| 138 | 1317.46 | 1314.43 | 22.68 | 8Hex |
| 139 | 1317.46 | 1314.43 | 23.13 | 8Hex |
| 140 | 1317.46 | 1314.43 | 23.36 | 8Hex |
| 141 | 1317.46 | 1314.43 | 23.71 | 8Hex |
| 142 | 1317.46 | 1314.43 | 24.47 | 8Hex |
| 143 | 1317.46 | 1314.43 | 25.20 | 8Hex |
| 144 | 1317.46 | 1314.43 | 25.69 | 8Hex |
| 145 | 1317.46 | 1314.43 | 26.01 | 8Hex |
| 146 | 1317.46 | 1314.43 | 26.49 | 8Hex |

TABLE 5-8-continued

| # | Mass (m/z) | Neutral Mass | Retention Time (min) | Composition |
|---|---|---|---|---|
| 147 | 1317.46 | 1314.43 | 26.97 | 8Hex |
| 148 | 1317.46 | 1314.43 | 27.44 | 8Hex |
| 149 | 1479.51 | 1476.49 | 15.97 | 9Hex |
| 150 | 1479.51 | 1476.49 | 20.50 | 9Hex |
| 151 | 1479.51 | 1476.49 | 20.97 | 9Hex |
| 152 | 1479.51 | 1476.49 | 21.70 | 9Hex |
| 153 | 1479.51 | 1476.49 | 22.85 | 9Hex |
| 154 | 1479.51 | 1476.49 | 23.90 | 9Hex |
| 155 | 1479.51 | 1476.49 | 25.65 | 9Hex |
| 156 | 1479.51 | 1476.49 | 26.69 | 9Hex |
| 157 | 1641.58 | 1638.56 | 15.38 | 10Hex |
| 158 | 1803.61 | 1800.59 | 15.93 | 11Hex |
| 159 | 1965.67 | 1962.64 | 16.36 | 12Hex |
| 160 | 2127.72 | 2124.70 | 16.82 | 13Hex |
| 161 | 2289.77 | 2286.75 | 17.12 | 14Hex |
| 162 | 2451.83 | 2448.80 | 17.54 | 15Hex |
| 163 | 2613.88 | 2610.86 | 17.87 | 16Hex |
| 164 | 2775.93 | 2772.91 | 18.18 | 17Hex |

The identities of compounds corresponding to peaks in Table 5-8 are shown below. Peaks are grouped together where an individual oligosaccharide could not be tied to a specific peak, but where groups of oligosaccharides having the same mass could be tied to groups of peaks.

| | |
|---|---|
| 1 | Manβ1-4Manβ1-4Man |
| 2, 3, 4, 5, 6, and 7 | Glcβ1-4Manβ1-4Man, Manβ1-4Glcβ1-4Man, Manβ1-4Manβ1-4Glc, Glcβ1-4Glcβ1-4Man, or Glcβ1-4Manβ1-4Glc, or Manβ1-4Glcβ1-4Glc |
| 9 | Manβ1-4Manβ1-4Manβ1-4Man |
| 10, 11, 12, 13, 14, | Glcβ1-4Manβ1-4Manβ1-4Man, Glcβ1-4Glcβ1-4Manβ1-4Man, |
| 15, 16, 17, 18, 19, | Glcβ1-4Manβ1-4Glcβ1-4Man, Glcβ1-4Manβ1-4Manβ1-4Glc, |
| 20, 21, 22, and 23 | Glcβ1-4Glcβ1-4Glcβ1-4Man, Glcβ1-4Glcβ1-4Manβ1-4Glc, Glcβ1-4Manβ1-4Glcβ1-4Glc, Manβ1-4Glcβ1-4Manβ1-4Man, Manβ1-4Manβ1-4Glcβ1-4Man, Manβ1-4Manβ1-4Manβ1-4Glc, Manβ1-4Glcβ1-4Glcβ1-4Man, Manβ1-4Glcβ1-4Manβ1-4Glc, Manβ1-4Manβ1-4Glcβ1-4Glc, or Manβ1-4Glcβ1-4Glcβ1-4Glc |
| 27 | Manβ1-4[Manβ1-4]₃Man |
| 47 | Manβ1-4[Manβ1-4]₄Man |
| 79 | Manβ1-4[Manβ1-4]₅Man |

Galactomannan. Because galactomannan and mannan have the same β1-4 mannose backbone, the peaks corresponding to the non-branched backbone was easily identified by comparing the retention times of the peaks that appeared in both chromatograms. It was inferred that peaks that were only found in galactomannan and not mannan, contained at least one branch. For example, the trisaccharide Manβ1-4Manβ1-4Man at RT 1.51 minutes was found in both mannan and galactomannan, which confirmed the creation of this trisaccharide. Furthermore, galactomannan was expected to contain two additional isomers, (Galα1-6)Manβ1-4Man and Manβ1-4(Galα1-6)Man. Indeed, two additional isomers at RT 1.78 and 2.56 minutes were observed and can be described as the two previously mentioned isomers. Similar logic was used to confirm the creation of 47 other oligosaccharides (Table 5-9).

In Table 5-9, each subunit labeled "Hex" is independently selected from unsubstituted, β1-linked Man or β1-linked (Galα1-6)Man, each of which is linked to the 4-position of a neighboring unsubstituted Man or (Galα1-6)Man.

TABLE 5-9

| # | Mass (m/z) | Neutral Mass | Retention Time (min) | Composition |
|---|---|---|---|---|
| 1 | 507.19 | 504.17 | 1.51 | 3Hex |
| 2 | 507.19 | 504.17 | 1.78 | 3Hex |
| 3 | 507.19 | 504.17 | 2.56 | 3Hex |
| 4 | 669.25 | 666.22 | 3.51 | 4Hex |
| 5 | 669.25 | 666.22 | 4.01 | 4Hex |
| 6 | 669.25 | 666.22 | 4.41 | 4Hex |
| 7 | 669.25 | 666.22 | 4.94 | 4Hex |
| 8 | 669.25 | 666.22 | 8.34 | 4Hex |
| 9 | 831.30 | 828.27 | 9.20 | 5Hex |
| 10 | 831.30 | 828.27 | 9.50 | 5Hex |
| 11 | 831.30 | 828.27 | 10.13 | 5Hex |
| 12 | 831.30 | 828.27 | 10.54 | 5Hex |
| 13 | 831.30 | 828.27 | 11.06 | 5Hex |
| 14 | 831.30 | 828.27 | 11.25 | 5Hex |
| 15 | 831.30 | 828.27 | 12.06 | 5Hex |
| 16 | 831.30 | 828.27 | 12.91 | 5Hex |
| 17 | 993.35 | 990.33 | 11.93 | 6Hex |
| 18 | 993.35 | 990.33 | 12.02 | 6Hex |
| 19 | 993.35 | 990.33 | 12.23 | 6Hex |
| 20 | 993.35 | 990.33 | 12.40 | 6Hex |
| 21 | 993.35 | 990.33 | 12.60 | 6Hex |
| 22 | 993.35 | 990.33 | 12.86 | 6Hex |
| 23 | 993.35 | 990.33 | 13.41 | 6Hex |
| 24 | 993.35 | 990.33 | 13.64 | 6Hex |
| 25 | 993.35 | 990.33 | 14.13 | 6Hex |
| 26 | 1155.40 | 1152.38 | 13.11 | 7Hex |
| 27 | 1155.40 | 1152.38 | 13.51 | 7Hex |
| 28 | 1155.40 | 1152.38 | 13.57 | 7Hex |
| 29 | 1155.40 | 1152.38 | 13.72 | 7Hex |
| 30 | 1155.40 | 1152.38 | 14.12 | 7Hex |
| 31 | 1155.40 | 1152.38 | 14.22 | 7Hex |
| 32 | 1155.40 | 1152.38 | 14.38 | 7Hex |
| 33 | 1155.40 | 1152.38 | 14.65 | 7Hex |
| 34 | 1155.40 | 1152.38 | 14.93 | 7Hex |
| 35 | 1155.40 | 1152.38 | 15.33 | 7Hex |
| 36 | 1317.46 | 1314.43 | 14.06 | 8Hex |
| 37 | 1317.46 | 1314.43 | 14.34 | 8Hex |
| 38 | 1317.46 | 1314.43 | 14.67 | 8Hex |
| 39 | 1317.46 | 1314.43 | 14.90 | 8Hex |
| 40 | 1317.46 | 1314.43 | 15.27 | 8Hex |
| 41 | 1317.46 | 1314.43 | 15.58 | 8Hex |
| 42 | 1317.46 | 1314.43 | 15.90 | 8Hex |
| 43 | 1479.51 | 1476.49 | 14.80 | 9Hex |
| 44 | 1479.51 | 1476.49 | 15.10 | 9Hex |
| 45 | 1479.51 | 1476.49 | 15.97 | 9Hex |

TABLE 5-9-continued

| # | Mass (m/z) | Neutral Mass | Retention Time (min) | Composition |
|---|---|---|---|---|
| 46 | 1479.51 | 1476.49 | 16.25 | 9Hex |
| 47 | 1479.51 | 1476.49 | 16.55 | 9Hex |

The identities of compounds corresponding to peaks in Table 5-9 are shown below. Peaks are grouped together where an individual oligosaccharide could not be tied to a specific peak, but where groups of oligosaccharides having the same mass could be tied to groups of peaks.

| | |
|---|---|
| 1 | Manβ1-4Manβ1-4Man |
| 2 and 3 | (Galα1-6)Manβ1-4Man or Manβ1-4(Galα1-6)Man |
| 4 | Manβ1-4Manβ1-4Manβ1-4Man |
| 5, 6, and 7 | Manβ1-4(Galα1-6)Manβ1-4Man, (Galα1-6)Manβ1-4Manβ1-4Man, or Manβ1-4Manβ1-4(Galα1-6)Man |
| 8 | (Galα1-6)Manβ1-4(Galα1-6)Man |
| 9 | Manβ1-4[Manβ1-4]$_3$Man |
| 10, 11, 12, and 13 | (Galα1-6)Manβ1-4Manβ1-4Manβ1-4Man, Manβ1-4(Galα1-6)Manβ1-4Manβ1-4Man, Manβ1-4Manβ1-4(Galα1-6)Manβ1-4Man, or Manβ1-4Manβ1-4Manβ1-4(Galα1-6)Man |
| 14, 15, and 16 | (Galα1-6)Manβ1-4(Galα1-6)Manβ1-4Man, (Galα1-6)Manβ1-4Manβ1-4(Galα1-6)Man, or (Galα1-6)Manβ1-4(Galal-6)Manβ1-4Man |
| 17 | Manβ1-4[Manβ1-4]$_4$Man |
| 18, 19, 20, 21, and 22 | (Galα1-6)Manβ1-4Manβ1-4Manβ1-4Manβ1-4Man, Manβ1-4(Galα1-6)Manβ1-4Manβ1-4Manβ1-4Man, Manβ1-4Manβ1-4(Galα1-6)Manβ1-4Manβ1-4Man, Manβ1-4Manβ1-4Manβ1-4(Galα1-6)Manβ1-4Man, or Manβ1-4Manβ1-4Manβ1-4Manβ1-4(Galα1-6)Man |
| 27, 28, 29, 30, 31, and 32 | (Galα1-6)Manβ1-4Manβ1-4Manβ1-4Manβ1-4Manβ1-4Man, Manβ1-4(Galα1-6)Manβ1-4Manβ1-4Manβ1-4Manβ1-4Man, Manβ1-4Manβ1-4(Galα1-6)Manβ1-4Manβ1-4Manβ1-4Man, Manβ1-4Manβ1-4Manβ1-4(Galα1-6)Manβ1-4Manβ1-4Man, Manβ1-4Manβ1-4Manβ1-4Manβ1-4(Galα1-6)Manβ1-4Man, or Manβ1-4Manβ1-4Manβ1-4Manβ1-4Manβ1-4(Galα1-6)Man |
| 26 | Manβ1-4[Manβ1-4]$_5$Man |
| 36 | Manβ1-4[Manβ1-4]$_6$Man |
| 43 | Manβ1-4[Manβ1-4]$_7$Man |

Xylan. The mass heterogeneity between xylose and glucuronic acid residues in xylan provided for convenient determination of linear and branched structures. For example, the tetrasaccharide Xylβ1-4Xylβ1-4Xylβ1-4Xyl was found to have a mass of 546.18 daltons, and the three possible branched trisaccharides had a mass of 604.19 daltons and were observed at RT 14.00, 15.33, and 16.47 minutes. Similar logic was used to confirm the creation of 27 other oligosaccharides (Table 5-10).

In Table 5-10, each subunit labeled "Pent" is independently selected from unsubstituted, β1-linked Xyl or β1-linked (GlcAOMeα1-2)Xyl, each of which is linked to the 4-position of a neighboring unsubstituted Xyl or (GlcAOMeα1-2)Xyl. Each "GlcAOMe" represents a glucuronic acid, which is methylated at the 4-O position.

TABLE 5-10

| # | Mass (m/z) | Neutral Mass | Retention Time (min) | Composition |
|---|---|---|---|---|
| 1 | 417.16 | 414.14 | 9.83 | 3Pent |
| 2 | 549.20 | 546.18 | 15.33 | 4Pent |
| 3 | 607.21 | 604.19 | 14.00 | 3Pent:1GlcAOMe |
| 4 | 607.21 | 604.19 | 14.27 | 3Pent:1GlcAOMe |
| 5 | 607.21 | 604.19 | 16.47 | 3Pent:1GlcAOMe |
| 6 | 681.25 | 678.22 | 18.79 | 5Pent |
| 7 | 739.26 | 736.23 | 17.68 | 4Pent:1GlcAOMe |
| 8 | 739.26 | 736.23 | 18.87 | 4Pent:1GlcAOMe |
| 9 | 739.26 | 736.23 | 19.55 | 4Pent:1GlcAOMe |
| 10 | 739.26 | 736.23 | 20.66 | 4Pent:1GlcAOMe |
| 11 | 813.29 | 810.26 | 21.92 | 6Pent |
| 12 | 871.30 | 868.27 | 20.93 | 5Pent:1GlcAOMe |
| 13 | 871.30 | 868.27 | 22.82 | 5Pent:1GlcAOMe |
| 14 | 871.30 | 868.27 | 23.13 | 5Pent:1GlcAOMe |
| 15 | 871.30 | 868.27 | 23.46 | 5Pent:1GlcAOMe |
| 16 | 871.30 | 868.27 | 24.87 | 5Pent:1GlcAOMe |
| 17 | 945.33 | 942.31 | 25.73 | 7Pent |
| 18 | 1003.34 | 1000.32 | 24.51 | 6Pent:1GlcAOMe |
| 19 | 1003.34 | 1000.32 | 26.88 | 6Pent:1GlcAOMe |
| 20 | 1003.34 | 1000.32 | 27.34 | 6Pent:1GlcAOMe |
| 21 | 1003.34 | 1000.32 | 27.52 | 6Pent:1GlcAOMe |
| 22 | 1003.34 | 1000.32 | 28.51 | 6Pent:1GlcAOMe |
| 23 | 1003.34 | 1000.32 | 29.39 | 6Pent:1GlcAOMe |
| 24 | 1077.37 | 1074.35 | 28.15 | 8Pent |

TABLE 5-10-continued

| # | Mass (m/z) | Neutral Mass | Retention Time (min) | Composition |
|---|---|---|---|---|
| 25 | 1135.38 | 1132.36 | 27.61 | 7Pent: 1GlcAOMe |
| 26 | 1135.38 | 1132.36 | 28.47 | 7Pent: 1GlcAOMe |
| 27 | 1135.38 | 1132.36 | 29.69 | 7Pent: 1GlcAOMe |

The identities of compounds corresponding to peaks in Table 5-10 are shown below. Peaks are grouped together where an individual oligosaccharide could not be tied to a specific peak, but where groups of oligosaccharides having the same mass could be tied to groups of peaks.

| # | Composition |
|---|---|
| 1 | Xylβ1-4Xylβ1-4Xyl |
| 2 | Xylβ1-4Xylβ1-4Xylβ1-4Xyl |
| 3, 4, and 5 | (OMe-4-GlcAα1-2)Xylβ1-4Xylβ1-4Xyl, Xylβ1-4(OMe-4-GlcAα1-2)Xylβ1-4Xyl, Xylβ1-4Xylβ1-4(OMe-4-GlcAα1-2)Xyl |
| 6 | Xylβ1-4[Xylβ1-4]$_3$Xyl |
| 7, 8, 9, and 10 | (OMe-4-GlcAα1-2)Xylβ1-4Xylβ1-4Xylβ1-4Xyl, Xylβ1-4(OMe-4-GlcAα1-2)Xylβ1-4Xylβ1-4Xyl, Xylβ1-4Xylβ1-4(OMe-4-GlcAα1-2)Xylβ1-4Xyl, Xylβ1-4Xylβ1-4Xylβ1-4(OMe-4-GlcAα1-2)Xyl |
| 11 | Xylβ1-4[Xylβ1-4]$_4$Xyl |
| 12, 13, 14, 15, and 16 | (OMe-4-GlcAα1-2)Xylβ1-4[Xylβ1-4]$_3$Xyl, Xylβ1-4(OMe-4-GlcAα1-2)Xylβ1-4[Xylβ1-4]$_2$Xyl, Xylβ1-4Xylβ1-4(OMe-4-GlcAα1-2)Xylβ1-4Xylβ1-4Xyl, [Xylβ1-4]$_3$(OMe-4-GlcAα1-2)Xylβ1-4Xyl, [Xylβ1-4]$_4$(OMe-4-GlcAα1-2)Xyl |
| 17 | Xylβ1-4[Xylβ1-4]$_5$Xyl |
| 18, 19, 20, 21, 22, and 23 | (OMe-4-GlcAα1-2)Xylβ1-4[Xylβ1-4]$_4$Xyl, Xylβ1-4(OMe-4-GlcAα1-2)Xylβ1-4[Xylβ1-4]$_3$Xyl, Xylβ1-4Xylβ1-4(OMe-4-GlcAα1-2)Xylβ1-4[Xylβ1-4]$_2$Xyl, [Xylβ1-4]$_3$(OMe-4-GlcAα1-2)Xylβ1-4Xylβ1-4Xyl, [Xylβ1-4]$_4$(OMe-4-GlcAα1-2)Xylβ1-4Xyl, [Xylβ1-4]$_5$(OMe-4-GlcAα1-2)Xyl |
| 24 | Xylβ1-4]Xylβ1-4]$_6$Xyl |

Arabinoxylan. Arabinoxylan was expected to have four trisaccharide isomers based on its polysaccharide structure. One isomer, RT 9.83 minutes, was also found in xylan, which confirms that the structure is comprised of only the backbone and no branching, Xylβ1-4Xylβ1-4Xyl. Furthermore, three more isomers at RT 2.00, 4.40, and 12.78 were observed and corresponded to the three expected structures (Araα1-3)Xylβ1-4Xyl, Xylβ1-4(Araα1-3)Xyl, ((Araα1-2)(Araα1-3))Xyl. Similar logic was used to confirm the production of 39 other oligosaccharides (Table 5-11).

In Table 5-11, each subunit labeled "Pent" is independently selected from unsubstituted, β1-linked Xyl, β1-linked (Araα1-3)Xyl, and β1-linked (Araα1-2)(Araα1-3)Xyl, each of which is linked to the 4-position of a neighboring Xyl, (Araα1-3)Xyl, or (Araα1-2)(Araα1-3)Xyl.

TABLE 5-11

| # | Mass (m/z) | Neutral Mass | Retention Time (min) | Composition |
|---|---|---|---|---|
| 1 | 417.16 | 414.14 | 2.00 | 3Pent |
| 2 | 417.16 | 414.14 | 4.40 | 3Pent |
| 3 | 417.16 | 414.14 | 9.83 | 3Pent |
| 4 | 417.16 | 414.14 | 12.78 | 3Pent |
| 5 | 549.20 | 546.18 | 8.01 | 4Pent |
| 6 | 549.20 | 546.18 | 10.19 | 4Pent |
| 7 | 549.20 | 546.18 | 11.20 | 4Pent |
| 8 | 549.20 | 546.18 | 11.58 | 4Pent |
| 9 | 549.20 | 546.18 | 12.16 | 4Pent |
| 10 | 549.20 | 546.18 | 12.38 | 4Pent |
| 11 | 549.20 | 546.18 | 15.34 | 4Pent |
| 12 | 681.25 | 678.22 | 12.39 | 5Pent |
| 13 | 681.25 | 678.22 | 14.11 | 5Pent |
| 14 | 681.25 | 678.22 | 14.36 | 5Pent |
| 15 | 681.25 | 678.22 | 14.86 | 5Pent |
| 16 | 681.25 | 678.22 | 15.82 | 5Pent |
| 17 | 681.25 | 678.22 | 16.76 | 5Pent |
| 18 | 681.25 | 678.22 | 17.15 | 5Pent |
| 19 | 681.25 | 678.22 | 18.79 | 5Pent |
| 20 | 813.29 | 810.26 | 14.03 | 6Pent |
| 21 | 813.29 | 810.26 | 14.97 | 6Pent |
| 22 | 813.29 | 810.26 | 15.36 | 6Pent |
| 23 | 813.29 | 810.26 | 16.13 | 6Pent |
| 24 | 813.29 | 810.26 | 17.21 | 6Pent |
| 25 | 813.29 | 810.26 | 21.92 | 6Pent |
| 26 | 945.33 | 942.31 | 16.61 | 7Pent |
| 27 | 945.33 | 942.31 | 18.29 | 7Pent |
| 28 | 945.33 | 942.31 | 22.54 | 7Pent |
| 29 | 945.33 | 942.31 | 22.79 | 7Pent |
| 30 | 945.33 | 942.31 | 25.73 | 7Pent |
| 31 | 1077.37 | 1074.35 | 26.33 | 8Pent |
| 32 | 1077.37 | 1074.35 | 26.83 | 8Pent |
| 33 | 1077.37 | 1074.35 | 27.10 | 8Pent |
| 34 | 1077.37 | 1074.35 | 27.49 | 8Pent |
| 35 | 1077.37 | 1074.35 | 28.15 | 8Pent |
| 36 | 1209.41 | 1206.39 | 26.37 | 9Pent |
| 37 | 1209.41 | 1206.39 | 27.10 | 9Pent |
| 38 | 1341.46 | 1338.43 | 27.10 | 10Pent |
| 39 | 1473.50 | 1470.48 | 28.63 | 11Pent |

The identities of compounds corresponding to peaks in Table 5-11 are shown below. Peaks are grouped together where an individual oligosaccharide could not be tied to a specific peak, but where groups of oligosaccharides having the same mass could be tied to groups of peaks.

| # | Composition |
|---|---|
| 1, 2, and 4 | (Araα1-3)Xylβ1-4Xyl, Xylβ1-4(Araα1-3)Xyl, or ((Araα1-2)(Araα1-3))Xyl |
| 3 | Xylβ1-4Xylβ1-4Xyl |
| 5, 6, 7, 8, 9, and 10 | (Araα1-3)Xylβ1-4Xylβ1-4Xyl, Xylβ1-4(Araα1-3)Xylβ1-4Xyl, Xylβ1-4Xylβ1-4(Araα1-3)Xyl, (Araα1-3)Xylβ1-4(Araα1-3)Xyl, ((Araα1-2)(Araα1-3))Xylβ1-4Xyl, or Xylβ1-4((Araα1-2)(Araα1-3))Xyl |
| 11 | Xylβ1-4Xylβ1-4Xylβ1-4Xyl |
| 19 | Xylβ1-4[Xylβ1-4]$_3$Xyl |
| 25 | Xylβ1-4[Xylβ1-4]$_4$Xyl |
| 30 | Xylβ1-4[Xylβ1-4]$_5$Xyl |
| 35 | Xylβ1-4[Xylβ1-4]$_6$Xyl |

Arabinan. The arabinan used for depolymerization was sourced from beet root. Arabinan was proposed to produce three trisaccharide isomers, Araα1-5Araα1-5Ara, (Araα1-3)Araα1-5Ara, and Araα1-5(Araα1-3)Ara. Indeed, three isomers were observed in the chromatogram at RT 2.97, 3.94, and 4.77 minutes. This trend continued for the four expected tetrasaccharide isomers, Araα1-5Araα1-5Araα1-5Ara, (Araα1-3)Araα1-5Ara1-5Ara, Araα1-5(Araα1-3)Ara1-5Ara, Araα1-5Ara1-5(Araα1-3)Ara. As expected, four isomers were found at RT 10.55, 11.03, 11.66, and 12.26 minutes. A total of 34 oligosaccharides were created from beetroot arabinan (Table 5-12).

In Table 5-12, each subunit labeled "Pent" is independently selected from unsubstituted, β1-linked Ara and β1-linked (Araα1-3)Ara, each of which is linked to the 5-position of a neighboring Ara or (Araα1-3)Ara.

TABLE 5-12

| # | Mass (m/z) | Neutral Mass | Retention Time (min) | Composition |
|---|---|---|---|---|
| 1 | 417.16 | 414.14 | 2.96 | 3Pent |
| 2 | 417.16 | 414.14 | 3.94 | 3Pent |
| 3 | 417.16 | 414.14 | 4.77 | 3Pent |
| 4 | 549.20 | 546.18 | 10.55 | 4Pent |
| 5 | 549.20 | 546.18 | 11.03 | 4Pent |
| 6 | 549.20 | 546.18 | 11.66 | 4Pent |
| 7 | 549.20 | 546.18 | 12.26 | 4Pent |
| 8 | 681.25 | 678.22 | 13.52 | 5Pent |
| 9 | 681.25 | 678.22 | 14.03 | 5Pent |
| 10 | 681.25 | 678.22 | 14.21 | 5Pent |
| 11 | 681.25 | 678.22 | 14.50 | 5Pent |
| 12 | 681.25 | 678.22 | 14.98 | 5Pent |
| 13 | 813.29 | 810.26 | 15.11 | 6Pent |
| 14 | 813.29 | 810.26 | 15.57 | 6Pent |
| 15 | 813.29 | 810.26 | 16.13 | 6Pent |
| 16 | 813.29 | 810.26 | 16.32 | 6Pent |
| 17 | 813.29 | 810.26 | 16.52 | 6Pent |
| 18 | 945.33 | 942.31 | 17.26 | 7Pent |
| 19 | 945.33 | 942.31 | 17.51 | 7Pent |
| 20 | 945.33 | 942.31 | 17.78 | 7Pent |
| 21 | 945.33 | 942.31 | 18.00 | 7Pent |
| 22 | 945.33 | 942.31 | 18.20 | 7Pent |
| 23 | 1077.37 | 1074.35 | 18.42 | 8Pent |
| 24 | 1077.37 | 1074.35 | 19.13 | 8Pent |
| 25 | 1077.37 | 1074.35 | 19.53 | 8Pent |
| 26 | 1209.41 | 1206.39 | 19.75 | 9Pent |
| 27 | 1209.41 | 1206.39 | 20.20 | 9Pent |
| 28 | 1209.41 | 1206.39 | 20.50 | 9Pent |
| 29 | 1209.41 | 1206.39 | 20.75 | 9Pent |
| 30 | 1341.46 | 1338.43 | 21.37 | 10Pent |
| 31 | 1341.46 | 1338.43 | 21.62 | 10Pent |
| 32 | 1473.50 | 1470.48 | 22.32 | 11Pent |
| 33 | 1605.54 | 1602.52 | 23.54 | 12Pent |
| 34 | 1737.58 | 1734.56 | 25.02 | 13Pent |

Compounds 1-3 in Table 5-12 were determined to be Ara$\alpha$1-5Ara$\alpha$1-5Ara, (Ara$\alpha$1-3)Ara$\alpha$1-5Ara, and Ara$\alpha$1-5(Ara$\alpha$1-3)Ara, although the specific oligosaccharide corresponding to each peak was not yet definitively determined. Compounds 4-7 were determined to be Ara$\alpha$1-5Ara$\alpha$1-5Ara$\alpha$1-5Ara, (Ara$\alpha$1-3)Ara$\alpha$1-5Ara1-5Ara, Ara$\alpha$1-5(Ara$\alpha$1-3)Ara1-5Ara, and Ara$\alpha$1-5Ara1-5(Ara$\alpha$1-3)Ara, although the specific oligosaccharide corresponding to each peak was not yet definitively determined.

Example 6. Strategies for Structural Characterization of Oligosaccharides

Figure 7:
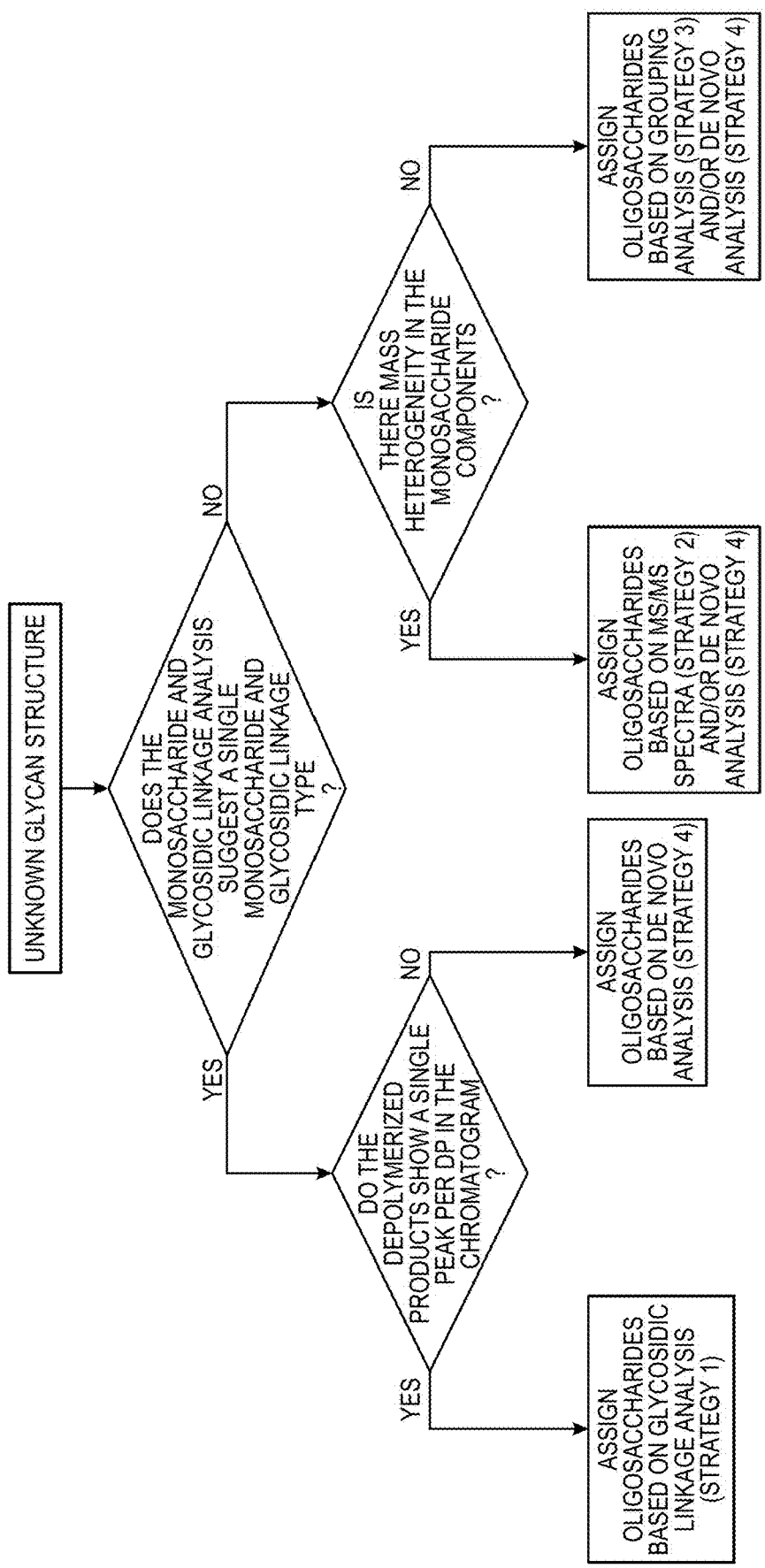
FIG. 7 shows a flowchart outlining strategies for elucidation of oligosaccharide structure.

The structural characterization of oligosaccharides is complicated and not stream-lined; thus, new strategies are often developed as new types and classes of oligosaccharides are discovered. Oligosaccharides prepared according to the present disclosure fall into different categories, e.g., 1) oligosaccharides derived from homopolymeric polysaccharides, containing a single type of monosaccharide and a single type of glycosidic linkage (e.g., amylose, galactan, mannan, curdlan, and cellulose); 2) oligosaccharides derived from heteropolymeric polymeric polysaccharides, containing non-isomeric monomers of various molecular weights and different glycosidic linkages (xylan, and xyloglucan); 3) oligosaccharides derived from heteropolymeric polysaccharides, containing different types of iosomeric monomers having the same molecular weight and/or different types of glycosidic linkages (glucomannan, galactomannan, and arabinoxylan); and 4) oligosaccharides derived from homopolymeric polysaccharides, containing a single monosaccharide unit and different types of glycosidic linkages (arabinan, lichenin, and beta-glucan). A flowchart (FIG. 7) was created to match oligosaccharide components with the respective logic that can be applied for their characterization. Examples are described below.

Strategy 1: Structural Characterization of Homopolymers

Homopolymers are the simplest oligosaccharides to characterize. Homopolymers were identified by the presence of a single monomer unit, when determined by a monosaccharide analysis, and only terminal and one type of linear linkage, when determined by a glycosidic linkage analysis. Once a homopolymer was determined, oligosaccharide analysis by HPLC-MS was performed to determine the degree of polymerization. For example, galactan contained 88% galactose (Table 5-1) and only two major glycosidic linkages, 58.84% 4-linked and 30.53% terminal (Table 5-2), which indicates it is a homopolymer. The HPLC-MS oligosaccharide analysis showed seven peaks corresponding to DPs of 3-9. Thus, the oligosaccharides were assigned to be polymers of Gal$\beta$1-4Gal (Table 5-4).

Strategy 2: Structural Characterization of Heteropolymers with Hetero-Mass Monomers Heteropolymers with hetero-mass monomers can be the most structurally complicated oligosaccharides, however, the heterogeneity in mass results in oligosaccharides that can be differentiated by fragmentation in a mass spectrometer. Xyloglucan is an example of a heteropolymer with hetero-mass monomers because it contains glucose and galactose (180.16 Da) and xylose (150.13 Da). A full description of characterization with fragmentation-based logic flows is shown in Example 4 and FIG. 6.

Strategy 3: Structural Characterization of Heteropolymers with Homo-Mass Monomers Heteropolymers with homo-mass monomers are the most complicated oligosaccharides to structurally elucidate because of the high number of possible structures but also the lack of information that can be obtained by MS fragmentation. One strategy that can be used to characterize the oligosaccharides is by a grouping strategy where groups of oligosaccharide isomers are assigned to groups of chromatographic peaks with the same mass. This strategy is particularly useful when the number of isomers per DP is consistent with the number of possible isomers dictated by the monomeric and glycosidic linkage profiles. For example, this strategy was used with beta-glucan, which contains mixtures of $\beta$1-3 and $\beta$1-4 glucose polymers (Example 5, Table 5-2, 5-3). When grouping oligosaccharides is not sufficient, de novo characterization methods can be used for structural characterization as described below in Example 6, Strategy 4.

Strategy 4: De Novo and Non-Biased Characterization of Polymers

The structures of oligosaccharide products produced herein that cannot be described by logic strategies 1-3, were and/or are characterized, according to the following de novo approach.

Fractionation of Oligosaccharides

Fractionation and detection of oligosaccharides was performed on an Agilent 1260 Infinity II series HPLC coupled to an Agilent 6530 Q-TOF mass spectrometer and a Teledyne Isco Foxy 200 fraction collector. Oligosaccharides were first separated on a 150 mm×4.6 mm Hypercarb column from Thermo Scientific with a 5 µm particle size. A binary gradient was employed and consisted of solvent A: (3% (v/v) acetonitrile/water+0.1% formic acid) and solvent B: (90% acetonitrile/water+0.1% formic acid). A 90-minute gradient with a flow rate of 1 ml/min was used for chromatographic separation: 5-12 B, 0-90 min; 12-99% B, 90-90.01 minutes; 99-99% B, 90.01-110 min; 99-5% B, 110-110.01 min; 5-5% B, 110.01-120 min. Post column, a 90:10 flow splitter partitioned the larger stream to the fraction collector and the smaller to the Q-TOF mass spectrometer. Data from the QTOF was collected in the positive mode and calibrated with internal calibrant ions ranging from m/z 118.086-2721.895. Drying gas was set to 150° C. and with a flow rate of 11 l/min. The fragment, skimmer, and Octupole 1 RF voltages were set to 75, 60, and 750 V, respectively. Fragmentation was performed at a rate of 1 spectra/second. The collision energy was based upon the compound mass and expressed by the linear function (Collision Energy=1.3*(m/z)-3.5). Fractions were collected on 96-well plates at a rate of 30 seconds per fraction. Collected fractions were dried to completion under vacuum centrifugation and reconstituted in 100 µl of nano-pure water. A 10 µl aliquot was transferred to a separate 96-well plate for monosaccharide composition analysis, while the remaining 90 µl underwent glycosidic linkage analysis.

Monosaccharide Composition Analysis of Fractionated Oligosaccharides

Briefly, fractionated oligosaccharides underwent acid hydrolysis with 4 M TFA for 2 hours at 100° C. The samples were dried to completion by vacuum centrifugation. Samples and monosaccharide standards (0.001-100 µg/ml) underwent derivatization with 0.2 M PMP in methanol and 28% $NH_4OH$ at 70° C. for 30 minutes. Derivatized products were dried to completion under vacuum centrifugation and reconstituted in nano-pure water. Excess PMP was removed with chloroform extraction. The aqueous layer was analyzed by an Agilent 1290 infinity II UHPLC coupled to an Agilent 6495A QqQ MS employing dynamic multiple reaction monitoring (dMRM) mode. An external standard curve comprised of monosaccharide standards (fructose, mannose, allose, glucose, galactose, rhamnose, fucose, ribose, xylose, arabinose, glucuronic acid, galacturonic acid, N-acetylglucosamine, N-acetylgalactosamine) ranging from 0.001-100 µg/ml was used for absolute quantitation of each monosaccharide in the fractions. Detailed descriptions of the method can be found in Xu et al.[25] and Amicucci et al.[24]

Linkage Analysis of Fractionated Oligosaccharides

Glycosidic linkage analysis was analyzed in the manner of Galermo et al.[26] Briefly, fractionated oligosaccharides and a pool of oligosaccharide standards (2-O-(α-D-Mannosepyranosyl)-D-mannopyranose, 1,4-D-xylobiose, 1,5-α-L-arabinotriose, 1,3-α-1,6-α-D-mannotriose, isomaltotriose, 4-O-(β-D-galactopyranosyl)-D-galactopyranose, lactose, 2'-fucosyllactose, nigerose, 3-O-(β-D-galactopyranosyl)-D-galactopyranose, 3-O-(α-D-mannopyranosyl)-D-mannopyranose, 1,4-β-D-mannotriose, maltohexaose, 1,6-α-D-mannotriose, and amylopectin obtained from carbosynth (Compton, U.K.), galactan (Lupin), 3'3-α-L-arabinofuranosylxylotetraose, sophorose, galactan, xyloglucan, mannan, galactomannan, beechwood xylan, arabinoxylan, arabinan, glucomannan, obtained from Megazyme (Chicago, IL); remaining partially permethylated monosaccharides were synthesized as described by Galermo et al[55]) were reacted with saturated NaOH and iodomethane in DMSO. Residual NaOH and DMSO were removed by extraction with DCM and water. The DCM layer was dried to completion under vacuum centrifugation. Samples were hydrolyzed and derivatized in the same manner as the monosaccharide analysis. Samples did not undergo chloroform extraction and were reconstituted in 70% (v/v) methanol/water. Fractions were analyzed on an Agilent 1290 infinity II UHPLC coupled to an Agilent 6495A QqQ MS ran in multiple reaction monitoring (MRM) mode. The pool of oligosaccharide standards referenced above was used to assign the glycosidic linkages present based upon their m/z, fragmentation spectra, and retention time.

NMR Analysis of Fractionated Oligosaccharides

NMR spectra were recorded at 303 K on a Bruker AVANCE III 800 MHz spectrometer equipped with a 5-mm Bruker CPTCI cryoprobe. Samples were obtained by combining ten collections of fractionated oligosaccharides of the same components verified with HPLC-QTOF MS and MS/MS data. Based on the monosaccharide and linkage information, the most abundant oligosaccharides were selected for NMR analysis. Each of these selected pooled fractions were dried with vacuum centrifugation before being reconstituted in 0.4 mL of $D_2O$, and measured using 1D 1H (relaxation delay (D1) 2 s; number of scans (NS) 128), 13C NMR (D1 1.5 s; NS 6000-15000), and 2D 1H-1H COSY (D1 1.5 s; NS 8), 1H-13C HSQC (D1 2 s; NS 4), HMBC (D1 1.5 s; NS 16), and H2BC (D1 1.5 s; NS 16). The spectra were then processed with Bruker TopSpin 3.2 and analyzed with MestReNova. The experimental chemical shifts, along with the required monosaccharide and linkage data, were calculated using the CASPER program, where the oligosaccharide structures, including anomeric characters of linkages, were predicted with ranking scores.[56]

Overview of Method

For the structural analysis of oligosaccharides that were not characterizable by the facile methods presented in Example 6, Strategies 1-3, we describe a method successfully used for their de novo elucidation herein. This strategy can also be employed to fully characterize the structure of any of the remaining uncharacterized oligosaccharides presented herein. In this strategy, the oligosaccharide products are chromatographically separated into pools of smaller numbers of compounds, many containing single unique structures. The LC eluant is split between the QTOF for MS and MS/MS and a 96 well collection plate. The QTOF MS and MS/MS mass spectra provides the structural information pertaining to monosaccharide compositions and the degree of oligosaccharide polymerization of the compounds collected at unique retention times. However, sole use of the QTOF MS and MS/MS mass spectra data may not identify monosaccharide constituents, linkages, or the anomeric character of the linkage (alpha versus beta). In such cases, the collected fractions (e.g., about 200) are further analyzed by rapid throughput monosaccharide and linkage analysis to provide nearly complete structures of each oligosaccharide component.

Figure 8A:
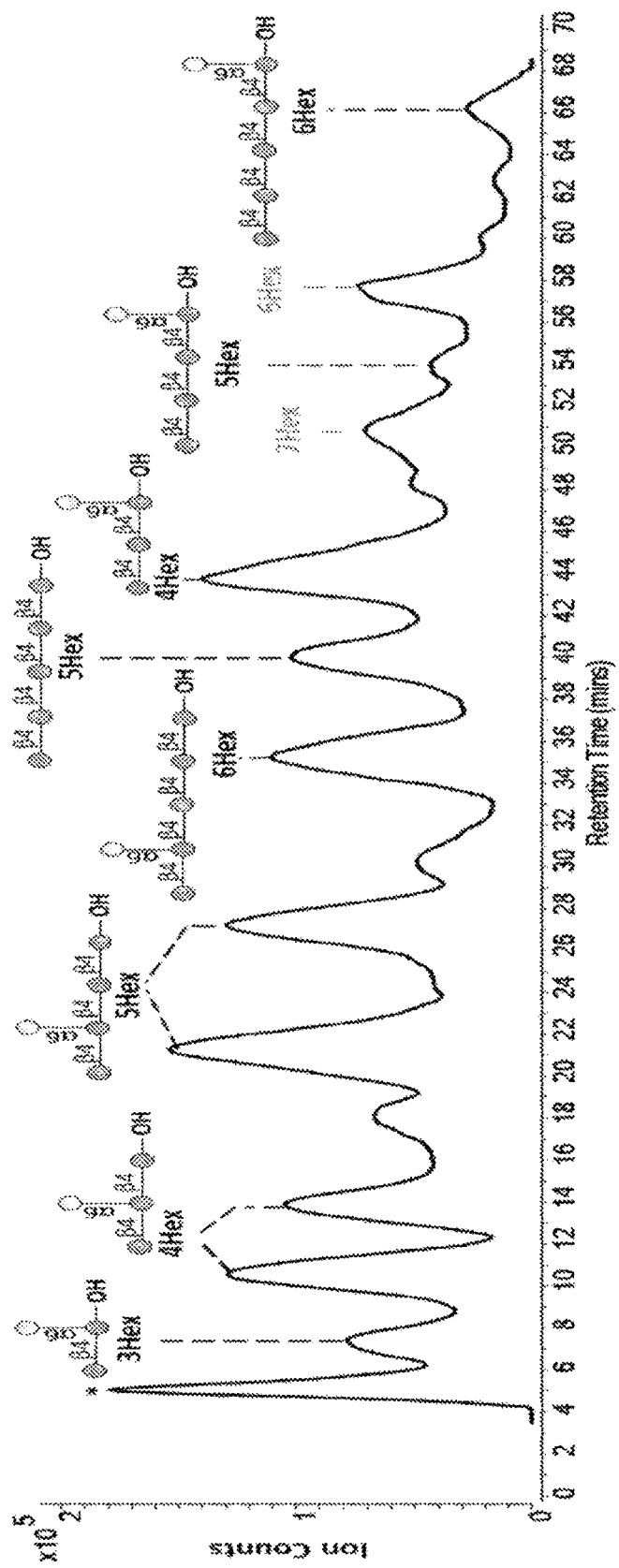
FIG. 8A shows an annotated chromatogram with completely elucidated oligosaccharides from galactomannan, which were determined using logic strategy 4.
Figure 8B:
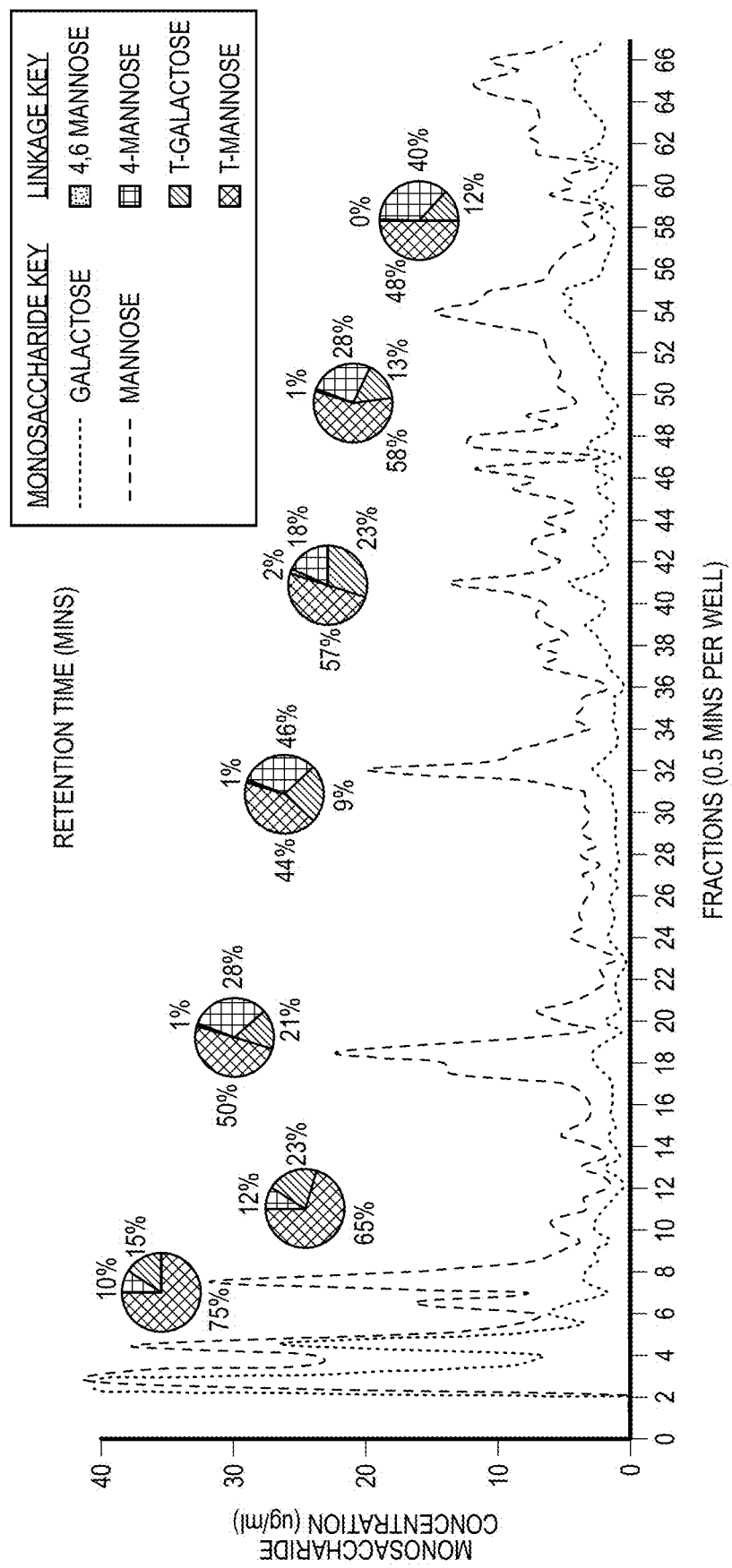
FIG. 8B shows a constructed chromatogram representing the monosaccharide concentration of galactose and mannose in each fraction and the relative glycosidic linkage composition of fractions shown in pie charts.

In one such example the galactomannan polysaccharide was used to illustrate the capabilities of these workflows. The LC-MS chromatogram yielded primarily hexose polymers with unknown monosaccharide compositions (combinations of galactose and mannose), linkage, or branching (FIG. 8A). Fractions from the LC-MS were collected in 30 second increments leading to a total of 192 fractions. Each fraction was analyzed for monosaccharide compositions as described above under "monosaccharide composition analysis of fractionated oligosaccharides", and the results are shown in (FIG. 8B). The linkage information was similarly obtained using a separate workflow for comprehensive linkage analysis as described above under "linkage analysis of fractionated oligosaccharides". When the three workflows (monosaccharide, glycosidic linkage, and oligosaccharide analysis) were integrated, they yielded structural information describing oligosaccharides with monosaccharide compositions and glycosidic linkage information.

Figure 8C:
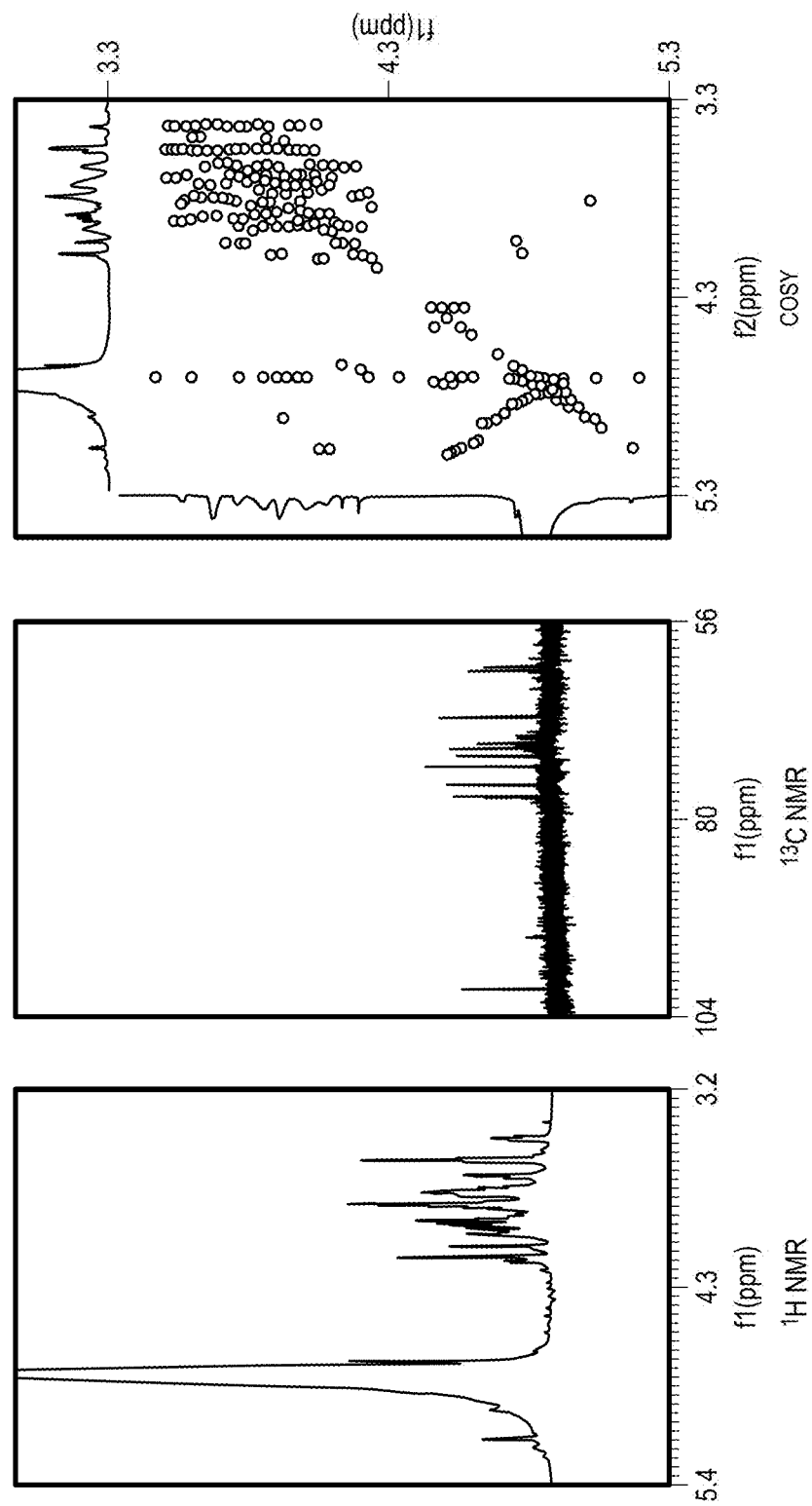
FIG. 8C shows the NMR analysis of the oligosaccharides.
Figure 8C:
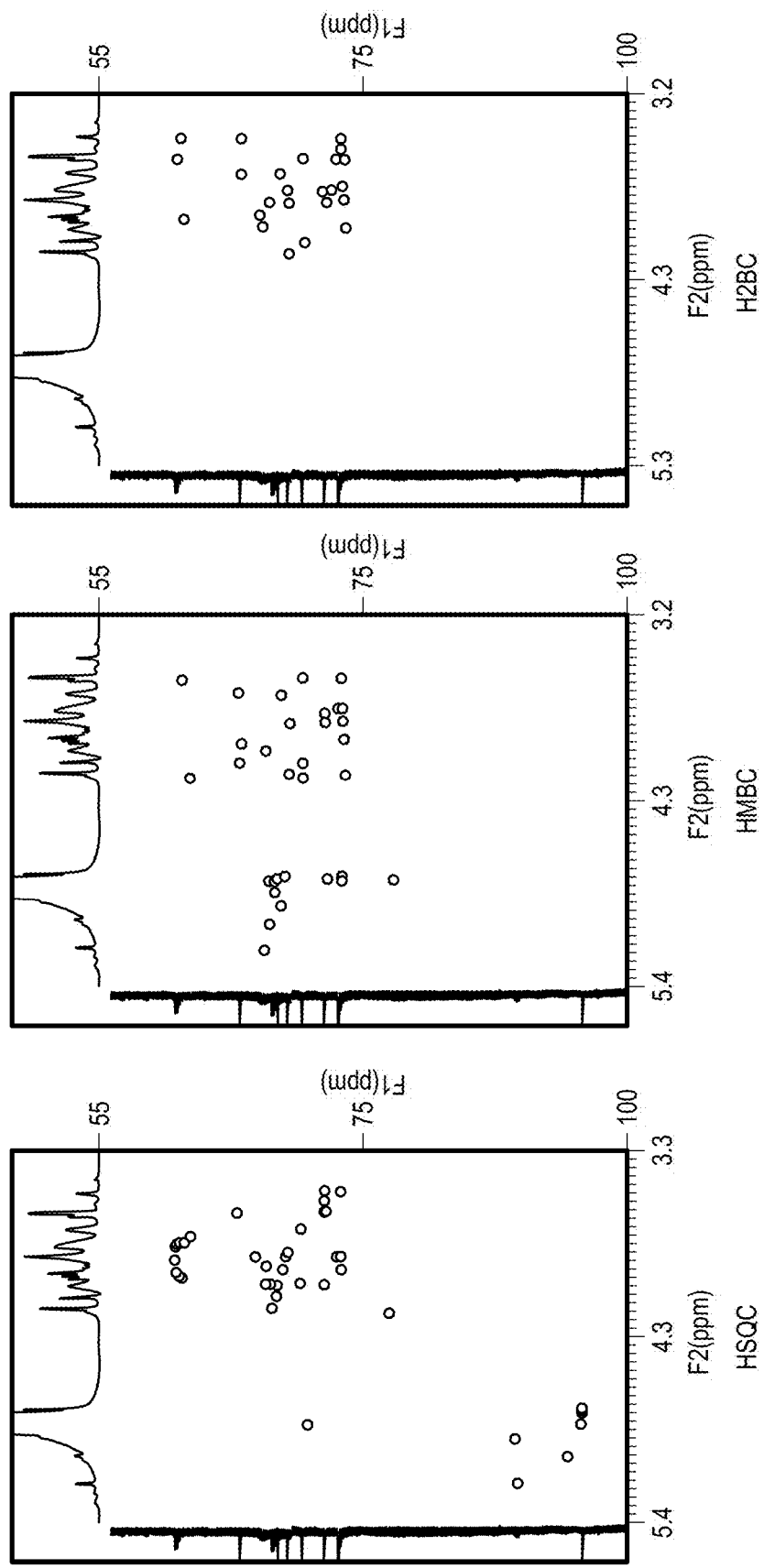
Figure 8D:
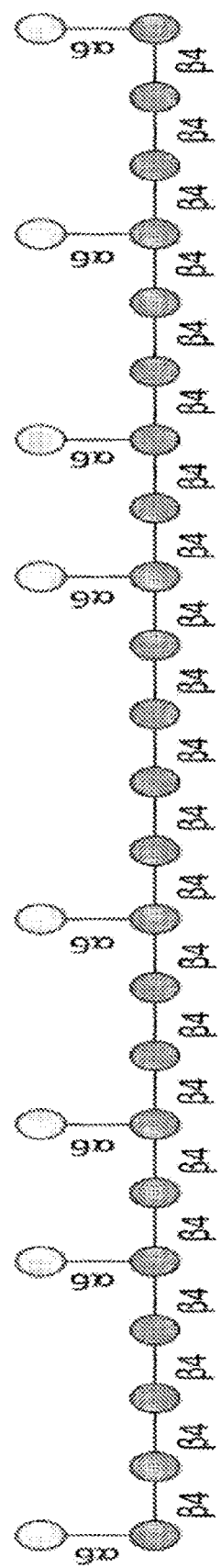
FIG. 8D shows a representation of the elucidated galactomannan structure by integrating oligosaccharide, monosaccharide, glycosidic linkage, and NMR analysis.

To obtain the final structural feature, the anomeric character of the linkages, the isolated oligosaccharide fractions were selected for NMR analysis using 1H, 13C NMR and a combination of techniques including COSY, HSQC, HMBC, and H2BC described above under "NMR Analysis of Fractionated Oligosaccharides", and the results are shown in FIG. 8C. The MS-obtained linkages and monosaccharide compositions greatly facilitated the NMR interpretation by limiting the resolution needed to determine the exact structures. This multi-workflow approach yielded absolute oligosaccharide structures, which were also used to recapitulate the parent polymeric structure (FIG. 8D).

Accordingly, the structures of any of the oligosaccharide peaks described in the tables (Tables 4, 5-3, 5-4, 5-5, 5-6, 5-7, 5-8, 5-9, 5-10, and 5-11) can be elucidated by the strategies presented in Strategies 1-4. Specifically, oligosaccharides 1-24 in Table 4 were characterized by Strategy 2, while oligosaccharides 25-35 in the same table were characterized by Strategy 3 and could be further characterized by Strategy 4. All oligosaccharides in Tables 5-3, 5-4, and 5-5 were characterized by Strategy 2. Oligosaccharides in Table 5-6 were characterized by Strategy 3 and can further be characterized by Strategy 4. The structures of oligosaccharides 2, 5, 10, and 18 were characterized as homologous compounds to compounds identified in curdlan because they had the same mass and retention time. The oligosaccharides in Table 5-7 were characterized by Strategy 3, and can be further characterized by Strategy 4.

The oligosaccharides 1, 9, 27, 47, and 79 in Table 5-8 were characterized by their homology to structures found in mannan; oligosaccharides 2-7, and 10-23 were characterized by Strategy 3 and can be further characterized by Strategy 4; oligosaccharides 8, 24-26, 28-46, 48-78, and 80-164 can be characterized by Strategy 4.

Oligosaccharides 1, 4, 17, 26, 36, and 43 in Table 5-9 were characterized by their homology to the same structures in mannan; oligosaccharides 2, 3, 5-7, 10-16, 18-22, and 27-32 were characterized by Strategy 3 and can be further characterized by Strategy 4; oligosaccharides 23-25, 27-35, 37-42, and 44-47 can be characterized by Strategy 4.

Oligosaccharides 1, 2, 6, 11, 17, and 24 in Table 5-10, were characterized by Strategy 2; oligosaccharides 3-5, 7-10, 12-16, and 18-23, were characterized by Strategy 3 and can be further characterized by Strategy 4; oligosaccharides 25-27 can be characterized by Strategy 4.

Oligosaccharides 3, 11, 19, 25, 30, and 35 in Table 5-11 were characterized by homology with structures found in xylan; oligosaccharides 1, 2, 4, and 5-10, were characterized by Strategy 3 and can be further characterized by Strategy 4; oligosaccharides 12-18, 20-24, 26-29, 31-34 can be characterized by Strategy 4.

Oligosaccharides 1-3, and 4-7, in Table 5-12 were characterized by Strategy 3 and can be further characterized by Strategy 4; oligosaccharides 8-34 can be characterized by Strategy 4.

III. REFERENCES

1. Meredith-Dennis, L.; Xu, G.; Goonatilleke, E.; Lebrilla, C. B.; Underwood, M. A.; Smilowitz, J. T., Composition and variation of macronutrients, immune proteins, and human milk oligosaccharides in human milk from non-profit and commercial milk banks. *Journal of Human Lactation* 2018, 34 (1), 120-129.
2. Wang, M.; Li, M.; Wu, S.; Lebrilla, C. B.; Chapkin, R. S.; Ivanov, I.; Donovan, S. M., Fecal microbiota composition of breast-fed infants is correlated with human milk oligosaccharides consumed. *Journal of pediatric gastroenterology and nutrition* 2015, 60 (6), 825.
3. Barile, D.; Rastall, R. A., Human milk and related oligosaccharides as prebiotics. *Current opinion in biotechnology* 2013, 24 (2), 214-219.
4. Coppa, G. V.; Zampini, L.; Galeazzi, T.; Facinelli, B.; Ferrante, L.; Capretti, R.; Orazio, G., Human milk oligosaccharides inhibit the adhesion to Caco-2 cells of diarrheal pathogens: *Escherichia coli, Vibrio cholerae*, and *Salmonella fyris. Pediatric Research* 2006, 59 (3), 377.
5. Zivkovic, A. M.; Barile, D., Bovine milk as a source of functional oligosaccharides for improving human health. *Advances in Nutrition* 2011, 2 (3), 284-289.
6. Lamsal, B. P., Production, health aspects and potential food uses of dairy prebiotic galactooligosaccharides. *Journal of the Science of Food and Agriculture* 2012, 92 (10), 2020-2028.
7. Yamaguchi, M.; Kainuma, K.; French, D., Electron microscopic observations of waxy maize starch. *Journal of ultrastructure research* 1979, 69 (2), 249-261.
8. Keegstra, K., Plant cell walls. *Plant physiology* 2010, 154 (2), 483-486.
9. Preston, R. D., *The physical biology of plant cell walls*. London.: Chapman & Hall: 1974.
10. Zhou, L.-B.; Chen, B., Bioactivities of water-soluble polysaccharides from Jisongrong mushroom: anti-breast carcinoma cell and antioxidant potential. *International journal of biological macromolecules* 2011, 48 (1), 1-4.
11. Martens, E. C.; Kelly, A. G.; Tauzin, A. S.; Brumer, H., The devil lies in the details: how variations in polysaccharide fine-structure impact the physiology and evolution of gut microbes. *Journal of molecular biology* 2014, 426 (23), 3851-3865.
12. Martens, E. C.; Lowe, E. C.; Chiang, H.; Pudlo, N. A.; Wu, M.; McNulty, N. P.; Abbott, D. W.; Henrissat, B.; Gilbert, H. J.; Bolam, D. N., Recognition and degradation of plant cell wall polysaccharides by two human gut symbionts. *PLoS biology* 2011, 9 (12), e1001221.
13. Lerouxel, O.; Cavalier, D. M.; Liepman, A. H.; Keegstra, K., Biosynthesis of plant cell wall polysaccharides—a complex process. *Current opinion in plant biology* 2006, 9 (6), 621-630.
14. Robbins, P.; Wright, A.; Dankert, M., Polysaccharide biosynthesis. *The Journal of general physiology* 1966, 49 (6), 331-346.
15. Morris, E.; Powell, D.; Gidley, M.; Rees, D., Conformations and interactions of pectins: I. Polymorphism between gel and solid states of calcium polygalacturonate. *Journal of molecular biology* 1982, 155 (4), 507-516.
16. Darvill, J. E.; McNeil, M.; Darvill, A. G.; Albersheim, P., Structure of Plant Cell Walls: XI. Glucuronoarabinoxylan, a second hemicellulose in the primary cell walls of suspension-cultured sycamore cells. *Plant Physiology* 1980, 66 (6), 1135-1139.
17. Bauer, W. D.; Talmadge, K. W.; Keegstra, K.; Albersheim, P., The structure of plant cell walls: II. The hemicellulose of the walls of suspension-cultured sycamore cells. *Plant physiology* 1973, 51 (1), 174-187.
18. Xu, Y.; Masuko, S.; Takieddin, M.; Xu, H.; Liu, R.; Jing, J.; Mousa, S. A.; Linhardt, R. J.; Liu, J., Chemoenzymatic synthesis of homogeneous ultralow molecular weight heparins. *Science* 2011, 334 (6055), 498-501.
19. Zhang, Z.; Ollmann, I. R.; Ye, X.-S.; Wischnat, R.; Baasov, T.; Wong, C.-H., Programmable one-pot oligosaccharide synthesis. *Journal of the American Chemical Society* 1999, 121 (4), 734-753.
20. Bucke, C., Review Oligosaccharide Synthesis Using Glycosidases. *Journal of Chemical Technology & Bio-* technology: International Research in Process, Environmental AND Clean Technology 1996, 67 (3), 217-220.
21. Karav, S.; Le Parc, A.; de Moura, J. M. L. N.; Frese, S. A.; Kirmiz, N.; Block, D. E.; Barile, D.; Mills, D. A., Oligosaccharides released from milk glycoproteins are selective growth substrates for infant-associated bifidobacteria. *Appl. Environ. Microbiol.* 2016, 82 (12), 3622-3630.
22. Pullicin, A. J.; Ferreira, A. J.; Beaudry, C. M.; Lim, J.; Penner, M. H., Preparation and characterization of isolated low degree of polymerization food-grade maltooligosaccharides. *Food Chemistry* 2018, 246, 115-120.
23. Amicucci, M. J.; Park, D.; Galermo, A. G.; Mills, D. A.; German, J. B.; Lebrilla, C. B., Production of bioactive oligosaccharides. Google Patents: 2018.
24. Amicucci, M. J.; Galermo, A. G.; Nandita, E.; Vo, T.-T. T.; Liu, Y.; Lee, M.; Xu, G.; Lebrilla, C. B., A rapid-throughput adaptable method for determining the monosaccharide composition of polysaccharides. *International Journal of Mass Spectrometry* 2019, 438, 22-28.
25. Xu, G.; Amicucci, M. J.; Cheng, Z.; Galermo, A. G.; Lebrilla, C. B., Revisiting monosaccharide analysis-quantitation of a comprehensive set of monosaccharides using dynamic multiple reaction monitoring. *Analyst* 2018, 143 (1), 200-207.
26. Galermo, A. G.; Nandita, E.; Barboza, M.; Amicucci, M. J.; Vo, T.-T. T.; Lebrilla, C. B., An LC-MS/MS Approach for Determining Glycosidic Linkages. *Analytical chemistry* 2018.
27. FRY, S. C., The structure and functions of xyloglucan. *Journal of Experimental Botany* 1989, 40 (1), 1-11.
28. Saito, Hiroshi, Akira Misaki, and Tokuya Harada. A comparison of the structure of curdlan and pachyman. *Agricultural and Biological Chemistry* 32.10 (1968): 1261-1269.
29. Michalak, Malwina, et al. Expression and characterization of an endo-1, 4-β-galactanase from *Emericella nidulans* in *Pichia pastoris* for enzymatic design of potentially prebiotic oligosaccharides from potato galactans. *Enzyme and microbial technology* 50.2 (2012): 121-129.
30. Meier, Hans. On the structure of cell walls and cell wall mannans from ivory nuts and from dates. *Biochimica et biophysica acta* 28 (1958): 229-240.
31. Cui, Steve W., and Qi Wang. Cell wall polysaccharides in cereals: chemical structures and functional properties. *Structural Chemistry* 20.2 (2009): 291-297.
32. Olafsdottir, Elin S., and Kristin Ingolfsdottir. Polysaccharides from lichens: structural characteristics and biological activity. *Planta medico* 67.03 (2001): 199-208.
33. Katsuraya, Kaname, et al. Constitution of konjac glucomannan: chemical analysis and 13C NMR spectroscopy. *Carbohydrate polymers* 53.2 (2003): 183-189.
34. Bardalaye, PROMODE C., and JOHN H. Nordin. Chemical structure of the galactomannan from the cell wall of *Aspergillus niger. Journal of Biological Chemistry* 252.8 (1977): 2584-2591.
35. Kgurakova, M., et al. Characterisation of xylan-type polysaccharides and associated cell wall components by FT-IR and FT-Raman spectroscopies. *Food Hydrocolloids* 13.1 (1999): 35-41.
36. Izydorczyk, Marta S., and Costas G. Biliaderis. Cereal arabinoxylans: advances in structure and physicochemical properties. *Carbohydrate Polymers* 28.1 (1995): 33-48.
37. Kim, Yeong-Su, Yu-Ri Lim, and Deok-Kun Oh. L-Arabinose production from sugar beet arabinan by immobilized endo- and exo-arabinanases from *Caldicellulosiruptor saccharolyticus* in a packed-bed reactor. *Journal of bioscience and bioengineering* 113.2 (2012): 239-241.
38. Katsuraya, Kaname, et al. Constitution of konjac glucomannan: chemical analysis and 13C NMR spectroscopy. *Carbohydrate polymers* 53.2 (2003): 183-189.
39. Larsbrink et al. A discrete genetic locus confers xyloglucan metabolism in select human gut Bacteroidetes. *Nature* 2014, 506:489
40. Salyers et al. Fermentation of mucin and plant polysaccharides by strains of *Bacteroides* from the human colon. *App Environm Microbiol* 1977, 33:319
41. Tamura et al., Molecular Mechanism by which Prominent Human Gut Bacteroidetes Utilize Mixed-Linkage β-Glucans, Major Health-Promoting Cereal Polysaccharides. *Cell Reports* 2017, 21: 2030
42. Beckmann et al. Isolation and identification of mixed linked beta-glucan degrading bacteria in the intestine of broiler chickens and partial characterization of respective 1,3-1,4-beta-glucanase activities. *J. Basic Microbiol* 2006, 46: 175
43. Sheridan et al. Polysaccharide utilization loci and nutrition specialization in a dominant group of butyrate-producing human colonic Firmicutes. *Microbial Genomics,* 2016, 2:1
44. Lammerts van Bueren et al. Prebiotic galactoligosaccharides activate mucin and pectin galactan utilization pathways in the human gut symbiont *Bacteroides* thetaiotaomicron. Scientific Reports 2017, 7:40478.
45. Luis et al. Dietary pectin glycans are degraded by coordinated enzyme pathways in human colonic *Bacteroides. Nat Microbiol* 2018, 3:210.
46. Hinz et al. *Bifidobacterium longum* endogalactanase liberate galactotriose from Type galactans. *Appl Environ Microbiol* 2005, 71:5501
47. Desai et al. A dietary fiber-deprived gut microbiota degrades the colonic mucus barrier and enhances pathogen susceptibility. *Cell* 2016, 17:1339
48. Kawaguchi et al. The mannobiose-forming exo-mannanase involved in a new mannan catabolic pathway in *Bacteroides fragilis.* Arch Microbiol 2014, 196:17
49. Leanti la Rosa et al. The human gut Firmicute *Roseburia intestinalis* is a primary degrader of dietary β-mannans. Nat Commun 2019, 10:905
50. Kulcinskaja et al. Expression and characterization of a *Bifidobacterium adolescentis* beta-mannanase carrying mannan-binding and cell association motifs. Appl Environ Microbiol 2013, 79:133
51. Reddy et al. A β-mannan utilization locus in *Bacteroides ovatus* involves a GH36 α-galactosidase active on galactomannans. FEBS Lett 2016, 590:2106
52. Martens et al. Recognition and Degradation of Plant Cell Wall Polysaccharides by Two Human Gut Symbionts. *PLoS Biol.* 2011, 9
53. Van Laere et al. Transglycosidew activity of *Bifidobacterium adolescents* DSM 20083 alpha-galactosidase. Appl Microbiol Biotechnol 1999, 52:681
54. Margolies et al. Purification and functional characterization of a novel alpha-L-arabinofuranosidase from *Bifidobacterium longum* B667. Appl Environm Microbiol 2003, 69:5-59.
55. Galermo, A. G., et al. Development of an Extensive Linkage Library for Characterization of Carbohydrates. *Analytical Chemistry* 91 (2019): 13022-13031.
56. Jansson, P, et al. Sequence determination of oligosaccharides and regular polysaccharides using NMR spectroscopy and a novel Web-based version of the computer program CASPER. *Carbohydrate research* 341 (2006): 1003-1010.

Although the foregoing invention has been described in some detail by way of illustration and example for purposes of clarity and understanding, one of skill in the art will appreciate that certain changes and modifications may be practiced with the scope of the appended claims. In addition, each reference provided herein is incorporated by reference in its entirety to the same extent as if each reference was individually incorporated by reference.

What is claimed is:

1. A composition comprising synthetic oligosaccharides, wherein the synthetic oligosaccharides comprise seven or more oligosaccharide molecules selected from the group consisting of:
   Glcβ1-3Glcβ1-4Glcβ1-4Glcβ1-4Glc,
   Glcβ1-4Glcβ1-3Glcβ1-4Glcβ1-4Glc,
   Glcβ1-4Glcβ1-4Glcβ1-3Glcβ1-4Glc,
   Glcβ1-3Glcβ1-4Glcβ1-4Glcβ1-4Glcβ1-4Glc,
   Glcβ1-4Glcβ1-3Glcβ1-4Glcβ1-4Glcβ1-4Glc,
   Glcβ1-4Glcβ1-4Glcβ1-3Glcβ1-4Glcβ1-4Glc,
   Glcβ1-4Glcβ1-4Glcβ1-4Glcβ1-3Glcβ1-4Glc, and
   Glcβ1-3Glcβ1-4Glcβ1-4Glcβ1-4Glcβ1-3Glc.

2. The composition of claim 1, further comprising one or more oligosaccharide molecules selected from the group consisting of:
   Glcβ1-4Glcβ1-3Glc,
   Glcβ1-3Glcβ1-4Glc,
   Glcβ1-3Glcβ1-4Glcβ1-4Glc,
   Glcβ1-4Glcβ1-3Glcβ1-4Glc,
   Glcβ1-4Glcβ1-4Glcβ1-3Glc,
   Glcβ1-3Glcβ1-4Glcβ1-3Glc,
   Glcβ1-4Glcβ1-4Glcβ1-4Glcβ1-3Glc, and
   Glcβ1-4Glcβ1-4Glcβ1-4Glcβ1-4Glcβ1-3Glc.

3. The composition of claim 2, further comprising:
   Glcβ1-4Glcβ1-3Glc,
   Glcβ1-3Glcβ1-4Glc,
   Glcβ1-3Glcβ1-4Glcβ1-4Glc,
   Glcβ1-4Glcβ1-3Glcβ1-4Glc,
   Glcβ1-4Glcβ1-4Glcβ1-3Glc,
   Glcβ1-3Glcβ1-4Glcβ1-3Glc,
   Glcβ1-4Glcβ1-4Glcβ1-4Glcβ1-3Glc, and
   Glcβ1-4Glcβ1-4Glcβ1-4Glcβ1-4Glcβ1-3Glc.

4. The composition of claim 1, further comprising any 7 or more of the oligosaccharide molecules of:
   Glcβ1-4Glcβ1-3Glc,
   Glcβ1-3Glcβ1-4Glc,
   Glcβ1-3Glcβ1-4Glcβ1-4Glc,
   Glcβ1-4Glcβ1-3Glcβ1-4Glc,
   Glcβ1-4Glcβ1-4Glcβ1-3Glc,
   Glcβ1-3Glcβ1-4Glcβ1-3Glc,
   Glcβ1-4Glcβ1-4Glcβ1-4Glcβ1-3Glc, and
   Glcβ1-4Glcβ1-4Glcβ1-4Glcβ1-4Glcβ1-3Glc.

5. The composition of claim 1, wherein the synthetic oligosaccharides are derived from depolymerization of β-glucan, lichenan, oat bran, wheat bran, or any combination thereof.

6. The composition of claim 5, wherein the depolymerization comprises oxidative treatment with hydrogen peroxide and a transition metal or alkaline earth metal, followed by based induced cleavage.

7. The composition of claim 1, wherein the synthetic oligosaccharides are present in an amount of 90 wt. % to 99 wt. %, based on total weight of oligosaccharides in the composition.

8. The composition of claim 1, wherein the composition is in a form of a foodstuff, a nutritional supplement, a synbiotic, an excipient, or a pharmaceutical product.

9. The composition of claim 1, further comprising one or more xylose-containing oligosaccharide molecules selected from the group consisting of:
   (Araα1-3)Xylβ1-4Xyl,
   Xylβ1-4 (Araα1-3)Xyl,
   ((Araα1-2) (Araα1-3))Xyl,
   Xylβ1-4Xylβ1-4Xyl,
   (Araα1-3)Xylβ1-4Xylβ1-4Xyl,
   Xylβ1-4 (Araα1-3)Xylβ1-4Xyl,
   Xylβ1-4Xylβ1-4 (Araα1-3)Xyl,
   (Araα1-3)Xylβ1-4 (Araα1-3)Xyl,
   ((Araα1-2) (Araα1-3))Xylβ1-4Xyl,
   Xylβ1-4 ((Araα1-2) (Araα1-3))Xyl,
   Xylβ1-4Xylβ1-4Xylβ1-4Xyl,
   Xylβ1-4 [Xylβ1-4]$_3$Xyl,
   Xylβ1-4 [Xylβ1-4]$_4$Xyl,
   Xylβ1-4 [Xylβ1-4]$_5$Xyl, or
   Xylβ1-4 [Xylβ1-4]$_6$Xyl.

10. The composition of claim 9, wherein the synthetic oligosaccharides are selected from of any 2 or more of the xylose-oligosaccharide molecules.

11. The composition of claim 9, wherein the synthetic oligosaccharides are selected from of any 3 or more of the xylose-oligosaccharide molecules.

12. The composition of claim 9, wherein the synthetic oligosaccharides are selected from of any 4 or more of the xylose-oligosaccharide molecules.

13. The composition of claim 9, wherein the synthetic oligosaccharides are selected from of any 10 or more of the xylose-oligosaccharide molecules.

* * * * *